(12) United States Patent
Noh et al.

(10) Patent No.: US 12,289,781 B2
(45) Date of Patent: Apr. 29, 2025

(54) METHOD AND APPARATUS FOR DUAL CONNECTIVITY MANAGEMENT IN WIRELESS COMMUNICATION SYSTEM

(71) Applicant: ELECTRONICS AND TELECOMMUNICATIONS RESEARCH INSTITUTE, Daejeon (KR)

(72) Inventors: Hoon Dong Noh, Daejeon (KR); Moon Sik Lee, Daejeon (KR); Jae Woo Park, Daejeon (KR); Jae Seung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 201 days.

(21) Appl. No.: 17/573,281

(22) Filed: Jan. 11, 2022

(65) Prior Publication Data

US 2022/0232655 A1    Jul. 21, 2022

(30) Foreign Application Priority Data

Jan. 11, 2021 (KR) .................. 10-2021-0003640
Jan. 11, 2022 (KR) .................. 10-2022-0004332

(51) Int. Cl.
*H04W 72/02* (2009.01)
*H04J 11/00* (2006.01)
(Continued)

(52) U.S. Cl.
CPC ........... *H04W 76/16* (2018.02); *H04W 72/02* (2013.01); *H04W 72/044* (2013.01); *H04W 88/14* (2013.01)

(58) Field of Classification Search
CPC .......... H04L 5/14; H04L 1/189; H04W 88/04; H04W 72/02; H04W 72/563;
(Continued)

(56) References Cited

U.S. PATENT DOCUMENTS 9,226,136 B2   12/2015 Kim et al.
9,980,258 B2    5/2018 Yi et al.
(Continued)

FOREIGN PATENT DOCUMENTS

WO    2013071199 A1    5/2013

OTHER PUBLICATIONS

U.S. Appl. No. 63/094,491 (Year: 2020).*

*Primary Examiner* — Marcus Smith
*Assistant Examiner* — Jason A Harley
(74) *Attorney, Agent, or Firm* — Rabin & Berdo, P.C.

(57) ABSTRACT

A DC management method, performed by a first communication node constituting an IAB network in a communication system, may comprise: receiving, from a first IAB node that is a lower node of the first communication node, a first capability report including information of DC-related capability of the first IAB node; based on the first capability report, identifying whether the first IAB node supports a multi-TRP function; based on the first capability report, identifying whether the first IAB node supports an intra-carrier DC; and based on the identified whether the first IAB node supports the multi-TRP function and whether the first IAB node supports the intra-carrier DC, configuring a DC for the first IAB node together with a second communication node that is an upper node of the first IAB node.

13 Claims, 23 Drawing Sheets

(51) Int. Cl.
*H04J 13/00* (2011.01)
*H04L 1/16* (2023.01)
*H04L 5/00* (2006.01)
*H04Q 11/04* (2006.01)
*H04W 72/04* (2023.01)
*H04W 72/044* (2023.01)
*H04W 72/12* (2023.01)
*H04W 74/0808* (2024.01)
*H04W 76/16* (2018.01)
*H04W 92/18* (2009.01)
*H04W 88/14* (2009.01)

(58) Field of Classification Search
CPC ... H04W 72/04; H04W 40/24; H04W 72/044; H04W 36/0069; H04B 7/15542; H04B 7/0695; H04B 7/0617
USPC .................................. 370/281, 329; 455/517
See application file for complete search history.

(56) References Cited

U.S. PATENT DOCUMENTS

| | | | |
|---|---|---|---|
| 11,026,136 B2* | 6/2021 | Raval | H04W 36/0066 |
| 2014/0335882 A1 | 11/2014 | Lee et al. | |
| 2015/0098441 A1 | 4/2015 | Peng | |
| 2015/0215944 A1* | 7/2015 | Kim | H04L 5/001 370/329 |
| 2018/0092118 A1 | 3/2018 | Kim et al. | |
| 2019/0319686 A1* | 10/2019 | Chen, IV | H04B 7/0639 |
| 2020/0052775 A1* | 2/2020 | Nam | H04L 5/14 |
| 2020/0162920 A1 | 5/2020 | Kim et al. | |
| 2020/0329518 A1* | 10/2020 | Liu | H04B 7/022 |
| 2020/0337047 A1* | 10/2020 | Abedini | H04B 7/022 |
| 2021/0058917 A1* | 2/2021 | Abedini | H04W 72/51 |
| 2021/0092654 A1* | 3/2021 | Kadiri | H04W 8/24 |
| 2021/0227552 A1* | 7/2021 | Abedini | H04B 7/024 |
| 2023/0421316 A1* | 12/2023 | Laddu | H04B 7/0408 |

\* cited by examiner

FIG. 10

| CORESET pool ID | serving cell ID | | | | | | BWP ID | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| $T_{(N-2) \times 8+7}$ | $T_{(N-2) \times 8+6}$ | $T_{(N-2) \times 8+5}$ | $T_{(N-2) \times 8+4}$ | $T_{(N-2) \times 8+3}$ | $T_{(N-2) \times 8+2}$ | $T_{(N-2) \times 8+1}$ | $T_{(N-2) \times 8}$ | Oct N | user plane protocol stack control plane protocol stack user plane protocol stack for CA user plane protocol stack for DC

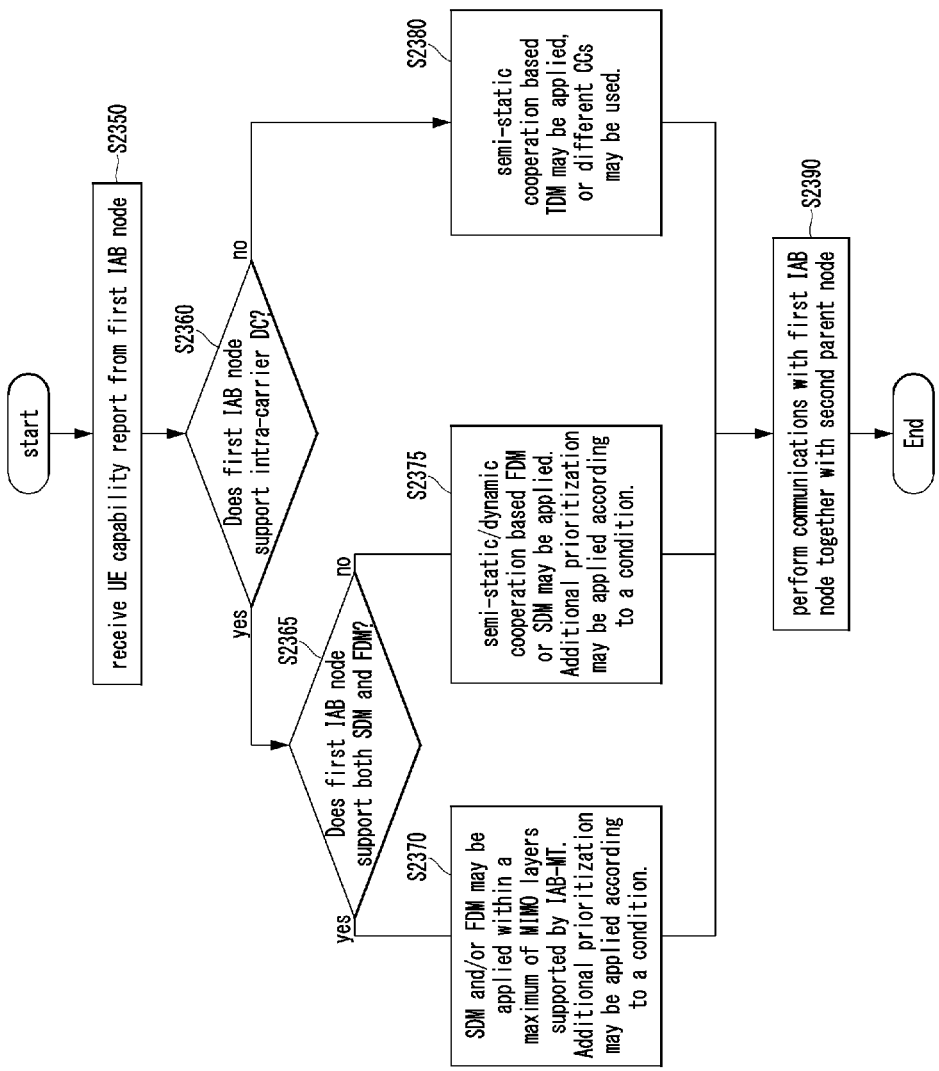

METHOD AND APPARATUS FOR DUAL CONNECTIVITY MANAGEMENT IN WIRELESS COMMUNICATION SYSTEM

CROSS-REFERENCE TO RELATED APPLICATIONS

This application claims priority to Korean Patent Applications No. 10-2021-0003640 filed on Jan. 11, 2021 and No. 10-2022-0004332 filed on Jan. 11, 2022 with the Korean Intellectual Property Office (KIPO), the entire contents of which are hereby incorporated by reference.

BACKGROUND

1. Technical Field

The present disclosure relates to a technique for dual connectivity management in a wireless communication system, and more particularly, to a technique for dual connectivity management in a wireless communication system to which an integrated access and backhaul (IAB) network is applied.

2. Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

In the communication technologies for the 5G or later generation, a higher data rate, larger communication capacity, lower latency, wider coverage, and the like may be required than in the communication technologies of the previous generations. In order to achieve such the requirements, an integrated access and backhaul (IAB) network technology is being studied. An IAB node constituting the IAB network may be composed of two elements: a distributed unit (i.e., IAB-DU) and a mobile terminal (i.e., IAB-MT). In addition, an IAB node may configure a dual connectivity (DC) with a parent node or a child node.

In an exemplary embodiment of the communication system supporting the 5G wireless communication, the DC may be operated based on a multi-carrier system based on controllers which exist in different physical locations or are independent from each other. In this case, the DC may be designed assuming a non-ideal backhaul (BH). The communication system may support inter-band DC that does not require resource allocation cooperation between cell groups (CGs).

Meanwhile, in order to maintain multiple parent nodes for improving reliability of IAB links when operating the IAB node, in addition to the inter-band DC, intra-band DC or intra-carrier DC, or the like may need to be supported. When an IAB node configures intra-band DCs or intra-carrier DCs with different parent nodes, a collision between resources of the different parent nodes may occur. In this reason, techniques for resolving the collision between resources that occurs as described above may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing dual connectivity management methods and apparatuses for effectively managing dual connectivity between communication nodes constituting an IAB network in a wireless communication system.

According to an exemplary embodiment of the present disclosure for achieving the above-described objective, A dual connectivity (DC) management method, performed by a first communication node constituting an integrated access and backhaul (IAB) network in a communication system, may comprise: receiving, from a first IAB node that is a lower node of the first communication node, a first capability report including information of DC-related capability of the first IAB node; based on the first capability report, identifying whether the first IAB node supports a multi transmission and reception point (multi-TRP) function; based on the first capability report, identifying whether the first IAB node supports an intra-carrier DC; and based on the identified whether the first IAB node supports the multi-TRP function and whether the first IAB node supports the intra-carrier DC, configuring a DC for the first IAB node together with a second communication node that is an upper node of the first IAB node.

The configuring may comprise: based on the identified whether the first IAB node supports the multi-TRP function and whether the first IAB node supports the intra-carrier DC, identifying one or more DC schemes applicable to the first IAB node; and configuring a DC according to one of the one or more DC schemes identified as applicable to the first IAB node for the first IAB node.

In the identifying of the one or more DC schemes, when the first IAB node does not support the intra-carrier DC, a DC in which radio resources are time division multiplexed (TDMed) based on semi-static coordination with the second communication node, or a DC in which the first communication node and the second communication node use different component carriers (CCs) may be determined as applicable to the first IAB node.

In the identifying of the one or more DC schemes, when the first IAB node does not support the multi-TRP function and supports the intra-carrier DC, a DC in which radio resources are frequency division multiplexed (FDMed) based on semi-static coordination or dynamic coordination with the second communication node, a DC in which the radio resources are TDMed based on semi-static coordination with the second communication node, or a DC in which the first communication node and the second communication node use different CCs may be determined as applicable to the first IAB node.

In the identifying of the one or more DC schemes, when the first IAB node supports the multi-TRP function and supports the intra-carrier DC, a DC in which radio resources are spatial division multiplexed (SDMed), a DC in which the radio resources are FDMed, a DC in which the radio resources are TDMed, or a DC in which the first communication node and the second communication node use different CCs may be determined as applicable to the first IAB node.

According to another exemplary embodiment of the present disclosure for achieving the above-described objective, a dual connectivity (DC) management method, performed by a first communication node constituting an integrated access and backhaul (IAB) network in a communication system, may comprise: transmitting, to a second communication node and a third communication node which are upper nodes of the first communication node, a first capability report including information on DC-related capability of the first communication node; based on the information included in the first capability report, receiving, from the second and third communication nodes, information on a DC configured for the first communication node; and performing communication with the second and third communication nodes based on the configured DC, wherein the first capability report includes at least one of information indicating whether the first IAB node supports multi transmission and reception point (multi-TRP) function and information indicating whether the first IAB node supports intra-carrier DC.

When the first communication node does not support the intra-carrier DC, the configured DC may correspond to one of a DC in which radio resources are time division multiplexed (TDMed) based on semi-static coordination with the third communication node or a DC in which the second communication node and the third communication node use different component carriers (CCs).

When the first communication node does not support the multi-TRP function and supports the intra-carrier DC, the configured DC may correspond to one of a DC in which radio resources are frequency division multiplexed (FDMed) based on semi-static coordination or dynamic coordination with the third communication node, a DC in which the radio resources are TDMed based on semi-static coordination with the third communication node, or a DC in which the second communication node and the third communication node use different CCs.

When the first communication node supports the multi-TRP function and supports the intra-carrier DC, the configured DC may correspond to one of a DC in which radio resources are spatial division multiplexed (SDMed), a DC in which the radio resources are FDMed, a DC in which the radio resources are TDMed, or a DC in which the second communication node and the third communication node use different CCs.

The performing of communication with the second and third communication nodes may comprise: when a collision occurs at least partially between a resource of the second communication node and a resource of the third communication node, selecting a resource to be used for signal transmission/reception from the resource in which the collision occurs; and performing communication with the second communication node or the third communication node through the selected resource.

The selecting may comprise: when a physical cell identifier (PCI) corresponding to the resource of the second communication node is identical to a PCI corresponding to the resource of the third communication node, comparing the resource of the second communication node with the resource of the third communication node based on cell group indexes corresponding to the respective resources; and selecting one of the resource of the second communication node and the resource of the third communication node based on a result of the comparison based on the cell group indexes.

The selecting may comprise: comparing the resource of the second communication node with the resource of the third communication node based on timings at which signals corresponding to the respective resources start in a time domain; and selecting one of the resource of the second communication node and the resource of the third communication node based on a result of the comparison based on the timings.

The selecting may comprise: comparing the resource of the second communication node with the resource of the third communication node based on positions at which signals corresponding to the respective resources start in a frequency domain; and selecting one of the resource of the second communication node and the resource of the third communication node based on a result of the comparison based on the positions.

According to yet another exemplary embodiment of the present disclosure for achieving the above-described objective, a first communication node constituting an integrated access and backhaul (IAB) network in a communication system may comprise: a processor; a memory electronically communicating with the processor; and instructions stored in the memory, wherein when executed by the processor, the instructions cause the first communication node to: transmit, to a second communication node and a third communication node which are upper nodes of the first communication node, a first capability report including information on DC-related capability of the first communication node; based on the information included in the first capability report, receive, from the second and third communication nodes, information on a DC configured for the first communication node; and perform communication with the second and third communication nodes based on the configured DC, wherein the first capability report includes information indicating whether the first IAB node supports intra-carrier DC.

When the first communication node does not support the intra-carrier DC, the configured DC may correspond to one of a DC in which radio resources are time division multiplexed (TDMed) based on semi-static coordination with the third communication node or a DC in which the second communication node and the third communication node use different component carriers (CCs).

The first capability report may further include information indicating whether the first IAB node supports multi transmission and reception point (multi-TRP) function, and when the first communication node does not support the multi-TRP function and supports the intra-carrier DC, the configured DC may correspond to one of a DC in which radio resources are frequency division multiplexed (FDMed) based on semi-static coordination or dynamic coordination with the third communication node, a DC in which the radio resources are TDMed based on semi-static coordination with the third communication node, or a DC in which the second communication node and the third communication node use different CCs.

The first capability report may further include information indicating whether the first IAB node supports multi-TRP function, and when the first communication node supports the multi-TRP function and supports the intra-carrier DC, the configured DC may correspond to one of a DC in which radio resources are spatial division multiplexed (SDMed), a DC in which the radio resources are FDMed, a DC in which the radio resources are TDMed, or a DC in which the second communication node and the third communication node use different CCs.

The first capability report may further include information indicating whether the first IAB node supports SDM and information indicating whether the first IAB node supports FDM, and when the first communication node supports the intra-carrier DC and supports one of the SDM or the FDM, the configured DC may correspond to one of a DC in which radio resources are multiplexed by a multiplexing scheme, among the SDM and the FDM, which is supported by the first IAB node, based on semi-static coordination or dynamic coordination with the third communication node, a DC in which the radio resources are TDMed based on semi-static coordination with the third communication node, or a DC in which the second communication node and the third communication node use different CCs.

The first capability report further may include information indicating whether the first IAB node supports SDM and information indicating whether the first IAB node supports FDM, and when the first communication node supports the intra-carrier DC and supports both of the SDM and the FDM, the configured DC may correspond to one of a DC in which radio resources are SDMed, a DC in which the radio resources are FDMed, a DC in which the radio resources are TDMed, or a DC in which the second communication node and the third communication node use different CCs.

In the performing of communication with the second and third communication nodes, the instructions may further cause the first communication node to: when a collision occurs at least partially between a resource of the second communication node and a resource of the third communication node, select a resource to be used for signal transmission/reception from the resource in which the collision occurs; and perform communication with the second communication node or the third communication node through the selected resource.

According to an embodiment exemplary of the present disclosure, dual connectivity (DC) between an IAB node and one or more upper nodes of the IAB node constituting an IAB network in a communication system can be efficiently configured. The IAB node may transmit, to the upper nodes, a capability report including information indicating capability-related information, such as whether or not to support a multi-TRP function, whether or not to support intra-carrier DC, and/or the like. The upper nodes of the IAB node may identify the capability-related information of the IAB node based on the capability report transmitted from the IAB node. The upper nodes of the IAB node may configure the dual connectivity in a scheme most suitable for the IAB node, based on the identified capability-related information of the IAB node. Accordingly, reliability, robustness, and the like of IAB links constituting the IAB network can be improved.

BRIEF DESCRIPTION OF DRAWINGS

FIG. 10 is a conceptual diagram illustrating an exemplary embodiment of a TCI state activation/deactivation MAC CE in a communication system.

FIGS. 23A and 23B are flowcharts illustrating exemplary embodiments of an intra-carrier DC configuration method in a communication system.

DETAILED DESCRIPTION OF THE EMBODIMENTS

Figure 1:
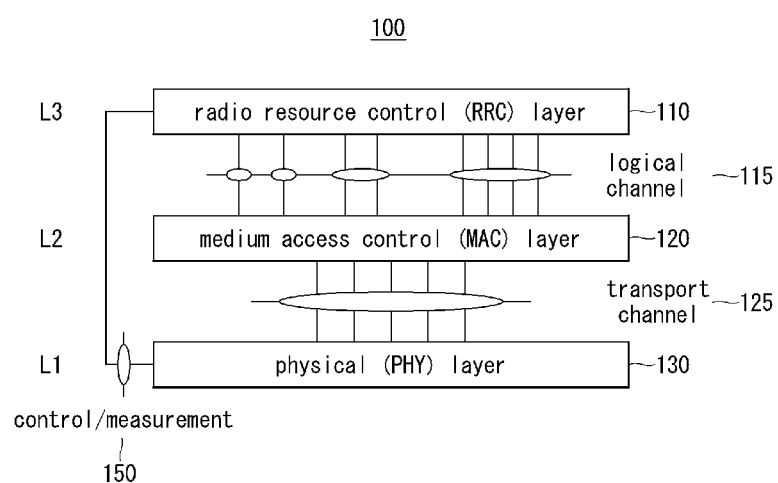
FIG. 1 is a conceptual diagram illustrating an exemplary embodiment of a radio interface protocol structure in a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a radio interface protocol structure in a communication system.

Referring to FIG. 1, an exemplary embodiment of a radio interface protocol structure 100 of a communication system may be configured to include a radio resource control (RRC) layer 110, a medium access control (MAC) layer 120, a physical (PHY) layer 130, and the like. An exemplary embodiment of the radio interface protocol structure 100 shown in FIG. 1 may correspond to various exemplary embodiments of interfaces such as an interface between a terminal and a base station, an interface between an IAB-node distributed unit (IAB-DU) and an IAB-node mobile terminal (IAB-MT) of an integrated access backhaul (IAB) network, an interface between an IAB-DU and a lower node, an interface between an IAB-MT and an upper node, an interface between a plurality of terminals, and the like.

In the vicinity of the PHY layer 130, the RRC layer 110, and the MAC layer 120, and the like may be disposed above the PHY layer 130. For example, the MAC layer 120 may be disposed above the PHY layer 130. The RRC layer 110 may be disposed above the MAC layer 120.

The MAC layer 120 may be connected to a higher layer (e.g., RRC layer 110) through logical channels 115. The PHY layer 130 may be connected to the higher MAC layer 120 through transport channels 125. The PHY layer 130 may transmit and receive control information or measurement information 150 to and from the RRC layer 110.

The PHY layer 130 may be referred to as a 'layer 1' or L1'. The MAC layer 120 may be referred to as a 'layer 2' or L2'. The RRC layer 110 may be referred to as a 'layer 3' or L3'. The RRC layer 110 and the MAC layer 120 may be collectively referred to as the 'higher layer'.

In the present disclosure, 'L1 signaling' refers to signaling such as downlink control information (DCI) transmitted on a physical downlink control channel (PDCCH), uplink control information (UCI) transmitted on a physical uplink control channel (PUCCH), and sidelink control information (SCI) transmitted on a physical sidelink control channel (PSCCH), which are channels of the PHY layer 130. Similarly, in the present disclosure, 'higher layer signaling' may include L2 signaling transmitted through a MAC control element (CE), L3 signaling transmitted through RRC signaling, and the like. Although omitted in FIG. 1 for convenience of description, information that can be included in an interface between base stations, or an interface (e.g., F1, next generation (NG) interfaces, etc.) between base station components such as a distributed unit (DU) and a central unit (CU) may also be collectively referred to as higher layer signaling as well as the L2 signaling or L3 signaling.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is merely an example for the convenience of description, and exemplary embodiments of the numerologies used in the communication system may not be limited thereto. Each numerology $\mu$ may correspond to information of a subcarrier spacing (SCS) $\Delta f$ and a cyclic prefix (CP). The terminal may identify a numerology $\mu$ and a CP value applied to a downlink bandwidth part (BWP) or an uplink BWP based on higher layer parameters such as subcarrierSpacing, cyclicPrefix, and/or the like.

Figure 2:
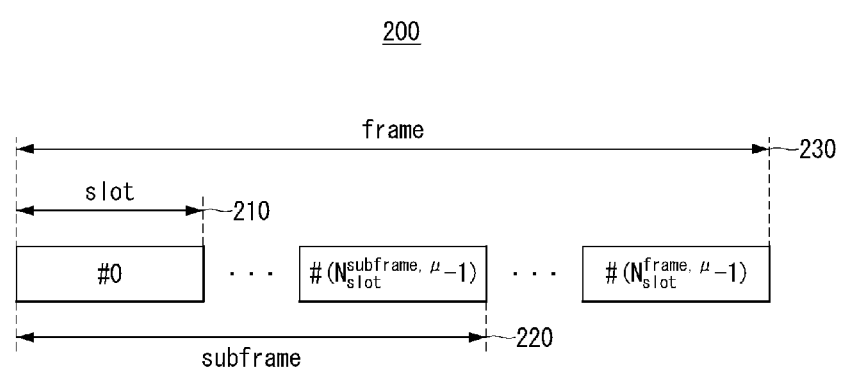
FIG. 2 is a conceptual diagram illustrating an exemplary embodiment of time resources in which radio signals are transmitted in a communication system.

FIG. 2 is a conceptual diagram illustrating an exemplary embodiment of time resources in which radio signals are transmitted in a communication system.

Referring to FIG. 2, time resources in which radio signals are transmitted in a communication system 200 may be represented with a frame 220 comprising one or more ($N_{slot}^{frame,\mu}/N_{slot}^{subframe,\mu}$) subframes, a subframe 220 comprising one or more ($N_{slot}^{subframe,\mu}$) slots, and a slot 210 comprising 14 ($N_{symb}^{slot}$) OFDM symbols. In this case, according to a configured numerology, as the values of $N_{symb}^{slot}$, $N_{slot}^{subframe,\mu}$, and $N_{slot}^{frame,\mu}$, values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the 5G NR communication system, the frame 230 may have a length of 10 ms, and the subframe 220 may have a length of 1 ms. Each frame 230 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

Figure 3:
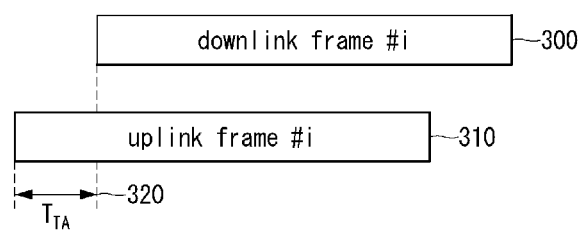
FIG. 3 is a conceptual diagram illustrating a time difference between a reception timing of an i-th downlink frame and a transmission timing of an i-th uplink frame in an exemplary embodiment of a communication system.

FIG. 3 is a conceptual diagram illustrating a time difference between a reception timing of an i-th downlink frame and a transmission timing of an i-th uplink frame in an exemplary embodiment of a communication system.

Referring to FIG. 3, a time difference between a reception timing of an i-th downlink frame 300 and a transmission timing of an i-th uplink frame 310 may be a $T_{TA}$ 320. Accordingly, the terminal may start transmission of the uplink frame #i 310 at a time earlier by $T_{TA}$ compared to the reception timing of the downlink frame #i 300. $T_{TA}$ may be referred to as a timing advance or timing adjustment TA. The base station may instruct the terminal to change a value of $T_{TA}$ through higher layer signaling or L1 signaling, and may configure the terminal to apply $T_{TA}$ in a manner defined as $T_{TA}=(N_{TA}+N_{TA,offset})T_c$. In the case of 5G NR, $T_c$ may be defined as $$T_c = \frac{1}{(\Delta f_{max} \cdot N_f)},$$

$\Delta f_{max}$ may be defined as $\Delta f_{max}=480$ kHz, $N_f$ may be defined as $N_f=4096$, $N_{TA,offset}$ may be a value set by L3 signaling, and $N_{TA}$ may be a value determined by Equation 1 below by a value $T_A$ indicated by L2 signaling.

[Equation 1]

$$N_{TA} = \begin{cases} T_A \cdot 16 \cdot \frac{64}{2^{\mu}} & \text{(for random access response)} \\ N_{TA\_old} + ((T_A - 31) \cdot 16 \cdot 64/2^{\mu}) & \text{(for other cases)} \end{cases}$$

Here, the description on $N_{TA,offset}$ and $N_{TA}$ may be an example for a specific situation, and various other options may exist, but in order not to obscure the gist of the description, all possible cases may not be listed in the present disclosure.

Figure 4:
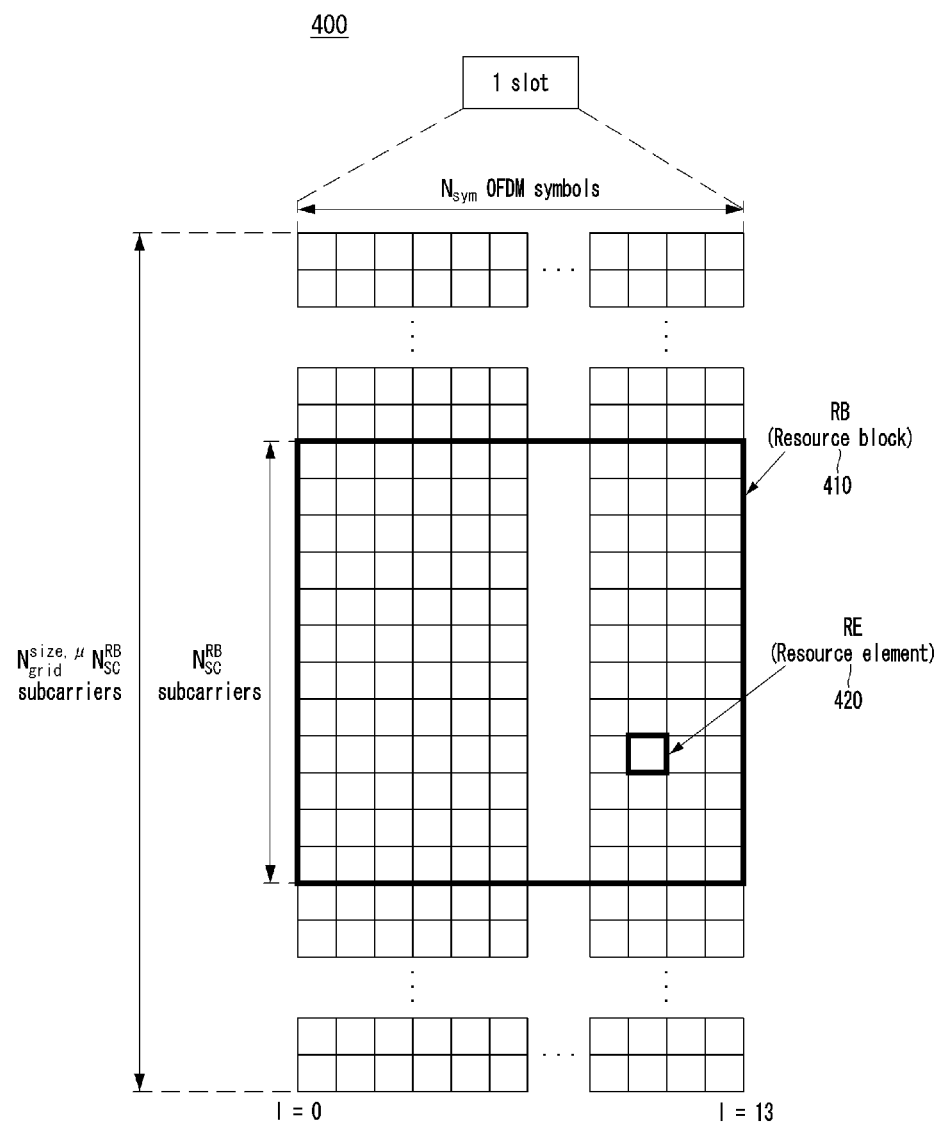
FIG. 4 is a conceptual diagram illustrating an exemplary embodiment of a time/frequency resource grid of a communication system.

FIG. 4 is a conceptual diagram illustrating an exemplary embodiment of a time/frequency resource grid of a communication system.

Referring to FIG. 4, a time/frequency resource grid 400 of a communication system may have $N_{grid}^{size,\mu} N_{sc}^{RB}$ subcarriers and $N_{slot}^{subframe,\mu}$ OFDMs. The resource grid may be defined for each numerology and each carrier. In this case, $N_{grid}^{start,\mu}$ may mean a position of a common resource block (CRB) indicated by higher layer signaling. $N_{grid}^{size,\mu}$ may mean the number of resource blocks (RBs) starting from the CRB, that is, a carrier bandwidth. $N_{grid}^{start,\mu}$ and/or $N_{grid}^{size,\mu}$ may have different values for each link direction (e.g., uplink, downlink, or sidelink) or for each numerology Here, the numerology μ may be referred to by other terms, such as a SCS configuration, if necessary.

Each element in the resource grid for an antenna port p and a SCS configuration μ may be referred to as a resource element (RE) 420, and may be uniquely defined for each position $(k, l)_{p,\mu}$. In this case, k may be a frequency axis index, and l may indicate a symbol position on the time axis. $RE(k, l)_{p,\mu}$ may correspond to a physical resource used to transmit a physical channel or a signal complex value $a_{k,l}^{(p,\mu)}$. One RB 410 may be defined as consecutive $N_{sc}^{RB}=12$ subcarriers on the frequency axis.

The 5G NR communication system has introduced the concept of BWPs in order to reduce high implementation complexity and power consumption of terminals due to the widened carrier bandwidth compared to the 3G/4G communication system. One BWP may be composed of contiguous CRBs, a starting RB position $N_{BWP,i}^{start,\mu}$ of the BWP and the number $N_{BWP,i}^{size,\mu}$ of RBs constituting the BWP may satisfy Equations 2 and 3.

$$N_{grid,x}^{start,\mu} \leq N_{BWP,i}^{start,\mu} < N_{grid,x}^{start,\mu} + N_{grid,x}^{size,\mu} \quad \text{[Equation 2]}$$

$$N_{grid,x}^{start,\mu} < N_{BWP,i}^{start,\mu} + N_{BWP,i}^{size,\mu} \leq N_{grid,x}^{start,\mu} + N_{grid,x}^{size,\mu} \quad \text{[Equation 3]}$$

The terminal may be configured with up to four downlink BWPs within one component carrier (CC), and only one downlink BWP may be activated at a time. The terminal may not receive a physical downlink shared channel (PDSCH), a physical downlink control channel (PDCCH), a channel state information reference signal (CSI-RS), or the like outside the activated BWP.

The terminal may be configured with up to four uplink BWPs within one CC, and only one uplink BWP may be activated at a time. The terminal may not transmit a physical uplink shared channel (PUSCH), a physical uplink control channel (PUCCH), a sounding reference signal (SRS), or the like outside the activated BWP.

Figure 5:
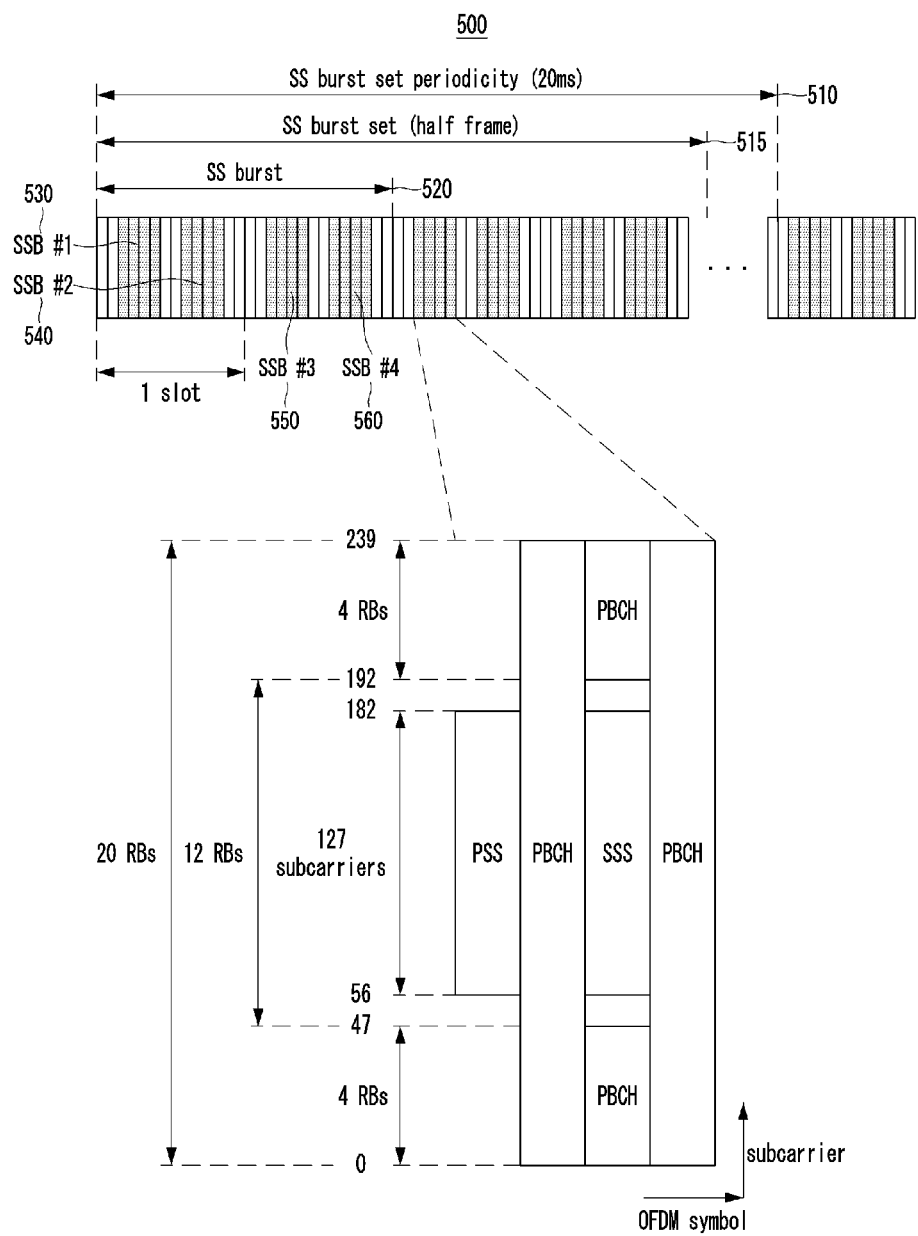
FIG. 5 is a conceptual diagram illustrating an exemplary embodiment of a synchronization signal and physical broadcast channel (SS/PBCH) block or synchronization signal block (SSB) of a communication system.

FIG. 5 is a conceptual diagram illustrating an exemplary embodiment of a synchronization signal and physical broadcast channel (SS/PBCH) block or synchronization signal block (SSB) of a communication system.

Referring to FIG. 5, an SS/PBCH block 500 of a communication system may be configured with a primary synchronization signal (PSS) transmitted in 127 subcarriers in the middle of a first OFDM symbol, a secondary synchronization signal (SSS) transmitted in 127 subcarriers in the middle of a third OFDM symbol, and a physical broadcast channel (PBCH) transmitted in second, third, and fourth OFDM symbols. The PBCH occupying the widest bandwidth may be transmitted over 20 RBs, which may be 3.6 MHz based on 15 kHz SCS. The base station transmits one SSB by applying the same beam. When the number of base station antennas increases or it is necessary to operate multiple beams such as applying one or more analog beams for high frequency support, the base station may support a multi-beam operation by transmitting multiple SSBs. Here, the term 'beam' may be expressed in various terms such as a transmission precoding or a spatial transmission (TX) filter when applied in practice. However, in order not to obscure the gist of the description, 'beam' is used hereinafter as a unified term.

For example, the base station may transmit a plurality of SSBs 530, 540, 550, and 560 to represent a plurality of beams (e.g., beam #1, beam #2, beam #3, beam #4). In this case, it may be possible that one or more SSBs are transmitted within one slot according to a pattern predetermined according to each numerology. The SSBs 530, 540, 550, and 560 to which different beams are applied may be bundled into one set by being included in an SS burst 520. The terminal may assume a half-frame window having a length of 5 ms at the time of monitoring SSBs. An SS burst set 515 configured by higher layer signaling within a half-frame may include one or more SS bursts 520. If RRC configuration values are unknown or unavailable when performing initial access (IA), the terminal may receive or measure the SSBs assuming that a periodicity of the SS burst set 510 is 20 ms. As an example, the terminal may receive SSB(s) with reference to SSB configuration information identical or similar to that shown in Table 4.

TABLE 4

| | |
|---|---|
| MIB ::= | SEQUENCE { |
|   systemFrameNumber | |
|   subCarrierSpacingCommon | |
|   ssb-SubcarrierOffset | // SSB subcarrier offset (0~15) |
|   dmrs-TypeA-Position | |
|   pdcch-ConfigSIB1 | |
|   cellBarred | |
|   intraFreqReselection | |
|   spare | |
| } | |
| MeasObjectNR ::= | SEQUENCE { |
|   ssbFrequency | // Absolute Radio Frequency Channel Number (ARFCN) of SSB |
|   ssbSubcarrierSpacing | // Numerology of SSB |
|   smtc1 | |
|     // first SSB measurement timing configuration (SMTC) configured with reference to SSB-MTC | |
|   smtc2 // Second SMTC configured with reference to SSB-MTC | |
|   ... | |
|   ... | |

TABLE 4-continued

```
}
SSB-Index                              // SSB index within SS-burst
SSB-MTC ::=                            SEQUENCE {
    // timing occasion configuration for SSBs to be measured by terminal
    periodicityAndOffset               CHOICE {
    sf5                                // offset when a SSB reception window has a legnth of 5 subframes
    sf10                               // offset when a SSB reception window has a legnth of 10 subframes
    sf20                               // offset when a SSB reception window has a legnth of 20 subframes
    sf40                               // offset when a SSB reception window has a legnth of 40 subframes
    sf80                               // offset when a SSB reception window has a legnth of 80 subframes
    sf160                              // offset when a SSB reception window has a legnth of 160 subframes
    },
    duration                           // a lengh of a SSB recepion window (number of subframes)
}
SSB-MTC2 ::=                           SEQUENCE {
    pci-List                           // physical cell IDs (PCIs) following the SMTC configuration
    periodicity                        // SMTC periodicity (number of subframes)
}
```

Figure 6:
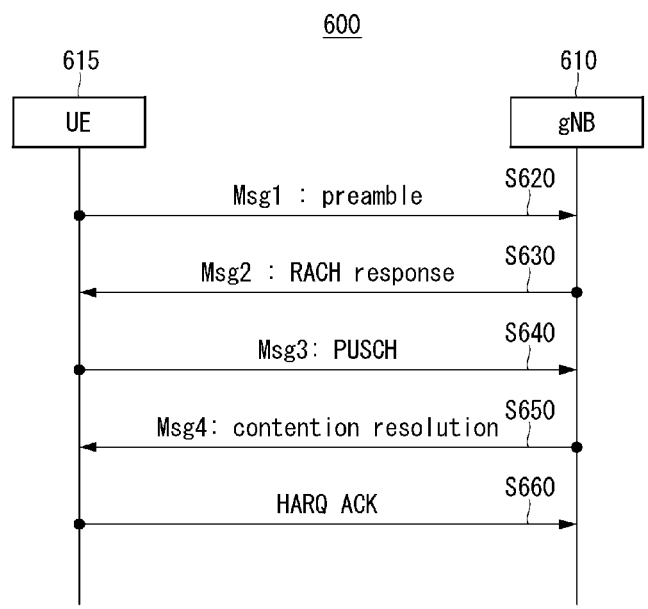
FIG. 6 is a sequence chart illustrating an exemplary embodiment of a random access procedure in a communication system.

FIG. 6 is a sequence chart illustrating an exemplary embodiment of a random access procedure in a communication system.

Referring to FIG. 6, in a random access procedure of a communication system 600, a terminal 615 may transmit a physical random access channel (PRACH) preamble, and the PRACH preamble may be referred to as 'Msg1' (S620). Through a transmission of the PRACH preamble, random access-radio network temporary identifier (RA-RNTI) may be determined. In this case, the RA-RNTI may be calculated by Equation 4.

$$RA\text{-}RNTI = l + s\_id + 14 \times t\_id + 14 \times 80 \times f\_id + 14 \times 80 \times 8 \times ul\_carrier\_id \quad \text{[Equation 4]}$$

In Equation 4, s_id may be an index of a first OFDM symbol of a corresponding PRACH occasion (e.g. $0 \leq s\_id < 14$), t_id may be an index of a first slot of the PRACH occasion within a system frame (e.g., $0 \leq t\_id < 80$), f_id may be an index of the PRACH occasion in the time domain (e.g., $0 \leq f\_id < 8$), and ul_carrier_id may be a value according to a uplink carrier type used for the preamble transmission (e.g., 0 indicates a regular uplink carrier, 1 indicates a supplementary uplink carrier).

Before the terminal transmits the PRACH preamble, the terminal may have at least part of the following information by receiving system information from the base station on a PBCH or receiving RRC signaling from the base station.
 PRACH preamble format
 Time/frequency resource information for RACH transmission
 Index for a logical root sequence table
 Cyclic shift $N_{CS}$
 Set type (unrestricted, restricted set A, restricted set B)

Referring again to FIG. 6, as a second procedure, the base station may provide a random access response (RAR) to the terminal, which may be referred to as 'Msg2' (S630). Particularly, the base station may calculate an RA-RNTI based on Equation 4 when the base station receives the PRACH preamble from the terminal in the step S620, and may transmit a DCI by using the RA-RNTI for scrambling. The terminal may monitor a PDCCH scrambled with the RA-RNTI in a period included in a RACH response window configured by the higher layer in a type 1 PDCCH common search space (CSS). The terminal may receive the PDCCH (or the DCI transmitted from the base station through the PDCCH), and may decode the PDCCH (or the DCI). If the terminal successfully decodes the PDCCH (or the DCI), the terminal may decode a PDSCH including the RAR transmitted from the base station in the step S630. If the terminal succeeds in decoding the RAR, the terminal may identify whether an RA preamble identifier (RAPID) in the RAR matches a RAPID pre-allocated to the terminal.

As a third procedure, the terminal may transmit a PUSCH to the base station, which may be referred to as 'Msg3' (S640). To this end, the terminal may determine whether to apply a transform precoding to transmission of the PUSCH (i.e., whether to apply discrete Fourier transform (DFT)-s-OFDM-based transmission or OFDM-based transmission) based on a higher layer parameter (e.g., msg3-transform-Precoding). Also, the terminal may determine a SCS to be used for transmission of the PUSCH according to a higher layer parameter (e.g., msg3-scs). In this case, the PUSCH of Msg3 may be transmitted through a serving cell to which the PRACH has been transmitted.

As a fourth procedure, the base station may transmit a contention resolution message to the terminal, which may be referred to as 'Msg4' (S650). The terminal may start a timer for receiving the contention resolution message, and may monitor a PDCCH scrambled with a temporary cell-RNTI (TC-RNTI) in the type 1 PDCCH CSS until the timer expires. If the terminal successfully decodes the PDCCH, the terminal may decode a corresponding PDSCH including a MAC CE, and set the TC-RNTI as a cell-RNTI (C-RNTI). After successfully decoding the Msg4, the terminal may report a hybrid automatic repeat request (HARQ) positive-acknowledgement (ACK) thereto to the base station, and may report whether the RACH procedure is successful to the base station (S660).

The RACH occasion (RO) may mean a time and frequency resource specified for reception of a RACH preamble, and the terminal may use the RO for PRACH transmission. As described above, in the 5G NR, multiple SSBs may be associated with different beams for the multi-beam operation, and the terminal may measure the multiple SSBs, and select an optimal SSB (i.e., optimal beam) based on one of various schemes such as a reference signal received power (RSRP), reference signal received quality (RSRQ), signal-to-noise ratio (SNR), signal-to-noise/interference ratio (SNIR), or the like. Thereafter, the terminal may determine a beam (i.e., TX spatial filter) to be used for PRACH transmission based on the beam (i.e., RX spatial filter) used when receiving the optimal SSB. In this case, a relationship between SSB(s) and RO(s) may be established for the purpose of allowing the base station or the network to know which SSB (i.e., beam) the terminal has selected. Through such the relationship, the base station may know the SSB (i.e., beam) selected by the terminal based on the RO in which the terminal has transmitted the PRACH. For example, the relationship between SSB(s) and RO(s) may be determined with reference to the higher layer configurations identical or similar to those shown in Table 5.

perRACH-OccasionAndCB-PreamblesPerSSB=one), the N different SSBs 710-1 to 710-*n* may be mapped to the N different ROs 720-1 to 720-*n* on a one-to-one basis.

Figure 8:
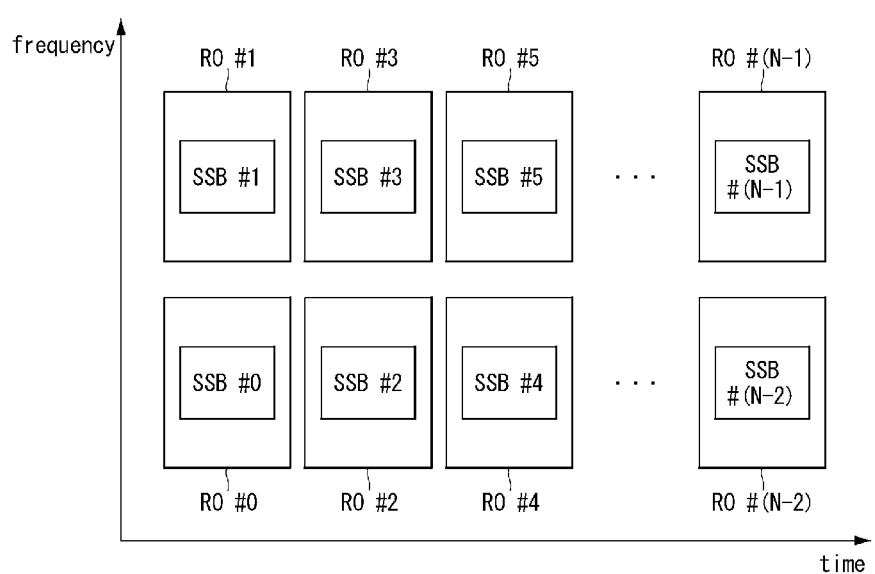
FIG. 8 is a conceptual diagram illustrating a second exemplary embodiment of SSB-RO association according to RACH configuration in a communication system.

FIG. 8 is a conceptual diagram illustrating a second exemplary embodiment of SSB-RO association according to RACH configuration in a communication system.

Referring to FIG. 8, in an SSB-RO mapping relation according to the RACH configurations, in a first frequency band, SSBs 810-1, 810-3, 810-5, . . . , and 810-(*n*−1) having time resources which are separated from each other may be mapped to ROs 820-1, 820-3, 820-5, . . . , and 820-(*n*−1) having time resources which are separated from each other on a one-to-one basis. In addition, in a second frequency

TABLE 5

```
RACH-ConfigCommon ::=              SEQUENCE {
  rach-ConfigGeneric              // set of RACH parameters
  totalNumberOfRA-Preambles       // the total number of RACH preambles (1~63)
  ssb-perRACH-OccasionAndCB-PreamblesPerSSB    CHOICE {
    oneEighth                    // The number of preambles per SSB when one SSB is associated with eight ROs
    oneFourth                    // The number of preambles per SSB when one SSB is associated with four ROs
    oneHalf                      // The number of preambles per SSB when one SSB is associated with two ROs
    one                          // The number of preambles per SSB when one SSB is associated with one RO
    two                          // The number of preambles per SSB when two SSBs are associated with one RO
    four                         // The number of preambles per SSB when four SSBs are associated with one RO
    eight                        // The number of preambles per SSB when eigth SSBs are associated with one RO
    sixteen                      // The number of preambles per SSB when sixteen SSBs are associated with one RO
  }
  groupBconfigured                SEQUENCE {
    ra-Msg3SizeGroupA            // The size of a transport block fro contention-based RA of Group A
    messagePowerOffsetGroupB     // Threshold for preamble selection
    numberOfRA-PreamblesGroupA      // The number of CB preambles per SSB of Group A
  }
  ra-ContentionResolutionTimer   // Initial value of a contention resolution timer
  rsrp-ThresholdSSB              // Threshold for selection of an SSB and an associated RACH resource
  rsrp-ThresholdSSB-SUL          // Threshold for selection of an SSB and an associated RACH resource in
SUL
  prach-RootSequenceIndex          CHOICE { // RACH root sequence index
    l839
    l139
  },
  msg1-SubcarrierSpacing         // SCS for Msg1 transmission
  restrictedSetConfig            // one of {unrestricted, restricted set A, restricted set B}
  msg3-transformPrecoder         // whether to apply transform precoding in transmisison of Msg3
  ...
}
RACH-ConfigGeneric ::=            SEQUENCE {
  prach-ConfigurationIndex       // indicates a preamble format, etc.
  msg1-FDM                       // The number of ROs FDMed at a time
  msg1-Frequency Start           // frequency-axis offset of the lowest RO with reference to PRB 0
  zeroCorrelationZoneConfig      // N-CS configuration
  preambleReceivedTargetPower    // Target power level at a network receiving node
  preambleTransMax
     // The maximum number of RA preambe transmissions performed unitl declaration of an RA
failure
  powerRampingStep               // Power ramping step
  ra-Response Window             // Msg2 (RAR) window length (number of slots)
  ...,
}
```

Figure 7:
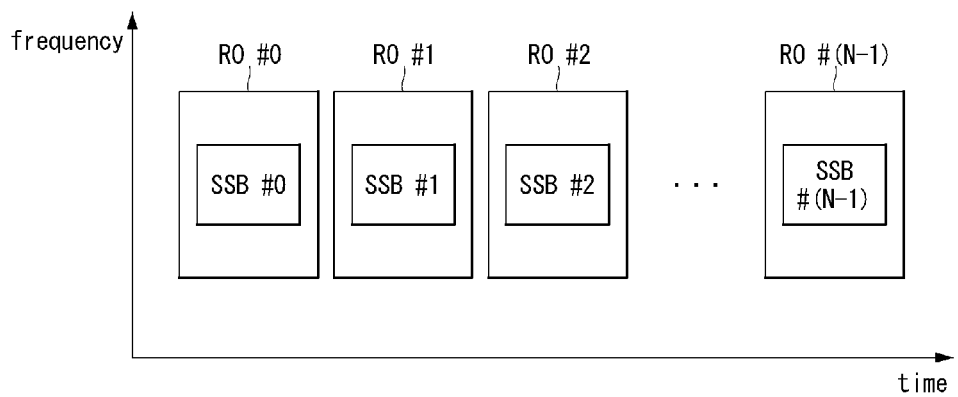
FIG. 7 is a conceptual diagram illustrating a first exemplary embodiment of SSB-RO association according to RACH configuration in a communication system.

FIG. 7 is a conceptual diagram illustrating a first exemplary embodiment of SSB-RO association according to RACH configuration in a communication system.

Referring to FIG. 7, in an SSB-RO mapping relation according to the RACH configurations, in a certain frequency band, N SSBs 710-1 to 710-*n* having time resources which are separated from each other may be mapped to ROs 720-1 to 720-*n* having time resources which are separated from each other on a one-to-one basis. For example, if a higher layer parameter msg1-FDM is set to 1 (i.e., msg1-FDM=one) and a higher layer parameter ssb-perRACH-OccasionAndCB-PreamblesPerSSB is set to 1 (e.g., ssb-band, SSBs 810-2, 810-4, 810-6, . . . , and 810-*n* having time resources which are separated from each other may be mapped to ROs 820-2, 820-4, 820-6, . . . , and 820-*n* having time resources which are separated from each other on a one-to-one basis. For example, if the higher layer parameter msg1-FDM is set to 2 (i.e., msg1-FDM=two), and higher layer parameter ssb-perRACH-OccasionAndCB-PreamblesPerSSB is set to 2 (e.g., ssb-perRACH-OccasionAndCB-PreamblesPerSSB=two), the N different SSBs 810-1 to 810-*n* may be mapped to the N different ROs 820-1 to 820-*n* which are frequency division multiplexed (FDMed) in a frequency domain, on a one-to-one basis.

Meanwhile, the 5G NR communication system may support DCI formats shown in Table 6 based on Release-16.

TABLE 6

| DCI format | Usage |
|---|---|
| 0_0 | Used for scheduling a PUSCH within one cell |
| 0_1 | Used for scheduling one or more PUSCHs within one cell, or indicating downlink feedback information for a configured grant (CG) PUSCH (i.e., CG-DFI) |
| 0_2 | Used for scheduling a PUSCH within one cell |
| 1_0 | Used for scheduling a PDSCH within one cell |
| 1_1 | Used for scheduling a PDSCH within one cell or triggering a one-shot HARQ-ACK codebook feedback |
| 1_2 | Used for scheduling a PDSCH within one cell |
| 2_0 | Used for notifying a slot format, an available RB set, a channel occupancy time (COT) duration, and search space set group switching to a UE group |
| 2_1 | Used for notifying PRB(s) and OFDM symbol(s) assumed not to be intended to be used for transmission to a UE group |
| 2_2 | Used for transmission of a transmission power control (TPC) for a PUCCH and a PUSCH |
| 2_3 | Used for transmission of a TPC command group for SRS transmission by one or more UEs |
| 2_4 | Used for a UE to notify PRB(s) and OFDM symbol(s) for which UL transmission from the UE is cancelled to a UE group |
| 2_5 | Used for notifying availability of soft resources |
| 2_6 | Used for notifying power saving information outside a DRX active time to one or more UEs |
| 3_0 | Used for NR sidelink scheduling within one cell |
| 3_1 | Used for LTE sidelink scheduling within one cell |

A DCI may include downlink control information for one or more cells, and may be associated with one RNTI. The DCI may be encoded through the order of 1) information element multiplexing, 2) cyclic redundancy check (CRC) addition, 3) channel coding, and 4) rate matching, and decoding may also be performed in consideration of the above steps. In the above description, "a certain DCI is associated with one RNTI" may mean that CRC parity bits of the DCI are scrambled with the RNTI. Referring to Table 6, some DCI may include scheduling information of one or more PUSCHs for a certain cell.

For example, a CRC of the DCI format 0_1 may be scrambled with a C-RNTI, configured scheduling-RNTI (CS-RNTI), semi-persistent CSI RNTI (SP-CSI-RNTI), or modulation coding scheme cell RNTI (MCS-C-RNTI). The DCI format 0_1 may include at least one of the following information.

Identifier for DCI format (1 bit): Indicator indicating a UL DCI format, which is always set to 0 in the case of DCI format 0_1

Carrier indicator (0 or 3 bits): Indicator indicating a CC scheduled by the corresponding DCI DFI flag (0 or 1 bit): Configured grant downlink feedback information (CG-DFI) indicator.

If the DCI format 0_1 is used for CG-DFI indication (when the DFI flag is set to 1), at least one of the following fields may be used:

HARQ-ACK bitmap (16 bits), where the order of mapping HARQ process indexes within the bitmap is that the HARQ process indexes are mapped from the MSB to the LSB of the bitmap in ascending order. For each bit in the bitmap, a value of 1 indicates ACK, and a value of 0 indicates NACK.

TPC command for a scheduled PUSCH (2 bits)

All the remaining bits in the DCI format 0_1 are set to zero

If the DCI format 0_1 is not used for CG-DFI indication (when there is no DFI flag field or DFI flag field is set to 0), at least one of the following fields may be used:

UL/SUL indicator (0 or 1 bit): supplementary UL indicator.

Bandwidth part indicator (0, 1, or 2 bits): Indicator indicating a BWP to be activated among uplink BWPs configured for the terminal.

Frequency domain resource assignment: Indicator for allocating a frequency domain resource.

Time domain resource assignment: Indicator for allocating a time domain resource.

Frequency hopping flag (0 or 1 bit): Frequency axis hopping indicator

Modulation and coding scheme (5 bits)

New data indicator (NDI): Indicator indicating whether allocated data is new data or retransmission data.

Redundancy version (RV): Indicator indicating an RV value when channel coding is applied to allocated data HARQ process number (4 bits): Indicator indicating a HARQ process to be allocated to scheduled data TPC command for a scheduled PUSCH (2 bits): TPC indicator SRS resource indicator: Aperiodic SRS resource selection indicator Precoding information and number of layers: Indicator indicating precoding and the number of transport layers to be used in PUSCH transmission Antenna ports: Indicator for uplink antenna ports to be used for PUSCH transmission SRS request: Indicator indicating whether to transmit aperiodic SRS CSI request: Indicator indicating whether and how to report channel state information PTRS-DMRS association: Indicator indicating a relationship between an uplink phase-noise tracking reference signal (PTRS) antenna port and a demodulation reference signal (DMRS) antenna port DMRS sequence initialization: Indicator for a DMRS sequence initialization value during OFDM-based uplink transmission UL-SCH indicator: Indicator indicating whether or not an uplink shared channel (UL-SCH) is included in a PUSCH (a PUSCH that does not include a UL-SCH needs to include CSI)

Open-loop power control parameter set indication: Indicator indicating a set of open-loop power control (OPLC) parameter set Priority indicator: Uplink transmission priority indicator.

Invalid symbol pattern indicator: Indicator indicating whether to apply an invalid symbol pattern configured by a higher layer As another example, a CRC of the DCI format 1_1 may be scrambled with a C-RNTI, CS-RNTI, or MCS-C-RNTI, and the DCI format 1_1 may include at least one of the following information.

Identifier for DCI format (1 bit): Indicator indicating a DL DCI format, which is always set to 1 in the case of DCI format 1_1

Carrier indicator (0 or 3 bits): Indicator indicating a CC scheduled by the corresponding DCI Bandwidth part indicator (0, 1, or 2 bits): Indicator indicating a BWP to be activated among downlink BWPs configured for the terminal Frequency domain resource assignment: Indicator for allocating a frequency domain resource Time domain resource assignment: Indicator for allocating a time domain resource PRB bundling size indicator: Indicator indicating a type (i.e., static or dynamic) and a size of PRB bundling Rate matching indicator: Indicator indicating a rate matching pattern configured by a higher layer ZP CSI-RS trigger: Indicator for applying aperiodic zero-power (ZP) CSI-RS 'modulation and coding scheme', 'new data indicator', and 'redundancy version' fields for a transport block 1

'modulation and coding scheme', 'new data indicator', and 'redundancy version' fields for a transport block 2

HARQ process number: Indicator indicating a HARQ process to be allocated to scheduled data Downlink assignment index: DAI indicator for HARQ-ACK codebook generation in TDD operation.

TPC command for a scheduled PUCCH: Power control indicator for PUCCH transmission.

PUCCH resource indicator: Indicator indicating a PUCCH resource for transmitting HARQ-ACK information for an allocated PDSCH or a predetermined PDSCH set PDSCH-to-HARQ_feedback timing indicator: Indicator indicating a time axis offset between the allocated PDSCH and the PUCCH Antenna port(s): Indicator indicating antenna ports to be used for PDSCH transmission/reception Transmission configuration indication: Indicator indicating transmission configuration information (TCI) to be used for PDSCH transmission and reception SRS request: Indicator indicating whether to transmit aperiodic SRS DMRS sequence initialization: Indicator for a DMRS sequence initialization value used for PDSCH transmission and reception Priority indicator: PDSCH reception priority indicator As another example, certain DCI formats may be used to deliver the same control information to one or more terminals. For example, a CRC of the DCI format 2_3 may be scrambled with a transmit power control-sounding reference signal-RNTI (TPC-SRS-RNTI), and may include at least one of the following information.

Block number 1, Block number 2, . . . , Block number B: Indicators indicating resource regions to which the DCI format 2_3 is applied. A starting part of the block is configured by a higher layer parameter startingBitOfFormat2-3 or startingBitOfFormat2-3SUL-v1530.

When a terminal for which a higher layer parameter srs-TPC-PDCCH-Group is set to type A performs uplink transmission without a PUCCH and PUSCH or uplink transmission in which SRS power control is not tied to PUSCH power control, one block is configured by the higher layer, and the following fields are defined for the block.

SRS request (0 or 2 bits): Aperiodic SRS transmission indicator

TPC command number 1, TPC command number 2, . . . , TPC command number N: Indicators indicating uplink power control to be applied to a UL carrier indicated by a higher layer parameter cc-IndexInOneCC-Set.

When a terminal for which a higher layer parameter srs-TPC-PDCCH-Group is set to type B performs uplink transmission without a PUCCH and PUSCH or uplink transmission in which SRS power control is not tied to PUSCH power control, one or more blocks may be configured by the higher layer, and the following fields are defined for each block.

SRS request (0 or 2 bits): Aperiodic SRS transmission indicator.

TPC command (2 bits)

As another example, certain DCI formats may be used to deliver the same control information to one or more terminals. For example, a CRC of the DCI format 2_0 may be scrambled with an SFI-RNTI, and may be used for notifying information such as a slot format, a channel occupancy time (COT) duration, an available RB set, a search space set group switching, or the like. Specifically, the DCI format 2_0 may include at least one of the following information.

When a higher layer parameter slotFormatCombToAddModList is configured,

Slot format indicator 1, Slot format indicator 2, . . . , Slot format indicator N When a higher layer parameter availableRB-SetsToAddModList-r16 is configured, Available RB set indicator 1, Available RB set indicator 2, . . . , Available RB set indicator N1

When a higher layer parameter co-DurationsP erCellToAddModList-r 16 is configured, COT duration indicator 1, COT duration indicator 2, . . . , COT duration indicator N2

When a higher layer parameter searchSpaceSwitchTriggerToAddModList-r16 is configured, Search space set group switching flag 1, Search space set group switching flag 2, . . . , Search space set group switching flag M The size of the DCI format 2_0 may be set by higher layer signaling as one of 0 to 128 bits. For example, the DCI format 2_5 may be used to notify availability of soft-type resources of an IAB node. A CRC of the DCI format 2_5 may be scrambled with an availability indicator-RNTI (AI-RNTI), and may include the following information.

Availability indicator 1, Availability indicator 2, . . . , and Availability indicator N As the size of DCI format 2_5, one of values less than or equal to 128 bits may be set by higher layer signaling. The terminal may receive configuration information of a CORESET #0 and a search space #0, identical or similar to that shown in Table 7.

TABLE 7

| | |
|---|---|
| PDCCH-ConfigSIB1 ::= | SEQUENCE { |
| controlResourceSetZero | |
| searchSpaceZero | |
| } | |
| ControlResourceSetZero | // indicates a configuration value (0~15) of a CORESET #0 within an initial BWP |
| SearchSpaceZero | // indicates a configuration value (0~15) of a search space #0 within an initial BWP |

The terminal may refer to the following higher layer configurations for cell-specific PDCCH monitoring, identical or similar to those shown in Tables 8 to 9.

TABLE 8

| | |
|---|---|
| PDCCH-ConfigCommon ::= | SEQUENCE { |
| controlResourceSetZero | // indicates a configuration value (0~15) of a CORESET #0 within an initial BWP |
| commonControlResourceSet | |
| | // configure a common CORESET by referring to CORESET configuration |
| searchSpaceZero | // indicates a configuration value (0~15) of a search space #0 within an initial BWP |
| commonSearchSpaceList | // configures a search sapce to be used for cell-specific PDCCH monitoring by referring to up to four search space configurations |
| searchSpaceSIB1 | // search space configuration for SIB1 |
| searchSpaceOtherSystemInformation | // search space configuration for SIB2 or other SIBs |
| pagingSearchSpace | // search space configuration for paging |
| ra-SearchSpace | // search space configuration for random access procedure |
| ... | |
| } | |
| ControlResourceSet ::= | SEQUENCE { |
| controlResourceSetId | // CORESET ID (a value other than 0 is used) |
| frequencyDomainResources | // configuration of frequency resources of a CORESET |
| duration | // configuration of a time-axis length (symbols) of a CORESET |
| cce-REG-MappingType | CHOICE { // CCE-to-REG mapping configuration |
| interleaved | SEQUENCE { |
| reg-BundleSize | |
| interleaverSize | |
| shiftIndex | |
| }, | |
| nonInterleaved | |
| }, | |
| precoderGranularity | |
| tci-StatesPDCCH-ToAddList | |
| | // indicates a QCL relation possible between a QCL reference RS and a PDCCH DMRS |
| tci-StatesPDCCH-ToReleaseList | |
| tci-PresentInDCI | // indicates whether a TCI field exists within the DCI format 1_1 |
| pdcch-DMRS-ScramblingID | // indicates a scrambling initialization value of a PDCCH DMRS |
| ... | |
| } | |

TABLE 9

| | |
|---|---|
| SearchSpace ::= | SEQUENCE { |
| searchSpaceId | // search space ID |
| controlResourceSetId | // CORESET ID associated with the search space |
| monitoringSlotPeriodicityAndOffset | CHOICE { // periodicity and offset of a PDCCH monitoring slot |
| sl1 | // performs PDCCH monitoring in every slot |
| ... | |
| | // (omitted) monitoring offset values when a PDCCH monitoring periodicity is one of 2 to 1280 slots |
| sl2560 | // a monitoring offset value when a PDCCH monitoring periodicity is 2560 slots |
| } | |
| duration | // the number of slots where a search space exists for each occasion |
| monitoringSymbolsWithinSlot | |
| | // a position of a first symbol on which monitoring is to be performed within a PDCCH monitoring slot |
| nrofCandidates | SEQUENCE { |
| aggregationLevel1 | // The number of PDCCH candidates in case of aggregation level 1 |
| aggregationLevel2 | // The number of PDCCH candidates in case of aggregation level 2 |
| aggregationLevel4 | // The number of PDCCH candidates in case of aggregation level 4 |
| aggregationLevel8 | // The number of PDCCH candidates in case of aggregation level 8 |
| aggregationLevel16 | // The number of PDCCH candidates in case of aggregation level 16 |

TABLE 9-continued

```
}
  searchSpaceType              CHOICE { // indicates a search space type (common or
UE-specific) and DCI formats
       common                  SEQUENCE {
          dci-Format0-0-AndFormat1-0   SEQUENCE {
             ...
          }
          dci-Format2-0        SEQUENCE {
             nrofCandidates-SFI   SEQUENCE {
             ...
          },
          ...
       }
       dci-Format2-1
       dci-Format2-2
       dci-Format2-3           SEQUENCE {
          dummy1
          dummy2
       }
     },
     ue-Specific               SEQUENCE {
        dci-Formats
        ...,
     }
  }
}
```

The terminal may refer to the following higher layer configurations for UE-specific PDCCH monitoring, identical or similar to those shown in Table 10.

TABLE 10

```
PDCCH-Config ::=        SEQUENCE {
   controlResourceSetToAddModList
      // At most three CORESETs are configured by referring to CORESET configuration
   controlResourceSetToReleaseList
   searchSpacesToAddModList
      // At most ten search spaces are configured by referring to search space configuration
   searchSpacesToReleaseList
   downlinkPreemption    // downlink preemption indicator
   tpc-PUSCH             // configuraion of reception of a group TPC for PUSCH transmission
   tpc-PUCCH             // configuration of reception of a group TPC for PUCCH transmission
   tpc-SRS               // configuration of reception of a group TPC for SRS transmission
   ...,
}
```

The presence of one antenna port may mean a case in which a channel experienced by a symbol transmitted through the corresponding antenna port can be estimated or inferred from a channel experienced by another symbol transmitted through the same antenna port.

"Two different antenna ports are quasi co-located (QCLed)" may mean a case in which large-scale characteristics of a channel experienced by a symbol transmitted through one antenna port can be estimated or inferred from a channel experienced by a symbol transmitted through another antenna port. The large-scale characteristics of the channel may mean at least one of 'delay spread', 'Doppler spread', 'Doppler shift', 'average gain', 'average delay', and 'spatial Rx parameters'.

When time/frequency resources of a certain signal (e.g., QCL target RS) are insufficient and large-scale characteristics of a channel cannot be accurately measured with only the corresponding signal, information (i.e., QCL information) on another signal (e.g., QCL reference RS having sufficient time/frequency resources) having large-scale characteristics that can be reused for reception of the corresponding signal (i.e., QCL target RS) may be provided to the terminal to improve the channel measurement performance of the terminal. The NR communication system may support various QCL types as follows.

QCL-Type A: including {Doppler shift, Doppler spread, average delay, delay spread}.

QCL-Type B: including {Doppler shift, Doppler spread}

QCL-Type C: including {Doppler shift, average delay}

QCL-Type D: including {Spatial Rx parameters}

Figure 9:
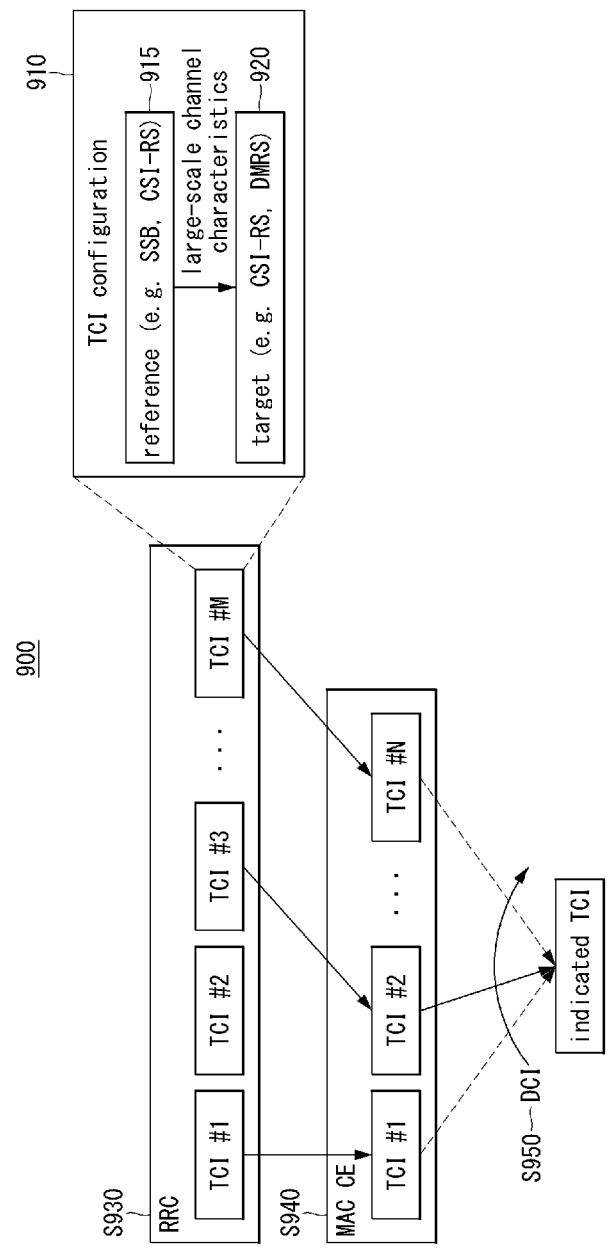
FIG. 9 is a conceptual diagram illustrating an exemplary embodiment of a QCL information transfer process through TCI state configuration and indication in a communication system.

FIG. 9 is a conceptual diagram illustrating an exemplary embodiment of a QCL information transfer process through TCI state configuration and indication in a communication system.

Referring to FIG. 9, in a process of transmitting QCL information through TCI state configuration and indication in a communication system 900, a base station may configure at most M TCI states to a terminal through higher layer (i.e., RRC) signaling, in accordance with a UE capability report and a maximum value (e.g., 4, 8, 64, or 128 depending on a frequency band) defined in a technical specification (S930). In this case, each TCI state configuration 910 may include information on a signal or channel (i.e., QCL reference 915) that provides large-scale channel characteristics to a signal or channel (i.e., QCL target 920) referring to the TCI. One TCI state configuration 910 may include up to two references (i.e., qcl-Type1 and qcl-Type2), the first reference may be one of the QCL-Type A, QCL-Type B, and QCL-type C (i.e., qcl-type1∈{QCL-type A, QCL-type B, QCL-type C}), and the second reference may be the QCL-type D if present (i.e., qcl-type 2=QCL-type D).

Allowing the base station to apply all the TCIs configured through the RRC signaling in real time may greatly increase implementation complexity of the terminal, the base station may transmit an activation message for some of the TCIs configured through the RRC signaling to the terminal through L2 signaling such as a MAC CE (S940). The base station may activate a maximum of N (<M) TCIs, and the terminal may receive a dynamic indication only for the activated TCI.

Thereafter, the base station may dynamically indicate to the terminal some of the activated N TCIs through L1 signaling such as a DCI (S950). The terminal may apply QCL information indicated by the corresponding TCI at a predetermined timing after receiving the L1 signaling, and may perform a reception operation for the signal or channel.

The TCI state indication steps including the 'RRC signaling (S930)', 'MAC CE signaling (S940)', and 'DCI signaling (S950)' of FIG. 9 may be partially omitted depending on a type of the QCL target RS. For example, when the QCL target is a PDSCH DMRS, and one or more TCI states are configured through RRC signaling, the base station may indicate the TCI state using all the steps of FIG. 9. However, when the QCL target is a PDSCH DMRS, and a single TCI state is configured through RRC signaling, the MAC CE signaling (S940) and the DCI signaling step (S950) may be omitted. Similarly, when the QCL target is a PDCCH DMRS, the DCI signaling step S940 may be omitted. Specifically, the terminal may obtain configuration information for the TCI states and QCL information with reference to the RRC signaling identical or similar to those shown in Table 11.

FIG. 10 is a conceptual diagram illustrating an exemplary embodiment of a TCI state activation/deactivation MAC CE in a communication system.

Referring to FIG. 10, a first octet (Oct 1) in a TCI state activation/deactivation MAC CE for a UE-specific PDSCH DMRS may include a COREST pool ID field 1010, a serving cell ID field 1020, and a BWP ID field 1030, and a second octet (Oct 2) to an N-th octet (Oct N) may include Ti fields 1040 indicating TCI state IDs i. The detailed meaning of each field may be as follows, and the sizes thereof may be variable.

Serving cell ID: a serving cell ID to which the MAC CE is applied

BWP ID: BWP ID to which the MAC CE is applied, which indicates a BWP in association with a BWP indication field within the DCI $T_i$: indicates a TCI state ID i. When this value is set to 0, it may mean that a TCI state whose TCI state ID is i is deactivated, and when this value is set to 1, it may mean that a TCI state whose TCI state ID is i is activated. The TCI states activated by 1 may be sequentially mapped to TCI indication field code points within the DCI.

CORESET pool ID: If a DCI scheduling a PDSCH is monitored in a CORESET that does not include a higher layer parameter coresetPoolIndex, the field may be ignored. If a DCI scheduling a PDSCH is monitored in a CORESET including the higher layer parameter coresetPoolIndex, $T_i$ indication may be applied only when a value of the CORESET pool ID matches a value of coresetPoolIndex of the CORESET.

Figure 11:
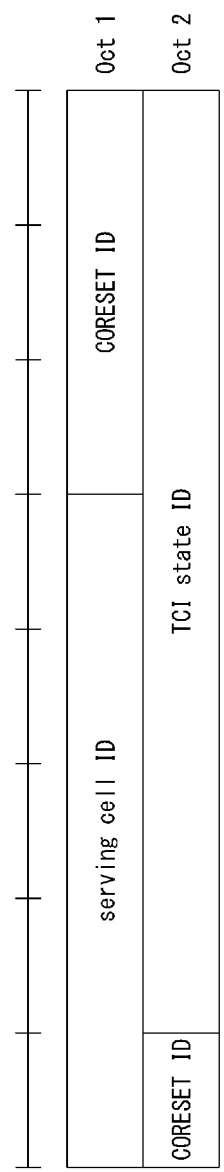
FIG. 11 is a conceptual diagram illustrating an exemplary embodiment of a TCI state indication MAC CE in a communication system.

FIG. 11 is a conceptual diagram illustrating an exemplary embodiment of a TCI state indication MAC CE in a communication system.

TABLE 11

```
TCI-State ::=           SEQUENCE { // TCI configuration (I.1-00)
    tci-StateId         // TCI state ID
    qcl-Type1           // first QCL reference configured by referring to QCL information
    qcl-Type2           // second QCL reference configured by referring to QCL information
    ...
}
QCL-Info ::=            SEQUENCE {
    cell                // index of a cell in which QCL reference is transmitted
    bwp-Id              // index of a BWP in which QCL reference is transmitted
    reference Signal        CHOICE {
        csi-rs          // index of a CSI-RS to be referred when QCL reference is a CSI-RS
        ssb             // index of an SSB to be referred when QCL reference is an SSB
    },
    qcl-Type
        // QCL type to be applied to a QCL target (one of QCL-type A, QCL-type B, QCL-type C, and QCL-
type D)
    ...
}
```

The base station may instruct the terminal to activate or deactivate some of the TCI states configured by the RRC signaling through MAC CE signaling, or may instruct the terminal to apply a TCI state indicated by a MAC CE to the QCL target RS. For example, the base station may use the following MAC CE signaling according to the type of the QCL target RS.

TCI state activation/deactivation MAC CE for a UE-specific PDSCH DMRS

TCI state indication MAC CE for a UE-specific PDCCH DMRS

TCI state activation/deactivation MAC CE for an enhanced UE-specific PDSCH DMRS

Referring to FIG. 11, a first octet (Oct 1) in a TCI state activation/deactivation MAC CE for a UE-specific PDSCH DMRS may include a serving cell ID field 1110 and a CORESET ID field 1120, and a second octet (Oct 2) may include a CORESET ID field 1130 and a TCI state ID field 1140. The sizes thereof may be variable.

Serving cell ID: a serving cell ID to which the corresponding MAC CE is applied.

CORESET ID: indicates a CORESET to which the MAC CE is applied. If this value is set to 0, a CORESET configured through controlResourceSetZero may be a CORESET #0.

TCI state ID: means a TCI state ID indicated by the corresponding MAC CE.

The base station may configure spatial relation information to the terminal through higher layer (e.g., RRC) signaling in order to indicate uplink beam information. The spatial relation information may mean a signaling structure for using spatial domain filters used for transmission and reception of a reference RS for spatial TX filters for uplink transmission of a target RS according to the corresponding spatial relation. The spatial reference RS may be a downlink signal such as SSB or CSI-RS, and may also be an uplink signal such as SRS. If the reference RS is a downlink signal, the terminal may use the spatial RX filter values used for receiving the reference RS as spatial TX filter values for transmitting the target RS according to the spatial relation. If the reference RS is an uplink signal, the terminal may use the spatial TX filter values used for transmitting the reference RS as the spatial TX filter values for transmitting the target RS according to the spatial relation.

The signaling structure for the spatial relation information may vary depending on the type of target RS. For example, when the target RS is an SRS, the base station may perform RRC configuration for each SRS resource based on message identical or similar to those shown in Table 12.

slot are configured only as downlink symbols 1215 according to a slot format. As another example, an uplink dedicated slot 1205 may be a slot in which all symbols within the slot are configured only as uplink symbols 1220 according to a slot format. As another example, in a downlink/uplink mixed slot 1210, some symbols within the slot may be configured as downlink symbols 1225, and some symbols within the slot may be configured as uplink symbols 1235 according to a slot format. In this case, specific symbols of the mixed slot 1210 including both the uplink and downlink symbols may be configured or indicated as a guard period 1230 for downlink-uplink switching, and the terminal may not perform transmission/reception during the guard period 1230.

In the 5G NR communication system, the base station may configure a 'slot format' over one or more slots for each serving cell to the terminal through a higher layer parameter tdd-UL-DL-ConfigurationCommon. In this case, the higher layer parameter tdd-UL-DL-ConfigurationCommon may include or refer to at least one of the following information.

Reference subcarrier spacing: reference numerology $\mu_{ref}$.
Pattern 1: A first pattern.
Pattern 2: A second pattern.

TABLE 12

```
SRS-SpatialRelationInfo ::= SEQUENCE {
    servingCellId              // index of a serving cell in which a reference RS is transmitted
    reference Signal               CHOICE {
        ssb-Index              // SSB index when a reference RS is SSB
        csi-RS-Index           // CSI-RS resource index when a reference RS is CSI-RS
        srs                        SEQUENCE {
           resourceId          // SRS resource index when a reference RS is SRS
           uplinkBWP           // index of a UL BWP in which SRS is transmitted when a reference RS is
SRS
       }
    }
}
```

For example, when the target RS is an SRS, the base station may perform RRC configuration for each SRS resource, identical or similar to those shown in Table 13.

TABLE 13

```
PUCCH-SpatialRelationInfo ::=      SEQUENCE {
    pucch-SpatialRelationInfoId   // spatial relation information ID for PUCCH
    servingCellId                 // index of a serving cell in which a reference RS is transmitted
    reference Signal                  CHOICE {
        ssb-Index                 // SSB index when a reference RS is SSB
        csi-RS-Index              // CSI-RS resource index when a reference RS is CSI-RS
        srs                       // specifiy a SRS resource by referring to PUCCH-SRS configuration
    },
    pucch-PathlossReferenceRS-Id
                                  // index of a RS resource to be used for measurement of a pathloss of a PUCCH
    p0-PUCCH-Id                   // index of confuring p0 for PUCCH power control
    closedLoopIndex               // configuration value of closed-loop power control
}
PUCCH-SRS ::=                     SEQUENCE {
    resource                      // SRS resource index
    uplinkBWP                     // index of a BWP in which SRS is transmitted
}
```

In the 5G NR communication system, a slot format may include downlink symbol(s), uplink symbol(s), and/or flexible symbol(s).

Figure 12:
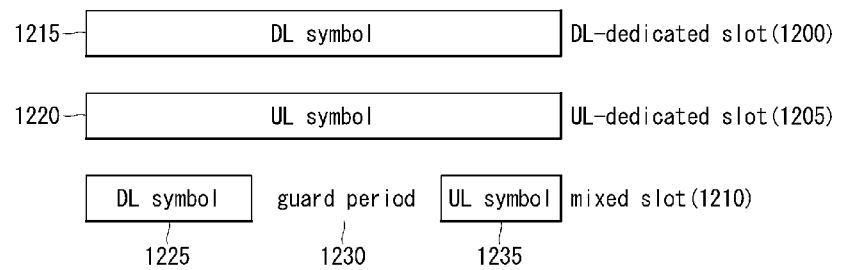
FIG. 12 is a conceptual diagram illustrating slot configurations according to slot formats in a communication system.

FIG. 12 is a conceptual diagram illustrating slot configurations according to slot formats in a communication system.

Referring to FIG. 12, in slot configurations according to slot formats in a communication system, a downlink dedicated slot 1200 may be a slot in which all symbols within the Here, the pattern 1 or pattern 2 may include at least one of the following configurations.

Slot configuration periodicity (i.e., dl-UL-TransmissionPeriodicity): Slot configuration periodicity P expressed in units of msec Number of downlink dedicated slots (i.e., nrofDownlinkSlots): The number $d_{slots}$ of slots composed only of downlink symbols Number of downlink symbols (i.e., nrofDownlinkSymbols): The number $d_{sym}$ of downlink symbols Number of uplink dedicated slots (i.e., nrofUplinkSlots): The number $u_{slots}$ of slots composed only of uplink symbols Number of uplink symbols (i.e., nrofUplinkSymbols): The number $u_{sym}$ of uplink symbols The slot configuration periodicity P msec of the first pattern may include $S=P \cdot 2^{\mu_{ref}}$ slots, and in this case, the numerology may follow $\mu_{ref}$. In addition, among the S slots, the first $d_{slots}$ slots may include only downlink symbols, and the last $u_{slots}$ slots may include only uplink symbols. In this case, $d_{sym}$ symbols after first $d_{slots}$ slots may be downlink symbols. In addition, $u_{sym}$ symbols before last $u_{slots}$ slots may be uplink symbols. The remaining symbols (i.e., $(S-d_{slots}-u_{slots}) \cdot N_{symb}^{slot}-d_{sym}-u_{sym}$ symbols) that are not designated as downlink symbols or uplink symbols in the pattern may be flexible symbols.

If the second pattern is configured and the slot configuration periodicity of the second pattern is $P_2$, a slot configuration periodicity $P+P_2$ msec configured with a combination of the first pattern and the second pattern may include first $S=P \cdot 2^{\mu_{ref}}$ slots and second $S_2=P_2 \cdot 2^{\mu_{ref}}$ slots. In this case, the positions and numbers of downlink symbols, uplink symbols, and flexible symbols in the second pattern may be configured with reference to the description of the first pattern based on configuration information of the second pattern. In addition, when the second pattern is configured, the terminal may assume that $P+P_2$ is a divisor of 20 msec.

The base station may override direction(s) of 'flexible symbol(s)' among symbols configured through the higher layer parameter tdd-UL-DL-ConfigurationCommon by using the higher layer parameter tdd-UL-DL-Configuration-Dedicated) based on the following information.

Slot configuration set (i.e., slotSpecificConfigurations-ToAddModList): A set of slot configurations Slot index (i.e., slotIndex): An index of a slot included in the set of slot configurations Symbol directions (i.e., symbols): The directions of the symbols indicated by the slot index (i.e., slotIndex). If all symbol directions are downlink (symbols=allDownlink), all symbols within the corresponding slot are downlink symbols. If all symbol directions are uplink (symbols=allUplink), all symbols within the corresponding slot are uplink symbols. If the symbol directions are explicit (symbols=explicit), nrofDownlinkSymbols may indicate the number of downlink symbols located in the first part of the corresponding slot, and nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

In the 5G communication system, the base station may indicate a slot format to the terminal based on L1 signaling. For example, when the terminal receives a higher layer parameter SlotFormatIndicator from the base station, the terminal may obtain configuration information a slot format indication-RNTI (i.e., SFI-RNTI). Meanwhile, when the terminal receives a higher layer parameter dci-PayloadSize from the base station, the terminal may obtain configuration information of a payload size of the DCI format 2_0. In addition, the terminal may additionally receive, from the base station, information on PDCCH candidate(s), CCE aggregation level, and search space set(s) of a CORESET for monitoring the DCI format 2_0. Each slot format indication (SFI) index field in the DCI format 2_0 may indicate a slot format to be applied to each slot in a slot set of a DL BWP and a UL BWP from a slot in which the terminal has detected the corresponding DCI format 2_0. In this case, the size of the slot set may be equal to or greater than a PDCCH monitoring periodicity of the DCI format 2_0. For example, when the slot set is composed of N slots, the DCI format 2_0 may include N SFI index fields, and each SFI index field may indicate a format value of Table 14 below. In Table 14, 'D' may mean a downlink symbol, 'U' may mean an uplink symbol, and 'F' may mean a flexible symbol.

TABLE 14

| Slot format | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |

TABLE 14-continued

| Slot format | \multicolumn{14}{c}{Symbol number within a slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | U | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines a slot format of a slot based on a higher layer parameter tdd-UL-DL-ConfigurationCommon or a higher layer parameter tdd-UL-DL-ConfigurationDedicated, and a detected DCI format (when exists).} |

In the 5G NR communication system, it may be possible to support flexible and dense wireless backhaul links for each cell through the IAB feature, without support of a wired network.

Figure 13:
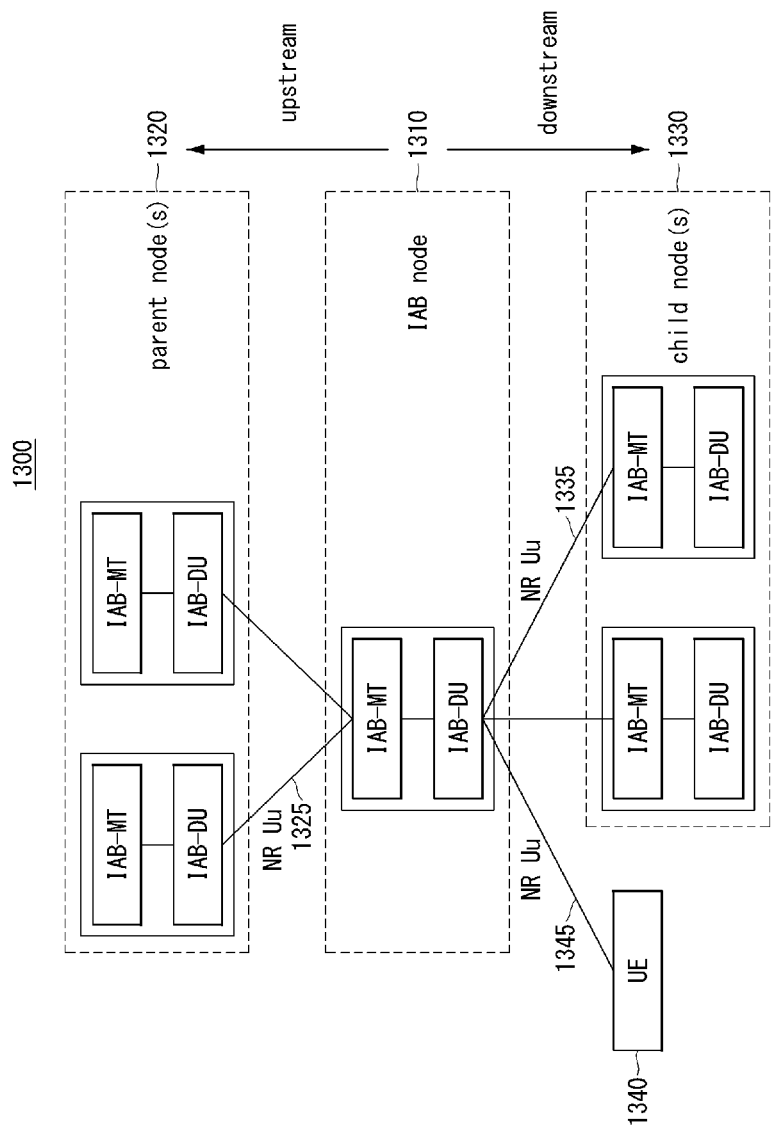
FIG. 13 is a conceptual diagram illustrating an exemplary embodiment of an IAB network in a communication system.

FIG. 13 is a conceptual diagram illustrating an exemplary embodiment of an IAB network in a communication system.

Referring to FIG. 13, a communication system 1300 may include one or more communication nodes. The communication nodes of the communication system 1300 may constitute an IAB network. For example, the communication system 1300 may include one or more IAB nodes. FIG. 13 shows an exemplary embodiment in which one IAB node communicates with one or more upper nodes and one or more lower nodes. However, this is only an example for convenience of description, and exemplary embodiments of the present disclosure are not limited thereto.

The communication system 1300 may include a plurality of IAB nodes. For example, the communication system 1300 may include a first IAB node 1310, one or more parent nodes 1320 corresponding to upper nodes of the first IAB node 1310, and/or one or more child nodes corresponding to lower nodes of the first IAB node 1310. Here, each of the one or more parent nodes 1320 may be referred to as a 'donor node'. The IAB node 1310, the one or more parent nodes 1320, and/or the one or more child nodes 1330 may constitute the IAB network. Each of the IAB nodes 1310, 1320, and 1330 constituting the IAB network may function as a type of repeater configured based on a front-haul structure. In the communication system 1300 to which the IAB network technology is applied, it is possible to support flexible and dense wireless backhaul links for each cell without support of a wired network.

Each of the IAB nodes 1310, 1320, and 1330 may include an IAB-DU and an IAB-MT. The IAB-MT may allow each IAB node to function as a terminal in communication with an upper node. For example, the first IAB node 1310 may communicate with the upper parent nodes 1320 through the IAB-MT. On the other hand, the IAB-DU may allow each IAB node to function as a base station or a cell in communication with a lower node. For example, the first IAB node 1310 may communicate with the lower child nodes 1330 or a terminal 1340 through the IAB-DU.

The IAB-MT of the first IAB node 1310 may be connected to the IAB-DUs of the parent nodes 1320 through Uu interfaces 1325. The IAB-DU of the first IAB node 1310 may be connected to the IAB-MTs of the child nodes 1330 through Uu interfaces 1335. The IAB-DU of the first IAB node 1310 may be connected to a terminal 1340 through a Uu interface 1345.

After the IAB node constituting the IAB network completely decodes a received signal, the IAB node may re-encode the decoded received signal, and amplify and transmit it. The IAB node may be classified as a type of regenerative relay. To this end, the IAB node may support a control plane (CP) and a user plane (UP) from the parent node to the terminal based on a protocol stack structure including the L1 and L2 layers, or higher layers.

The IAB node constituting the IAB network has an advantage of being able to perform various operations including operations as a base station and a terminal. On the other hand, the IAB node has disadvantages in that implementation complexity and production cost are relatively high, and a delay required for retransmission may be relatively large.

Figure 14:
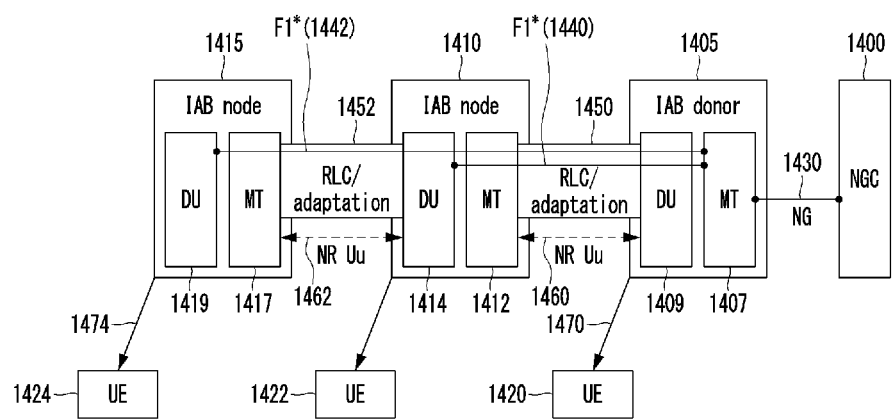
FIG. 14 is a block diagram illustrating an exemplary embodiment of a functional split structure of a central unit (CU) and a distributed unit (DU) in a communication system.

FIG. 14 is a block diagram illustrating an exemplary embodiment of a functional split structure of a central unit (CU) and a distributed unit (DU) in a communication system.

Referring to FIG. 14, in a CU-DU functional split structure in the IAB network, IAB nodes 1410 and 1415 in a two-hop chain are connected to an IAB donor 1405, and each of the IAB nodes 1410 and 1415 and terminals 1420, 1422, and 1424 may be connected to a next generation core (NGC) 1400 in a stand-alone (SA) mode. The IAB nodes 1410 and 1415 may include one DU and one MT, respectively. A certain IAB node (e.g., 1415) may be connected to the parent IAB node 1410 or the IAB donor 1405 via an MT 1417. As another example, a certain IAB node (e.g., 1410) may establish a RLC channel with the MT 1417 of the child IAB node 1415 through a DU 1414. In this case, the RLC channels 1450 and 1452 established for the MTs 1412 and 1417 may additionally include some information for IAB operations in addition to the existing components of a RLC channel for a terminal. Accordingly, the RLC channels 1450 and 1452 may be collectively referred to as 'modified RLC* (RLC*)'.

One IAB node may be connected to DUs of one or more parent IAB nodes or IAB donors. In this case, the IAB node may include a plurality of DUs, but each DU of the IAB node may have an F1-C connection 1440 or 1442 with a single IAB donor CU-CP. Even if the IAB node has a plurality of UP connections, the IAB node may operate based on a single CP connection (i.e., the IAB node may operate by being connected to a single IAB donor), so that no confusion occurs in operations of the IAB node.

The IAB donor 1405 may include the DU for supporting MTs of terminals and child IAB nodes. The IAB donor 1405 may include the CU 1407 for DUs 1409, 1414, and 1419 of itself and all child IAB nodes. It may be assumed that a certain IAB donor has a single IAB donor, and an IAB donor that manages the corresponding IAB donor may be changed by a topology adaptation function. A DU of an IAB node may be connected to a CU of the corresponding IAB donor through an F1 interface or a modified F1 interface (modified F1, F1*) (e.g., 1440, 1442). F1*-user plane (U) may be operated on the RLC channels 1450 and 1452 between the corresponding IAB-MTs 1417 and 1412 and the DUs 1414 and 1409 of the parent IAB node or donor.

Hereinafter, for convenience of description, in the present disclosure, higher layer parameters or higher layer configurations may not be limited to the above-described L2 and L3 signaling, and may collectively include information transmitted or configured through the F1 interfaces 1440 and 1442, the NG interface 1430 for connecting the CU to the NGC, the X2 interface, and the like.

Although it may seem that the slot format configuration and indication methods described with reference to FIGS. 11 and 12 are limited to terminals performing communication with the base station, this is only an example for convenience of description, and exemplary embodiments of the present disclosure are not limited thereto. For example, the slot format configuration and indication methods described with reference to FIGS. 11 and 12 may be similarly applied to the case of IAB-DU and/or IAB-MT. For example, for each serving cell of the IAB-DU, the IAB-DU may receive a higher layer parameter IAB-DU-Resource-Configuration for IAB-DU resource configuration, thereby configuring a slot format in each slot set. On the other hand, the IAB-MT may receive configuration information of 'slot format' over one or more slots for each serving cell through a higher layer parameter tdd-UL-DL-ConfigurationDedicated-IAB-MT from at least one upper node of the IAB-MT. When the IAB-MT receives the higher layer parameter tdd-UL-DL-ConfigurationDedicated-IAB-MT, the received higher layer parameter may substitute the higher layer parameter tdd-UL-DL-ConfigurationDedicated in the above-described slot format configuration and indication method. Specifically, the higher layer parameter tdd-UL-DL-ConfigurationDedicated-IAB-MT may include the following information.

IAB-MT slot configuration set (i.e., slotSpecificConfigurationsToAddModList-IAB-MT): A set of slot configurations Slot index (i.e., slotIndex): Index of a slot included in the set of slot configurations IAB-MT symbol directions (i.e., symbols-IAB-MT): The direction of the slot indicated by the slot index.

If the IAB-MT symbol directions are all downlink (symbols-IAB-MT=allDownlink), all symbols within the corresponding slot are downlink symbols.

If the IAB-MT symbol directions are all uplink (symbols-IAB-MT=allUplink), all symbols within the corresponding slot are uplink symbols.

If the IAB-MT symbol directions are explicit (symbols-IAB-MT=explicit), the nrofDownlinkSymbols may indicate the number of downlink symbols located in the first part of the slot, and the nrojUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

If the IAB-MT symbol directions are IAB-MT explicit (symbols-IAB-MT=explicit-IAB-MT), the nrofDownlinkSymbols may indicate the number of downlink symbols located in the first part of the slot, and the nrofUplinkSymbols may indicate the number of uplink symbols located in the last part of the corresponding slot. If the nrofDownlinkSymbols or the nrofUplinkSymbols is omitted, the corresponding parameter may be regarded as indicating a value of 0. The remaining symbols within the slot become flexible symbols.

Similarly to the above-mentioned normal terminal, the IAB-MT may also receive the DCI format 2_0, and through this, may receive configuration information of a slot format from the base station of the IAB-DU of the parent node. In the case of DCI format 2_0 received by the IAB-MT, candidate values of each SFI field may not be limited to the values shown in Table 14. For example, the candidate values of each SFI field of the DCI format 2_0 received by the IAB-MT may further include values shown in Table 15.

TABLE 15

| Slot format | Symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | U | U | U | U | U | U | U | U | F | F | F | F | F | F |
| 62 | U | U | U | U | U | U | U | F | F | F | F | F | F | F |
| 63 | U | U | U | U | U | U | F | F | F | F | F | F | F | F |
| 64 | U | U | U | U | U | F | F | F | F | F | F | F | F | F |
| 65 | U | U | U | U | F | F | F | F | F | F | F | F | F | F |
| 66 | U | U | U | F | F | F | F | F | F | F | F | F | F | F |
| 67 | U | U | F | F | F | F | F | F | F | F | F | F | F | F |

TABLE 15-continued

| Slot format | \multicolumn{14}{c}{Symbol number within a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 68 | U | F | F | F | F | F | F | F | F | F | F | F | F | F |
| 69 | U | F | F | F | F | F | F | F | F | F | F | F | F | D |
| 70 | U | U | F | F | F | F | F | F | F | F | F | F | F | D |
| 71 | U | U | U | F | F | F | F | F | F | F | F | F | F | D |
| 72 | U | F | F | F | F | F | F | F | F | F | F | F | D | D |
| 73 | U | U | F | F | F | F | F | F | F | F | F | F | D | D |
| 74 | U | U | U | F | F | F | F | F | F | F | F | F | D | D |
| 75 | U | F | F | F | F | F | F | F | F | F | F | D | D | D |
| 76 | U | U | F | F | F | F | F | F | F | F | F | D | D | D |
| 77 | U | U | U | F | F | F | F | F | F | F | F | D | D | D |
| 78 | U | U | U | U | U | U | U | U | U | U | U | U | F | D |
| 79 | U | U | U | U | U | U | U | U | U | U | U | F | F | D |
| 80 | U | U | U | U | U | U | U | U | U | U | F | F | F | D |
| 81 | U | U | U | U | U | U | U | U | U | U | F | F | D | D |
| 82 | U | U | U | U | U | U | U | U | U | F | F | F | D | D |
| 83 | U | U | U | U | U | U | U | U | F | F | F | F | D | D |
| 84 | U | F | D | D | D | D | D | D | D | D | D | D | D | D |
| 85 | U | U | F | D | D | D | D | D | D | D | D | D | D | D |
| 86 | U | U | U | F | D | D | D | D | D | D | D | D | D | D |
| 87 | U | F | F | D | D | D | D | D | D | D | D | D | D | D |
| 88 | U | U | F | F | D | D | D | D | D | D | D | D | D | D |
| 89 | U | U | U | F | F | D | D | D | D | D | D | D | D | D |
| 90 | U | F | F | F | D | D | D | D | D | D | D | D | D | D |
| 91 | U | U | F | F | F | D | D | D | D | D | D | D | D | D |
| 92 | U | U | U | F | F | F | D | D | D | D | D | D | D | D |
| 93 | U | U | U | U | U | U | U | U | F | F | F | F | F | D |
| 94 | U | U | U | U | U | U | F | F | F | F | F | F | D | D |
| 95 | U | U | U | U | U | U | F | F | D | D | D | D | D | D |
| 96 | U | U | U | U | U | U | U | D | D | D | D | D | D | D |

The IAB-MT may receive information on symbols not to be used by the IAB-MT for a certain serving cell through a higher layer parameter (e.g., Provided Guard Symbols MAC CE). The IAB-MT may perform a transition (i.e., operation change) between the IAB-MT and the IAB-DU of the IAB node during a time period including the symbols not used by the IAB-MT. The base station may signal a numerology for the symbols to the terminal through a higher layer parameter (e.g., Provided Guard Symbols MAC CE).

In a cell of a certain IAB-DU, a symbol within a slot may be configured as one of three types: 'hard', 'soft', and 'unavailable (or not-available)' (HSNA).

If a certain downlink, uplink, or flexible symbol is configured as the hard type, the cell of the IAB-DU may perform a signal transmit and/or reception operation in the corresponding symbol. This may mean that the fact that a certain symbol is configured as the hard type guarantees the reflection of the downlink, uplink, or flexible symbol configuration of the IAB-DU for the corresponding symbol.

Specifically, in an exemplary embodiment of the communication system, an F1 application protocol (F1AP) signaling as shown in Table 16 may be provided, and the upper IAB node (e.g., IAB donor, parent node, core network, etc.) may configure a DU resource type of the lower IAB node (e.g., IAB node, child node). Referring to Table 16, information of the DU resource type may include one HSNA slot configuration list consisting of one or more HSNA slot configurations. In this case, one HSNA slot configuration list may include HSNA slot configurations according to the maximum number of HSNAs (e.g., maxnoofHSNA). The n-th HSNA slot configuration included in the HSNA slot configuration list may include information on whether to apply the hard type, soft type, or not-available type to each of downlink symbols, uplink symbols, and flexible symbols of the n-th slot according to an application periodicity and a starting time of the HSNA slot configuration list.

TABLE 16

| IE/group name | range | IE type and reference | liminality |
|---|---|---|---|
| HSNA slot configuration list | 0 . . . 1 | | |
| >HSNA slot configuration item | 1 . . . <maxnoofHSNASlots> | | |
| >>HSNA (Downlink) | | Enumerated (H, S, NA) | HSNA value for a downlink symbol of a slot |
| >>HSNA (Uplink) | | Enumerated (H, S, NA) | HSNA value for a uplink symbol of a slot |
| >>HSNA (Flexible) | | Enumerated (H, S, NA) | HSNA value for a flexible symbol of a slot |

If a certain downlink, uplink, or flexible symbol is configured as the soft type, the IAB-DU cell may perform a signal transmission and reception operation in the symbol when at least one of the following conditions is satisfied.
  Condition 1: The IAB-MT (co-located/associated with the IAB-DU) does not perform transmission or reception in the corresponding symbol.
  Condition 2: The IAB-MT (co-located/associated with the IAB-DU) can perform transmission or reception in the corresponding symbol, but the transmission/reception operation of the IAB-MT does not change due to the use of the symbol at the IAB-DU.
  Condition 3: The IAB-MT (co-located/associated with the IAB-DU) receives a DCI format 2_5 indicating the corresponding soft symbols as 'available'.

If a certain downlink, uplink, or flexible symbol is configured as the 'unavailable (or not-available (NA)) type', the IAB-DU (i.e., cell) may not perform transmission or reception in the symbol.

If the IAB-DU transmits one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

SS/PBCH block, CSS set for a type0-PDCCH configured by a system information block 1 (SIB1) for PDCCH configuration (i.e., PDCCHs for a type0-PDCCH CSS sets configured by pdcchConfigSIB1), periodic CSI-RS, and/or the like If the IAB-DU receives one of a cell-specific, periodic, or semi-static signal or channel included in the following list in symbol(s) of a certain slot, the IAB-DU may perform a transmission/reception operation by assuming that the corresponding symbol(s) in the corresponding slot are configured as the hard type regardless of the configured resource type.

PRACH, scheduling request (SR)

Following information may be configured for each cell in the set of cells of the IAB-DU.

IAB-DU cell identifier (i.e., iabDuCellId-AI): Identifier of the IAB-DU cell

AI position within DCI format (i.e., positionInDCI-AI): Position of an availability identifier (AI) index field within the DCI format 2_5.

Availability combinations (i.e., avadabilityCombinations): includes a list of the following two pieces of information for availability combinations.

Resource availability (i.e., resourceAvailability): indicates resource availability for soft symbols included in one or more slots of the IAB-DU cell. The availability of soft symbols within one slot may be determined by referring to values in Table 17.

Availability combination identifier (i.e., availabilityCombinationId): indicates a mapping between the resource availability (i.e., resourceAvailability) and the AI index field in the DCI format 2_5.

As described above, in the DCI format 2_5, one AI index field may indicate to the IAB-DU the availability of soft symbols included in each slot in a certain slot set. In this case, the slot set may start from the earliest slot among the slots of the IAB-DU overlapping in the time axis with the slot in which the IAB-MT detects the corresponding DCI format 2_5. In addition, the size of the slot set may be greater than or equal to a PDCCH monitoring periodicity of the DCI format 2_5 given from a higher layer parameter SearchSpace. The AI index field of the DCI format 2_5 may include max $\{\lceil \log_2(\text{maxAIindex})\rceil,1\}$ bits and may be mapped to one of the values of Table 17. In this case, the maximum value of the AI index (i.e., maxAIindex) may mean a maximum value among the provided availability combination identifiers (i.e., availabilityCombinationId). Table 17 may indicate a mapping relationship between the resource availability value and the soft symbol type within one slot.

TABLE 17

| Value | Indication |
|---|---|
| 0 | No indication of availability for soft symbols |
| 1 | Indicates that downlink symbols are available. No indication of availability for uplink and flexible soft symbols |

TABLE 17-continued

| Value | Indication |
|---|---|
| 2 | Indicates that uplink symbols are available. No indication of availability for downlink and flexible soft symbols |
| 3 | Indicates that downlink and uplink soft symbols are available. No indication of availability for flexible soft symbols |
| 4 | Indicates that flexible soft symbols are available. No indication of availability for downlink and uplink soft symbols |
| 5 | Indicates that downlink and flexible soft symbols are available. No indication of availability for uplink soft symbols |
| 6 | Indicates that uplink and flexible soft symbols are available. No indication of availability for downlink soft symbols |
| 7 | Indicates that downlink, uplink, and flexible soft symbols are available |

As described above, the upper IAB node including the IAB donor may indicate whether the lower IAB node uses the soft symbols based on the DCI format 2_5 and the contents of Table 17. On the other hand, such the function may be designed assuming that the IAB node operates in a half-duplex manner. In other words, such the function may be designed mainly assuming that the MT and DU of the IAB node operate in a time division multiplexing (TDM) scheme or time division duplexing (TDD) scheme.

In an exemplary embodiment of the communication system, the F1AP signaling as shown in Table 18 may be used. Through this, the IAB node may report or deliver, to the upper IAB node (e.g., IAB donor or parent node), multiplexing information on a multiplexing capability between the IAB-DU of the IAB node (or, cell of a gNB-DU) and the IAB-MT of the IAB node (or, a cell configured in a co-located IAB-MT). Referring to Table 18, the multiplexing information may include one IAB-MT cell list composed of information on one or more IAB-MT cells. In this case, one IAB-MT cell list may include IAB-MT cell information according to the maximum number of serving cells (i.e., maxnoofServingCells). The n-th IAB-MT cell information included in the IAB-MT cell list may include a NR cell identity (ID) information of the corresponding cell and information on whether the following four types of multiplexing are supported.

DU_RX/MT_RX multiplexing: informs whether the IAB node supports simultaneous receptions in the DU and the MT DU_TX/MT_TX multiplexing: informs whether the IAB node supports simultaneous transmissions in the DU and the MT DU_TX/MT_RX multiplexing: informs whether the IAB node can simultaneously perform transmission in the DU and reception in the MT DU_RX/MT_TX multiplexing: informs whether the IAB node can simultaneously perform reception in the DU and transmission in the MT

TABLE 18

| IE/group name | range | IE type and reference | liminality |
|---|---|---|---|
| IAB-MT cell list | 1 | | |
| >IAB-MT cell item | 1 ... <maxnoofServingCells> | | |
| >>NR cell identity | | Bit string (size: 36) | Identity of a serving cell configured for a co-located IAB-MT |
| >>DU_RX/MT_RX | | Enumerated (supported, not-supported) | Indicates whether the IAB node supports simultaneous receptions in DU and MT |
| >>DU_TX/MT_TX | | Enumerated (supported, | Indicates whether the IAB node supports |

TABLE 18-continued

| IE/group name | range | IE type and reference | liminality |
|---|---|---|---|
| | | not-supported) | simultaneous transmissions in DU and MT |
| >>DU_TX/MT_RX | | Enumerated (supported, not-supported) | Indicates whether the IAB node simultaneously supports transmission in DU and reception in MT |
| >>DU_RX/MT_TX | | Enumerated (supported, not-supported) | Indicates whether the IAB node simultaneously supports reception in DU and transmission in MT |

According to Table 18, the IAB node may semi-statically report the DU/MT multiplexing capability or whether to support the DU/MT simultaneous operations for each cell, but whether the IAB node supports the DU/MT simultaneous operations may depend entirely on the corresponding IAB node itself. The upper IAB node may not support controlling the DU/MT simultaneous operations of the lower IAB node dynamically or semi-statically depending on a situation.

Figure 15:
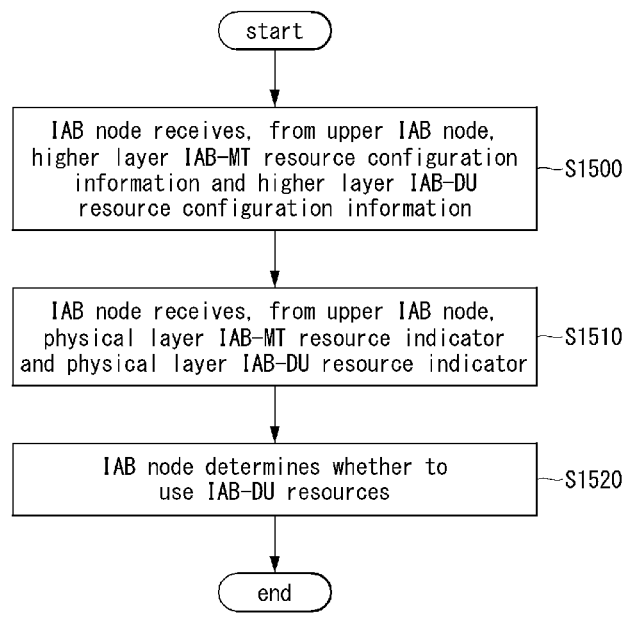
FIG. 15 is a flowchart illustrating a first exemplary embodiment of a method for resource management of an IAB node in a communication system.

FIG. 15 is a flowchart illustrating a first exemplary embodiment of a method for resource management of an IAB node in a communication system.

FIG. 15 shows a first exemplary embodiment of the method for resource management of an IAB node by taking the operation of the IAB node determining whether to use the IAB-DU resources as an example. However, this is only an example for convenience of description, and exemplary embodiments of the present disclosure are not limited thereto. For example, in the present disclosure, configurations described for 'whether to use IAB-DU resources' may be applied similarly or identically also to 'whether to use IAB node resources', 'whether to use IAB-MT resources', 'whether to use DU/MT simultaneous operation resources', and the like.

Referring to FIG. 15, in the order of determining whether to use the IAB-DU resources of the IAB node, the IAB node may identify whether the corresponding IAB-DU resources are available, and in order to determine whether to use the IAB-DU resources, may receive, from the upper IAB node, at least one of higher layer IAB-MT resource configuration information and higher layer IAB-DU resource configuration information (S1500). As an example, the higher layer IAB-MT resource configuration information may include slot configuration (i.e., downlink/uplink/flexible (DUF)) information and symbol configuration information for a cell (or cell group) of the IAB-MT. As another example, the higher layer IAB-DU resource configuration information may include slot configuration (i.e., downlink/uplink/flexible (DUF)) information and symbol configuration information for a cell (or cell group) of the IAB-DU.

The higher layer IAB-DU resource configuration information may include type (i.e., hard, soft, or not-available) information of the IAB-DU resources configured by the upper IAB node. The higher layer IAB-DU resource configuration information may include a part or all of cell-specific/semi-static downlink signals and channels such as SSB(s), type 0-PDCCH CSS set configured by a SIB1 for PDCCH configuration, CSI-RS, etc. configured in a cell (or cell group) configured to the IAB-DU. The higher layer IAB-DU resource configuration information may include a part or all of cell-specific/semi-static downlink signals and channels such as PRACH, SR, etc. configured in a cell (or cell group) configured to the IAB-DU.

In addition to the above-described higher layer configuration, the IAB node may receive at least one of a physical layer (L1 signaling) IAB-MT resource indicator and a physical layer IAB-DU resource indicator from the upper IAB node (S1510). As an example, the physical layer IAB-MT resource indicator may be a DCI format 2_0 including a slot format indicator for a cell (or a set of cells) which is configured to the IAB-MT. As another example, the physical layer IAB-DU resource indicator may be a DCI format 2_5 including a soft resource AI of the IAB-DU.

Finally, the IAB node may finally determine whether to use the IAB-DU resources based on the higher layer signaling (S1500) and the L1 signaling (S1510) (S1520).

Meanwhile, in general, it may not be possible to force all terminals to implement the same feature. The UE capability report may enable an expensive terminal to implement a large amount of features with high performance, and may enable a low-cost terminal to implement a small amount of features with low performance. The UE capability report may make it possible to secure the degree of freedom in terminal implementation for various situations, and when the capability information is reported to the network, the base station may configure each function within the limits supported by each terminal. Certain functions may be promised to be mandatory for all terminals to implement, and in this case, it may be possible to omit the UE capability report for the mandatory functions.

It may be possible for the terminal to perform UE capability reporting of different values for one function for each frequency band or for each duplex scheme. For example, the terminal may support a specific function for a frequency range 1 (FR1), which means a band below 6 GHz, but may report to the base station that the terminal does not support a specific function for a frequency range 2 (FR2), which means a band above 6 GHz. As another example, the terminal may report to the base station that a specific function is supported in the TDD scheme but not supported in the FDD scheme.

When the terminal performs the UE capability reporting, the base station should follow (should not violate) the content of the UE capability report when perform configuration, indication, or scheduling on the terminal. If the base station indicates, to the terminal, configuration, indication or scheduling contrary to the UE capability report, the terminal may ignore it.

Figure 16:
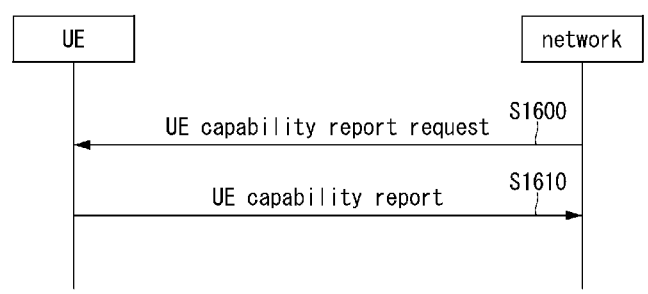
FIG. 16 is a flowchart illustrating an exemplary embodiment of a UE capability reporting procedure in a communication system.

FIG. 16 is a flowchart illustrating an exemplary embodiment of a UE capability reporting procedure in a communication system.

Referring to FIG. 16, in the UE capability reporting procedure, the base station may transmit a UE capability report request signal to the terminal through a higher layer parameter UECapabilityEnquiry when the terminal is in RRC connected mode (i.e., RRC_CONNECTED state) (S1600). In this case, the network may refer to only the UE capability report after access stratum (AS) security activation, and may not retransmit or report the UE capability report before the AS security activation to the core network (CN). Upon receiving the UE capability report request signal, the terminal may compile UE capability information according to a specific procedure, and report it to the base station through a UE capability information signal (e.g., UECapabilityInformation) (S1610).

The specific procedure for compiling the UE capability information signal may include a procedure of generating at least one of a list (i.e., supportedBandCombinationList) of band(s) or band combination(s) (BC(s)) supported by the terminal, feature set (FS) information related to feature sets supported by the terminal, or feature set combination (FSC) information related to feature set combinations supported by the terminal. For example, when the base station requests a UE capability report from the terminal in order to obtain information on band(s) or band combination(s) supported by the terminal, the terminal may report which band(s) it supports for each radio access technology (RAT). To this end, the base station may set a RAT-type in a UE RAT capability report request signal (e.g., UE-CapabilityRAT-Request), which is included in a UE RAT capability report request list signal (e.g., ue-CapabilityRAT-RequestList) that is a higher layer message, to one of 'nr', 'eutra-nr', 'eutra', and 'eutra-fdd'. This may mean that the base station may request a UE capability report for one or more RATs or RAT combinations from the terminal, and in this case, the terminal may respond to each request for a list of support bands for a plurality of RATs or RAT combinations. For example, if the RAT-type is set to 'nr', the terminal may include a list of bands or band combinations to which NR-DC can be applied in the UE capability report. As another example, if the RAT-type is set to 'eutra-nr', the terminal may include a list of bands or band combinations applicable to multi-RAT DC (MR-DC) such as EN-DC, NGEN-DC, NE-DC, or the like in the UE capability report. In addition, when the base station requests a UE capability report, the base station may provide, to the terminal, a list of bands for which the terminal determines whether support is provided, through a higher layer parameter frequencyBandListFilter. For the bands included in the higher layer parameter frequencyBandListFilter, the terminal may determine a candidate band combination by considering 'predetermined RAT types supported for each band', 'information on RAT-types requested by the base station', etc., and may include the candidate band combination in the UE capability report.

Figure 17A:
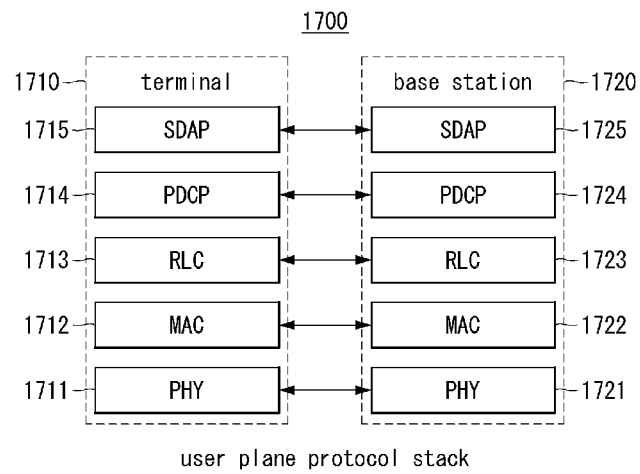
FIGS. 17A and 17B are conceptual diagrams for describing a first exemplary embodiment of a user plane protocol stack structure and a control plane protocol stack structure in a communication system.
Figure 17B:
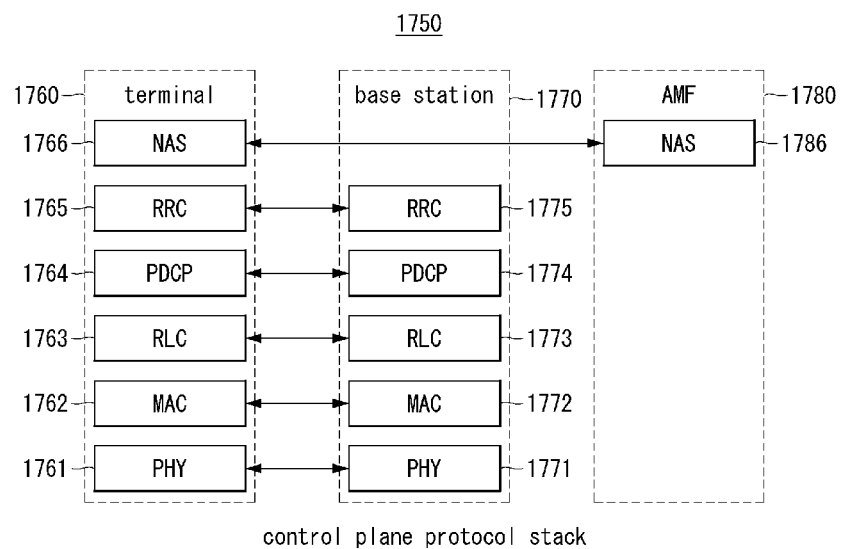

FIGS. 17A and 17B are conceptual diagrams for describing a first exemplary embodiment of a user plane protocol stack structure and a control plane protocol stack structure in a communication system.

Referring to FIGS. 17A and 17B, a radio interface protocol stack or radio interface protocol stack structures 1700 and 1750 may be defined in a radio connection section between communication nodes. For example, the radio interface protocol stack may be divided into a physical layer, a data link layer, a network layer, and the like, which are vertically configured.

The radio interface protocol stack may be divided into the user plane protocol stack 1700 and the control plane protocol stack 1750. Here, the control plane may be a plane for transmitting a control signal. The control signal may be referred to as a signaling signal. The user plane may be a plane for transmitting user data.

Referring to FIG. 17A, the communication system may include a terminal 1710 and a base station 1720. The terminal 1710 may be referred to as a user equipment (UE). The base station 1720 may correspond to an eNB, a gNB, or the like. The terminal 1710 and the base station 1720 may perform mutual data signal transmission/reception based on the user plane protocol stack structure 1700 shown in FIG. 17A.

In the user plane air interface protocol stack structure 1700 of the communication system, the terminal 1710 and the base station 1720 may include PHY layers 1711 and 1721 included in L1, MAC layers 1712 and 1722, RLC layers 1713 and 1723, and packet data convergence protocol (PDCP) layers 1714 and 1724 included in L2, service data adaptation protocol (SDAP) layers 1715 and 1725 included in L3, and the like.

Referring to FIG. 17B, the communication system may include a terminal 1760 and a base station 1770. The terminal 1760 and the base station 1770 may perform mutual control signal transmission/reception based on the control plane protocol stack structure 1750 shown in FIG. 17B.

In the control plane protocol stack structure 1750 of the communication system, the terminal 1760 and the base station 1770 may include PHY layers 1761 and 1771 included in L1, MAC layers 1762 and 1772, RLC layers 1763 and 1773, and PDCP layers 1764 and 1774 included in L2, and RRC layers 1765 and 1775 included in L3, and the like.

The communication system may further include an Access and Management Mobility Function (AMF) 1780. In the control plane protocol stack structure 1750, the terminal 1760 and the AMF 1780 may include non-access stratum (NAS) layers 1766 and 1786. The base station 1770 may not include a NAS layer. In other words, in the control plane protocol stack structure 1750, the NAS layer of the base station 1770 may be transparent.

Figure 18A:
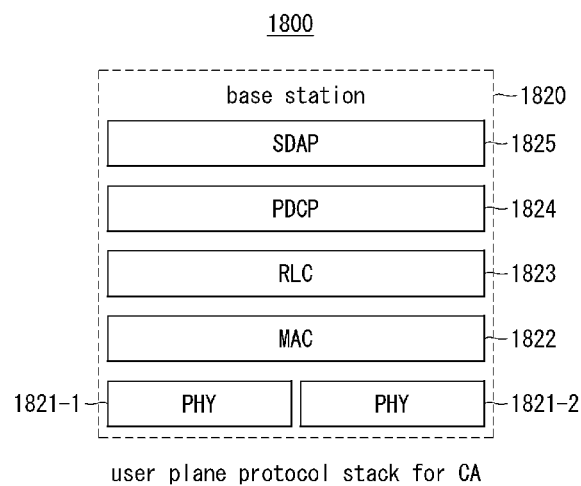
FIGS. 18A and 18B are conceptual diagrams for describing a second exemplary embodiment of a user plane protocol structure in a communication system.
Figure 18B:
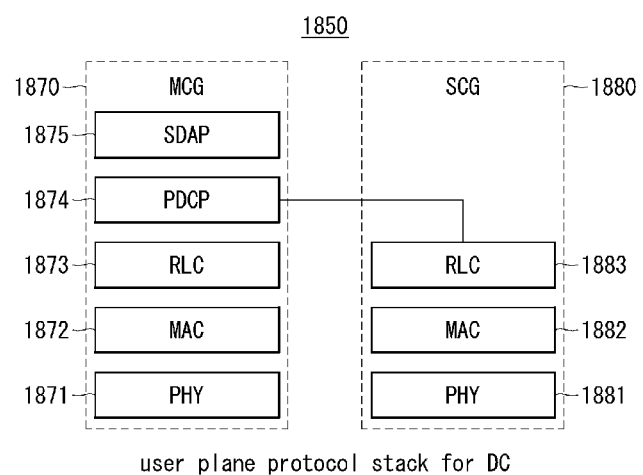

FIGS. 18A and 18B are conceptual diagrams for describing a second exemplary embodiment of a user plane protocol structure in a communication system.

Referring to FIGS. 18A and 18B, a radio interface protocol stacks or radio interface protocol stack structures 1800 and 1850 may be defined in a radio connection section between communication nodes. For example, in the radio connection section between communication nodes, the user plane protocol stack structure 1800 for carrier aggregation (CA) may be defined. Alternatively, in the radio connection section between communication nodes, the user plane protocol stack structure 1850 for dual connectivity (DC) may be defined.

Referring to FIG. 18A, the communication system may include a base station 1820. The base station 1820 may correspond to an eNB, a gNB, or the like. The base station 1820 may perform CA-based data communications with a lower node, such as a terminal, based on the user plane protocol stack structure 1800 for CA shown in FIG. 18A. In the user plane radio interface protocol stack structure 1800 for CA, the base station 1820 may include a plurality of PHY layers 1821-1 and 1821-2 included in L1, a MAC layer 1822, RLC layer 1823, and PDCP layer 1824 included in L2, and an SDAP layer 1825 included in L3, and the like.

Referring to FIG. 18B, the communication system may include a master cell group (MCG 1870) and a secondary cell group (SCG) 1880. A cell or base station of the MCG 1870 and SCG 1880 may configure a DC with a lower node such as a terminal based on the user plane protocol stack structure 1850 for DC. In the user plane radio interface protocol stack structure 1850 for DC, the cell or base station of the MCG 1870 may include a PHY layer 1871 included in L1, a MAC layer 1872, RLC layer 1873, and PDCP layer 1874 included in L2, a SDAP layer 1875 included in L3, and the like. Meanwhile, the cell or base station of the SCG 1880 may include a PHY layer 1881 included in L1, a MAC layer 1882 and RLC layer 1883 included in L2, and the like.

An exemplary embodiment of the communication system supporting 5G wireless communication may support the following various DC types.

- EUTRA-NR DC (EN-DC): DC in which the MCG is configured based on 4G Evolved Universal Terrestrial Radio Access (E-UTRA), and the SCG is configured based on the 5G NR. Here, a control plane of the MCG may be configured through a 4G core (i.e., Evolved Packet Core (EPC)).
- Next Generation-RAN E-UTRA-NR DC (NGEN-DC): DC in which the MCG is configured based on the E-UTRA and the SCG is configured based on the NR. In this case, a control plane of the MCG may be configured through a 5G core (i.e., Next Generation Core (NGC)).
- NR-EUTRA DC (NE-DC): DC in which the MCG is configured based on the NR and the SCG is configured based on the E-UTRA
- NR DC: DC in which both the MCG and the SCG are configured based on the NR The base station may perform DC-related configuration for the terminal (i.e., UE, MT, etc.) using one or more higher layer parameters. For example, higher layer parameters used by the base station for the DC-related configuration may include at least some of CellGroupConfig, SpCellConfig, ReconfigurationWithSync, and SCellConfig. The higher layer parameter CellGroupConfig may be the same as or similar to that shown in Table 19.

TABLE 19

```
CellGroupConfig ::=                       SEQUENCE {
    cellGroupId                           // cell group ID. 0 indicates MCG, and a value of 1 or more indicates SCG
    rlc-BearerToAddModList                //configure a relation list of MAC logical channel, RLC entity, and radio
bearer
    rlc-BearerToReleaseList               //release a relation list of MAC logical channel, RLC entity, and radio
bearer
    mac-CellGroupConfig                   //MAC parameters applicable to the corresponding cell group
    physicalCellGroupConfig
        //configuration of common PHY layer parameters such as HARQ, power control, etc. within a cell
group
    spCellConfig                          //configure a SpCell of a cell group by referring to SpCellConfig
    sCellToAddModList                     //configure a list of SCells included in a cell group by referring to
SCellConfig
    sCellToReleaseList                    //exclude the Scell from a cell group by referring to SCellIndex
    ...,
    [[
    reportUplinkTxDirectCurrent           //configure whether a UE reports a uplink DC position
    ]],
    [[
    bap-Address-r16                       //configure a backhal adaptation protocol (BAP) address of a parent node in a cell
group
    bh-RLC-ChannelToAddModList-r16        //configure backhaul RLC entities and a list of corresponding
MAC logical channels
    bh-RLC-ChannelToReleaseList-r16       //release backhaul RLC entities and a list of corresponding MAC
logical channels
      f1c-TransferPath-r16 //configure a F1-C transfer path to be used by EN-DC IAB-MT
      simultaneousTCI-UpdateList1-r16        //a list 1 of serving cells for which TCI updata can be
simultaneously performed through a single MAC CE (corresponding to coresetPoolIndex =0, i.e.,
corresponding to serving cells of a first TRP for which TCI update can be simultaneouly performed)
      simultaneousTCI-UpdateList2-r16        //a list 2 of serving cells for which TCI updata can be
simultaneously performed through a single MAC CE (corresponding to coresetPoolIndex =0, i.e.,
corresponding to serving cells of a first TRP for which TCI update can be simultaneouly performed)
      simultaneousSpatial-UpdatedList1-r16    //a list 1 of sewing cells for which spatial relation update can be
simultaneously performed through a single MAC CE (corresponding to coresetPoolIndex =0, i.e.,
corresponding to serving cells of a first TRP for which spatial relation update can be simultaneouly
performed)
      simultaneousSpatial-UpdatedList2-r16    //a list 2 of serving cells for which spatial relation update can be
simultaneously performed through a single MAC CE (corresponding to coresetPoolIndex =0, i.e.,
corresponding to serving cells of a first TRP for which spatial relation update can be simultaneouly
performed)
      uplinkTxSwitchingOption-r16          //configure a UL TX switching option for inter-band UL CA or
(NG)EN-DC
      uplinkTxSwitchingPowerBoosting-r16   //configure whether a UE can perform 3dB power boosting for a
second carrier when applying inter-band UL CA
    ]]
}
```

Meanwhile, the higher layer parameter SpCellConfig may be the same as or similar to that shown in Table 20.

TABLE 20

```
SpCellConfig ::=              SEQUENCE {
    servCellIndex             // servince cell ID of PSCell. PCell of MCG uses ID=0
    reconfigurationWithSync   //configuration values used for synchronous reconfiguration of a target SpCell
    rlf-TimersAndConstants    //configuration of a timer and a constant value for detecting and triggerig cell-level radio link failure
    rlmInSyncOutOfSyncThreshold
    spCellConfigDedicated     //ServingCellConfig of SpCell
    ...
}
```

Meanwhile, the higher layer parameter ReconfigurationWithSync may be the same as or similar to that shown in Table 21.

TABLE 21

```
ReconfigurationWithSync ::=   SEQUENCE {
    spCellConfigCommon        // ServingCellConfigCommon of SpCell
    newUE-Identity            // New RNTI value configuration
    t304                      // configure a t304 timer value
    rach-ConfigDedicated          CHOICE {
                              // RACH configuration used for Reconfiguration with sync
        uplink
        supplementaiyUplink
    }
OPTIONAL,                     -- Need N
    ...,
    [[
    smtc                      //configure a periodicity, offset, and duration of SSB to be used for change of PSCell or PCell, or addition of PSCell
    ]],
    [[
    daps-UplinkPowerConfig-r16
    ]]
}
```

Meanwhile, the higher layer parameter SCellConfig may be the same as or similar to that shown in Table 22.

TABLE 22

```
SCellConfig ::=               SEQUENCE {
    sCellIndex                // SCell index
    sCellConfigCommon         // ServingCellConfigCommon of SCell
    sCellConfigDedicated      // ServingCellConfig of SCell
    ...,
    [[
    smtc                      //configure a periodicity, offset, and duration of SSB to be used for addition of SCell
    ]],
    [[
    sCellState-r16            // configure whether to activate SCell
    secondaryDRX-GroupConfig-r16
    ]]
}
```

Meanwhile, cell-specific configurations of a serving cell configured as a SpCell or SCell in the MCG or SCG may be performed with reference to a higher layer parameter ServingCellConfigCommon. The higher layer parameter ServingCellConfigCommon may be the same as or similar to that shown in Table 23.

TABLE 23

```
ServingCellConfigCommon ::=   SEQUENCE {
    physCellId                // physical cell ID of the corresponding serving cell
    downlinkConfigCommon      // cell-specific downlink configuration of the corresponding serving cell
    uplinkConfigCommon        // cell-specific uplink configuration of the corresponding serving cell
    supplementaryUplinkConfig // cell-specific SUL configuration of the corresponding serving cell
    n-TimingAdvanceOffset     // timing advanced offset configuration
    ssb-PositionsInBurst          CHOICE {
```

TABLE 23-continued

|  |  |
|---|---|
| shortBitmap | // 4-bit SSB position configuration |
| mediumBitmap | // 8-bit SSB position configuration |
| longBitmap | //64-bit SSB position configuration |
| } | |
| ssb-periodicityServingCell | // SSB periodicity configuration |
| dmrs-TypeA-Position | // first DMRS symbol configuration for Type A DMRS |
| lte-CRS-ToMatchAround | // LTE CRS rate matching configuration |
| rateMatchPatternToAddModList | // rate matching pattern list additional/new configuration |
| rateMatchPatternToReleaseList | // rate matching pattern list release |
| ssbSubcarrierSpacing | // subcarrier spacing configuration for SSB |
| tdd-UL-DL-ConfigurationCommon | // cell-specific D/F/U configuration for a TDD cell (refer to detail description on slot formats) |
| ss-PBCH-BlockPower | // SSB transmission power (−60dBm ~ 50dBm) |
| ..., | |
| [[ | |
| channelAccessMode-r16 | CHOICE { |
|   dynamic | |
|   semiStatic | |
| } | |
| discoveryBurstWindowLength-r16 | |
| ssb-PositionQCL-r16 | // configure QCL relation between SSB positions |
| highSpeedConfig-r16 | |
| ]] | |
| } | |

Meanwhile, UE-specific configurations or cell-specific configurations of a serving cell configured as a SpCell or SCell in the MCG or SCG may be performed with reference to a higher layer parameter ServingCellConfig. The higher layer parameter ServingCellConfig may be the same as or similar to that shown in Table 24.

TABLE 24

|  |  |
|---|---|
| ServingCellConfig ::= | SEQUENCE { |
|   tdd-UL-DL-ConfigurationDedicated | // UE-specific D/F/U configuration for a TDD cell (refer to detail description on slot formats) |
|   initialDownlinkBWP | // UE-specific configuration for an initial BWP (BWP #0) |
|   downlinkBWP-ToReleaseList | // a list of BWPs to be released |
|   downlinkBWP-ToAddModList | // a list of new BWPs or BWPs to be added |
|   firstActiveDownlinkBWP-Id | |
|   bwp-InactivityTimer | |
|   defaultDownlinkBWP-Id | |
|   uplinkConfig | |
|   supplementaryUplink | |
|   pdcch-ServingCellConfig | |
|   pdsch-ServingCellConfig | |
|   csi-MeasConfig | |
|   sCellDeactivationTimer | |
|   crossCarrierSchedulingConfig | |
|   tag-Id | |
|   dummy | |
|   pathlossReferenceLinking | |
|   servingCellMO | |
|   ..., | |
|   [[ | |
|   lte-CRS-ToMatchAround | |
|   rateMatchPatternToAddModList | |
|   rateMatchPatternToReleaseList | |
|   downlinkChannelBW-PerSCS-List | |
|   ]], | |
|   [[ | |
|   supplementaryUplinkRelease | |
|   tdd-UL-DL-ConfigurationDedicated-IAB-MT-r16 | // IAB-MT-specific D/F/U configuration for a TDD cell (refer to detail description on slot formats) |
|   dormantBWP-Config-r16 | |
|   ca-SlotOffset-r16 | CHOICE { |
|     refSCS15kHz | |
|     refSCS30KHz | |
|     refSCS60KHz | |
|     refSCS120KHz | |
|   } | |
|   channelAccessConfig-r16 | |
|   intraCellGuardBandsDL-List-r16 | |
|   intraCellGuardBandsUL-List-r16 | |
|   csi-RS-ValidationWith-DCI-r16 | |
|   lte-CRS-PatternList1-r16 | |
|   lte-CRS-PatternList2-r16 | |
|   crs-RateMatch-PerCORESETPoolIndex-r16 | |
|   enableTwoDefaultTCI-States-r16 | |

TABLE 24-continued

```
enableDefaultTCI-StatePerCoresetPoolIndex-r16
enableBeamSwitchTiming-r16
cbg-TxDiffTBsProcessingType1-r16
cbg-TxDiffTBsProcessingType2-r16
]]
}
```

Meanwhile, cell-specific configurations of a serving cell configured as a SpCell or SCell within the MCG or SCG may be performed with reference to a higher layer parameter ServingCellConfig. The higher layer parameter ServingCellConfig may be the same as or similar to the following.

The DC or CA may be defined within a specific frequency resource. The DC or CA may operate within one band (e.g., 4G band or 5G band) including one or more CCs. The DC or CA operating within one band may be referred to as 'intra-band DC' or 'in-band CA'. On the other hand, the DC or CA may be applied across one or more bands or may be applied across a band combination configured as a combination of one or more bands. The DC or CA applied across one or more bands or a band combination may be referred to as 'inter-band DC' or 'inter-band CA'.

Meanwhile, the DC or CA may operate within one CC. The DC or CA operating within one CC may be referred to as 'intra-carrier DC' or 'intra-carrier CA'. On the other hand, the DC or CA may be applied across one or more CCs. The DC or CA applied across one or more CCs may be referred to as 'inter-carrier DC' or 'inter-carrier CA'.

Meanwhile, the DC or CA may operate within one frequency range (FR). The DC or CA applied within one FR may be referred to as 'intra-FR DC' or 'intra-FR CA'. On the other hand, the DC or CA may be applied across one or more FRs. For example, some cell groups or CCs may exist in the FR1, and the remaining cell groups or CCs may be configured to exist in the FR2. They may be applied across one or more FRs. The DC or CA may be referred to as 'inter-FR DC' or 'inter-FR CA'.

The intra-FR DC/CA, inter-FR DC/CA, intra-band DC/CA, inter-band DC/CA, intra-carrier DC/CA, inter-carrier DC/CA, or the like may be configured according to how far or close a frequency axis distance between one or more CCs or serving cells is. Hardware of a communication node such as a terminal or a base station may be implemented differently depending on which combination of the DCs/CAs should be supported. Hereinafter, exemplary embodiments of a hardware implementation method of a communication node may be described by taking an implementation scheme for supporting the intra-band CA or inter-band CA as an example. However, this is only an example for convenience of description, and exemplary embodiments of the present disclosure are not limited thereto.

Figure 19:
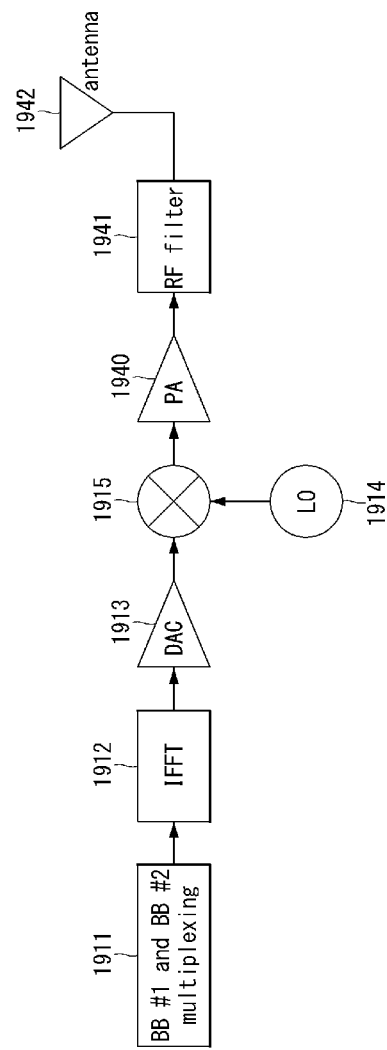
FIG. 19 is a conceptual diagram for describing a first exemplary embodiment of a communication node that transmits a radio signal in a communication system.

FIG. 19 is a conceptual diagram for describing a first exemplary embodiment of a communication node that transmits a radio signal in a communication system.

Referring to FIG. 19, an exemplary embodiment of the communication system may include a communication node 1900 for transmitting a radio signal. The communication node 1900 may include structures to support the intra-band CA using contiguous resource allocation.

In a baseband (BB) processor 1911 of the communication node 1900, baseband (BB) signals (i.e., BB #1 and BB #2) for a CC #1 and a CC #2 may be multiplexed. The multiplexed signals may be modulated according to an OFDM scheme through an Inverse Fast Fourier Transform (IFFT) 1912. The modulated signal may be converted into an analog signal through a digital-to-analog converter (DAC) 1913. The converted analog signal may be converted to a transmission band through a local oscillator (LO) 1914 and a mixer 1915 corresponding to one intermediate frequency (IF). The signal converted to the transmission band may be amplified by one power amplifier (PA) 1940 to satisfy both a target transmission output of the CC #1 and a target transmission output of the CC #2. The communication node 1900 may transmit the signal amplified by the PA 1940 and passed through an RF filter 1941 through an antenna 1942.

In an exemplary embodiment of the intra-band CA using contiguous resource allocation, a frequency axis distances between the CC #1 and the CC #2 may be relatively close, and the CC #1 and the CC #2 may be configured to use contiguous resources on the frequency axis. In this case, as in the exemplary embodiment of the communication node 1900 supporting the intra-band CA shown in FIG. 19, signal transmission may be performed using one BB processor 1911 and one LO 1914. When all the CCs (i.e., CC #1 and CC #2) share one PA 1940 as in the exemplary embodiment of the communication node 1900 supporting the intra-band CA shown in FIG. 19, power allocation between the CCs may be performed relatively freely.

Figure 20A:
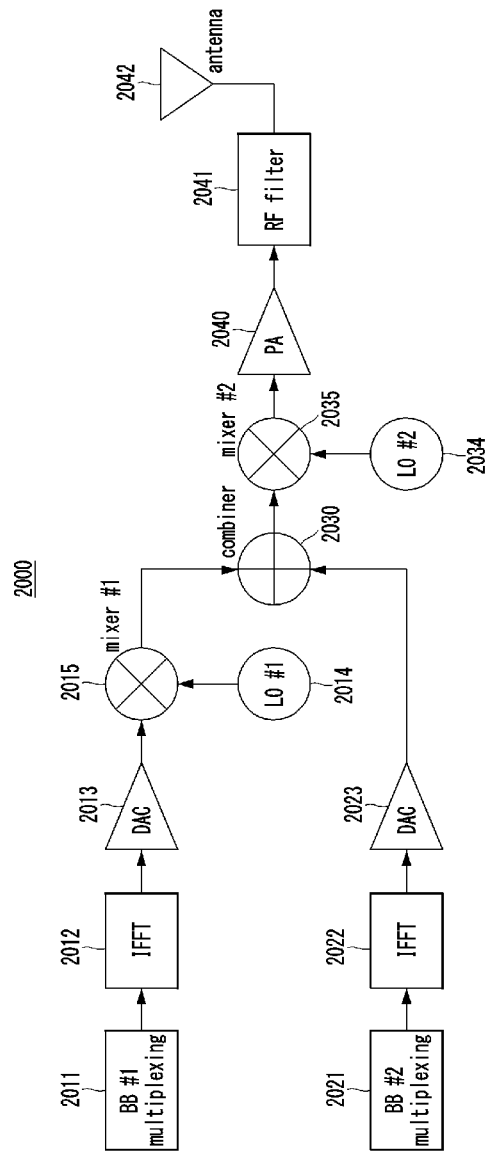
FIGS. 20A and 20B are conceptual diagrams for describing a second exemplary embodiment of a communication node that transmits a radio signal in a communication system.
Figure 20B:
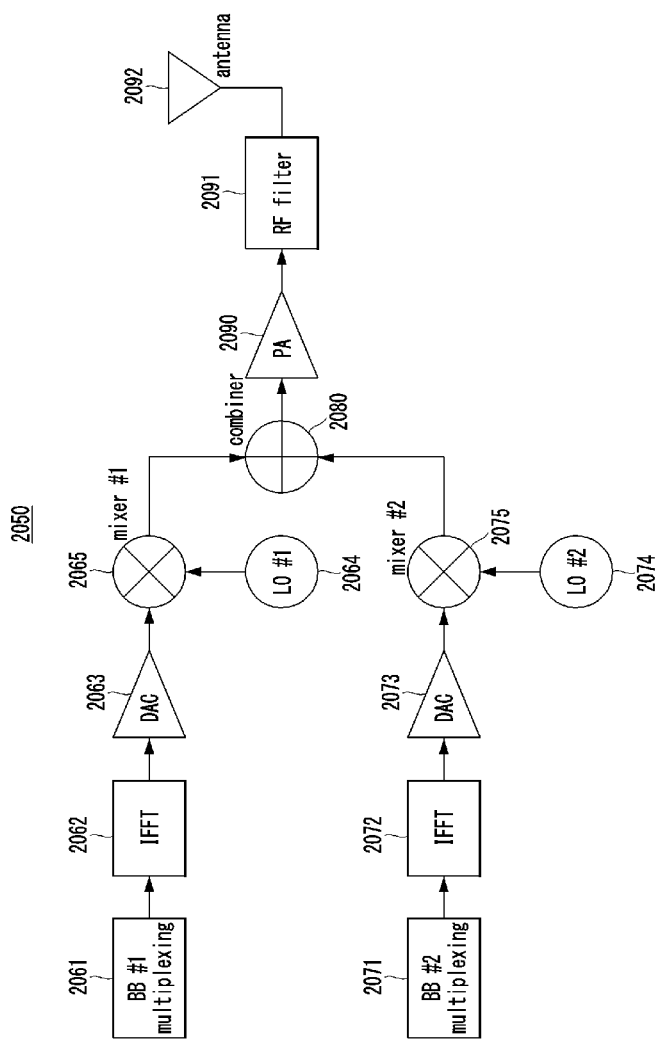

FIGS. 20A and 20B are conceptual diagrams for describing a second exemplary embodiment of a communication node that transmits a radio signal in a communication system.

Referring to FIGS. 20A and 20B, an exemplary embodiment of the communication system may include communication nodes 2000 and 2050 that transmit radio signals. The communication nodes 2000 and 2050 may include structures for supporting the intra-band CA using non-contiguous resource allocation. In the intra-band CA using non-contiguous resource allocation, a CC #1 and a CC #2 may be configured to use non-contiguous resources in the frequency axis, and may be configured to use different numerologies.

Referring to FIG. 20A, in an exemplary embodiment of the communication system, the communication node 2000 may include a plurality of BB processors 2011 and 2021, which are separated from each other, in order to individually multiplex the CC #1 and the CC #2. Specifically, the BB processor #1 2011 may multiplex a baseband signal BB #1 of the CC #1. The multiplexed signal may be modulated according to the OFDM scheme through an IFFT. The modulated signal may be converted into an analog signal through a DAC 2013. The converted analog signal may be converted to an intermediate band through an LO #1 2014 and a mixer #1 2015 corresponding to an IF #1. Here, the 'intermediate band' may mean a difference between a transmission band of the CC #1 and a transmission band of the CC #2. On the other hand, the BB processor #2 2021 may multiplex a baseband signal BB #2 of the CC #2. The multiplexed signal may be modulated according to the OFDM scheme through an IFFT 2022. The modulated signal may be converted into an analog signal through a DAC 2023.

The analog signals converted from the BB #1 and the BB #2 may be combined in a combiner 2030. A signal output from the combiner 2030 may be converted to the transmission band of the CC #1 and/or the CC #2 through an LO #2 2034 and a mixer #2 2035 corresponding to an IF #2. The signal converted to the transmission band may be amplified by one PA 2040 to satisfy both a target transmission output of the CC #1 and a target transmission output of the CC #2. The communication node 2000 may transmit the signal amplified by the PA 2040 and passed through an RF filter 2041 through an antenna 2042.

Referring to FIG. 20B, in another exemplary embodiment of the communication system, the communication node 2050 may include a plurality of BB processors 2061 and 2071, which are separated from each other, in order to individually multiplex the CC #1 and the CC #2. Specifically, the BB processor #1 2061 may multiplex the baseband signal BB #1 of the CC #1. The multiplexed signal may be modulated according to the OFDM scheme through an IFFT. The modulated signal may be converted into an analog signal through an DAC 2063. The converted analog signal may be converted to the transmission band of the CC #1 through an LO #1 2064 and a mixer #1 2065 corresponding to an IF #1. On the other hand, the BB processor #2 2071 may multiplex the baseband signal BB #2 of the CC #2. The multiplexed signal may be modulated according to the OFDM scheme through an IFFT 2072. The modulated signal may be converted into an analog signal through a DAC 2073. The converted analog signal may be converted to the transmission band of the CC #2 through an LO #2 2074 and a mixer #2 2075 corresponding to an IF #2.

The analog signals converted from the BB #1 and the BB #2 may be combined in a combiner 2080. A signal output from the combiner 2080 may be amplified by one PA 2090 to satisfy both a target transmission output of the CC #1 and a target transmission output of the CC #2. The communication node 2050 may transmit the signal amplified by the PA 2090 and passed through an RF filter 2091 through an antenna 2092.

Similarly to that described with reference to FIG. 19, in the transmitting nodes 2000 and 2050 described with reference to FIGS. 20A and 20B, all the CCs (i.e., CC #1 and CC #2) share one PA 2040 or 2090. Accordingly, power allocation between the CCs may be performed relatively freely.

Figure 21:
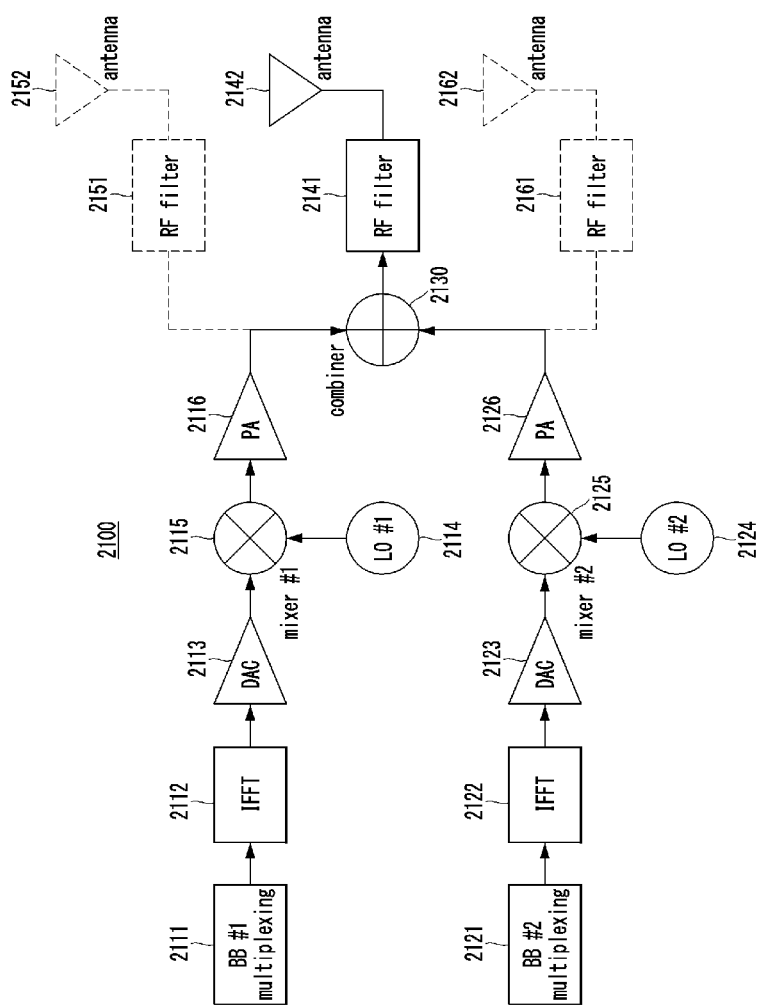
FIG. 21 is a conceptual diagram for describing a third exemplary embodiment of a communication node that transmits a radio signal in a communication system.

FIG. 21 is a conceptual diagram for describing a third exemplary embodiment of a communication node that transmits a radio signal in a communication system.

Referring to FIG. 21, an exemplary embodiment of the communication system may include a communication node 2100 for transmitting a radio signal. The communication node 2100 may include structures for supporting the inter-band CA. In general, frequency allocation between bands may be non-contiguous. Therefore, in the case of inter-band CA, it may be assumed that non-contiguous resource allocation is used. In addition, in the case of inter-band CA, it may be assumed that a CC #1 and a CC #2 use different numerologies.

In an exemplary embodiment of the communication system, the communication node 2100 may include a plurality of BB processors 2111 and 2121, which are separated from each other, in order to individually multiplex the CC #1 and the CC #2. Specifically, the BB processor #1 2111 may multiplex the baseband signal BB #1 of the CC #1. The multiplexed signal may be modulated according to the OFDM scheme through an IFFT. The modulated signal may be converted into an analog signal through a DAC 2113. The converted analog signal may be converted to the transmission band of the CC #1 through an LO #1 2114 and a mixer #1 2115 corresponding to an IF #1. The signal converted to the transmission band may be amplified by a PA #1 2116 to satisfy a target transmission output of the CC #1.

On the other hand, the BB processor #2 2121 may multiplex the baseband signal BB #2 of the CC #2. The multiplexed signal may be modulated according to the OFDM scheme through an IFFT 2122. The modulated signal may be converted into an analog signal through a DAC 2123. The converted analog signal may be converted to the transmission band of the CC #2 through an LO #2 2124 and a mixer #2 2125 corresponding to an IF #2. The signal converted to the transmission band may be amplified by a PA #2 2126 to satisfy a target transmission output of the CC #2.

The signals converted and amplified from the BB #1 and the BB #2 may be combined in a combiner 2130. A signal combined by the combiner 2130 may be input to an RF filter 2141. The RF filter 2141 may remove an out-of-band (OOB) emission component from the input signal. The communication node 2100 may transmit the signal passed through the RF filter 2141 through an antenna 2142.

Differently from those described with reference to FIGS. 19 to 20B, in the communication node 2100 described with reference to FIG. 21, the CC #1 and the CC #2 may use the independent PAs 2116 and 2126. In this case, it may be advantageous that a maximum output by the PA is improved and the hardware configuration cost is reduced. On the other hand, in the communication node 2100 described with reference to FIG. 21, each CC (i.e., CC #1 or CC #2) or each band uses the PA 2116 or 2126 independent of each other, so that power allocation between the CCs or bands may not be performed relatively freely.

In the exemplary embodiment of the communication node 2100 described above, hardware constraints that the combiner 2130 should have a high output and the RF filter 2141 should be a wideband RF filter covering all the transmission bands of all the CCs are required. On the other hand, when it is difficult to satisfy such the constraints, in another exemplary embodiment of the communication node 2100, each of the signals converted and amplified from the BB #1 and the BB #2 may not be combined and may be transmitted through the independent RF filter 2151 or 2161 and the independent antenna 2152 or 2162.

The exemplary embodiments of the transmitting node described with reference to FIGS. 19 to 21 are only examples for convenience of description, and exemplary embodiments of the present disclosure are not limited thereto. For example, in an exemplary embodiment of the communication system, the transmitting node may be implemented in a manner other than the manners described with reference to FIGS. 19 to 21. Depending on the implementation scheme of the transmitting node, the DC/CA type supported by the transmitting node may vary.

In particular, in the case of the terminal, the assumption that the base station (or network) applies to communication with the terminal may need to be changed depending on how the terminal is implemented. For example, the base station may need to identify whether power can be shared for each carrier, band, or FR in the specific terminal, or whether an independent PA are used for each carrier, band, or FR. In an exemplary embodiment of the communication system, the terminal supporting DC/CA may perform a UE capability reporting to the base station. Here, the UE capability report transmitted by the terminal supporting DC/CA to the base station may include information related to a combination of DCs/CAs supported by the terminal (e.g., at least one of the intra-FR DC/CA, inter-FR DC/CA, intra-band DC/CA, inter-band DC/CA, intra-carrier DC/CA, and inter-carrier DC/CA) and an implementation scheme in accordance with the combination (e.g., whether static or semi-static power sharing between CCs or bands is possible)).

In an exemplary embodiment of the communication system, one PA or a set of PAs may be shared across a plurality of bands, a plurality of CCs, and a plurality of serving cells according to the implementation scheme of the transmitting node such as the base station or terminal. In this case, if a Rule 2: For a terminal supporting the half-duplex TDD CA function, the base station may freely configure the transmission direction for each serving cell. Here, the terminal may determine a priority and/or transmission direction for each serving cell based on transmission directions (D/U) and detailed type (e.g., semi SFI/dynamic/RRC, etc.) according to rules identical or similar to those listed in Table 25 below.

TABLE 25

| No. | Ref. cell | other cell | UE behavior | Description |
|---|---|---|---|---|
| 1 | Semi SFI D | Semi SFI U | Allowed to drop U for inter-band. Error case in intra-band. | Dropping U on other cell Error case in intra-band |
| 2 | Semi SFI D | RRC U | Allowed to drop U. | Dropping on other cell |
| 3 | Semi SFI D | Dynamic U | Allowed to drop D for inter-band. Error case in intra-band. | Overriding semi SFI D to F on reference cell for the UE |
| 4 | Semi SFI U | Semi SFI D | Allowed to drop D for inter-band. Error case in intra-band. | Dropping D on other cell Error case in intra-band |
| 5 | Semi SFI U | RRC D | Allowed to drop D. | Dropping on other cell |
| 6 | Semi SFI U | Dynamic D | Error. | Error |
| 7 | RRC D | RRC U | Allowed to drop U. | Dropping on other cell |
| 8 | RRC U | RRC D | Allowed to drop D. | Dropping on other cell |
| 9 | Dynamic D | Dynamic U | Error. | Error |
| 10 | Dynamic U | Dynamic D | Error. | Error |
| 11 | RRC U | Semi SFI D | Allowed to drop D. | Dropping on other cell |
| 13 | RRC D | Semi SFI U | Allowed to drop U. | Dropping on other cell |
| 15 | RRC U | Dynamic D | Error. | Error |
| 16 | RRC D | Dynamic U | Allowed to drop D for inter-band Error case in intra-band. | Dropping RRC D on reference cell | certain terminal has half-duplex capability in a specific serving cell (i.e., if only one of uplink transmission and downlink reception can be performed at a time), determination of D/U directions at the specific serving cell may also affect D/U directions at another serving cell associated with (i.e., sharing the same PA or PA set with) the specific serving cell.

For example, when a certain terminal operates an independent RF chain (a set of RF elements for radio signal transmission and reception, such as a PA, RF filter, antenna, etc.) for each of a serving cell #1 and a serving cell #2, the terminal may apply a different transmission direction to each of the serving cells. In other words, when a certain terminal operates an independent RF chain for each of the serving cell #1 and the serving cell #2, transmission direction information such as downlink (D), uplink (D), and flexible (F) for each serving cell may be determined differently. On the other hand, when a certain terminal operates the same RF chain for a plurality of serving cells, the terminal may operate normally only when the same transmission direction is applied to all serving cells supported by the RF chain. In this case, if different transmission directions are configured or indicated to the serving cell #1 and the serving cell #2 for the terminal, ambiguity may occur in the operations of the terminal. In this case, the terminal may operate by selecting one of the different transmission directions. Alternatively, the terminal may recognize the configuration or indication for the different transmission directions as an error, may ignore the configurations and indications, and may not perform operations related thereto.

As such, the following rules may be applied to resolve the ambiguity that may occur depending on the implementation of the terminal.

Rule 1: For a terminal that does not support the half-duplex TDD CA function, the base station should ensure that the transmission directions are consistent as D or U across all serving cells.

In the exemplary embodiment shown in Table 25, a reference cell (i.e., Ref cell) may be determined for each OFDM symbol. The reference cell may be defined as a cell having the lowest cell identifier (ID) among a plurality of serving cells each of which has a transmission direction determined by 'RRC D/U' or 'semi SFI D/U' within one band or band combination.

In the exemplary embodiment shown in Table 25, the 'error' may mean that the terminal determines the configuration or indication of the base station as an error. The base station may know that the terminal does not expect to be configured or indicated with cases indicated as 'error' in Table 25.

In Table 25 and the like, the detailed type of each symbol may be defined as follows.

Semi SFI D and U: D and U symbols configured by TDD-UL-DL-ConfigurationCommon or TDD-UL-DL-ConfigDedicated Semi SFI F: Flexible symbols configured by TDD-UL-DL-ConfigurationCommon or TDD-UL-DL-ConfigDedicated when the TDD-UL-DL-ConfigurationCommon or TDD-UL-DL-ConfigDedicated is provided to the terminal. Flexible symbols configured when TDD-UL-DL-ConfigurationCommon or TDD-UL-DL-ConfigDedicated is not provided to the terminal.

RRC D: Symbols corresponding to a higher-layer configured PDCCH, PDSCH, or CSI-RS in the semi-SFI F of the same cell RRC U: Symbols corresponding to a higher-layer configured SRS, PUCCH, PUSCH, or PRACH in the semi SFI F of the same cell Dynamic D and U: Symbols scheduled as D or U by a DCI format other than the DCI format 2_0 in the semi-SFI F of the same cell FIG. 22 is a conceptual diagram for describing an exemplary embodiment of an IAB network supporting CA or DC in a communication system.

Figure 22:
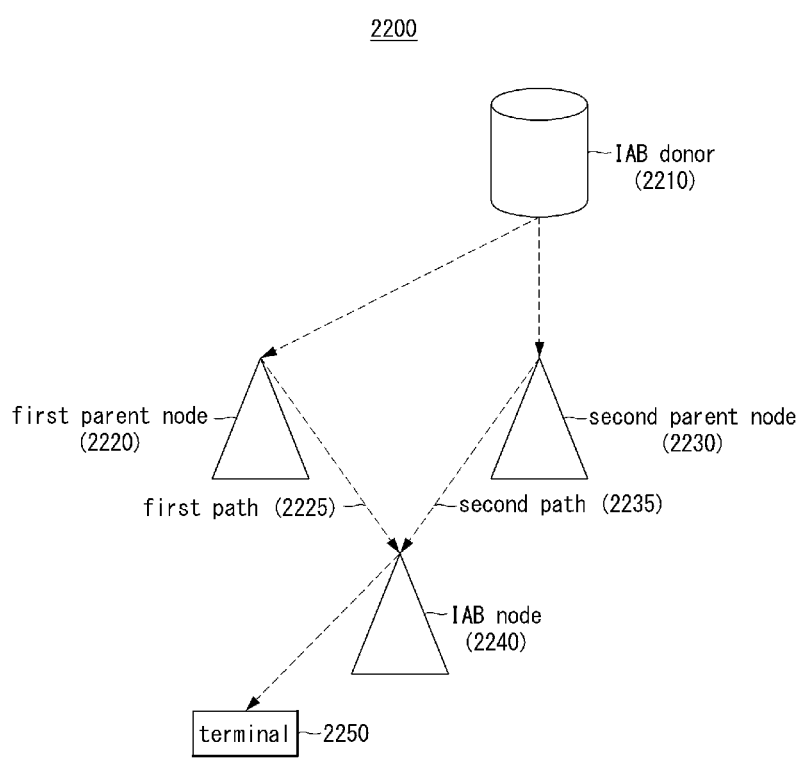
FIG. 22 is a conceptual diagram for describing an exemplary embodiment of an IAB network supporting CA or DC in a communication system.

Referring to FIG. 22, an IAB network 2200 in the communication system may be configured with links such as IAB links and access links of one or more layers. Here, the IAB links may include a link between an IAB donor 2210 and a first parent node 2220, a link between the first parent node 2220 and an IAB node 2240, and the like. Meanwhile, the access links may include a link between the IAB node 2240 and a terminal 2250.

In the IAB network, for the purpose of improving the reliability and robustness of a specific IAB link, an IAB node may be configured to have a plurality of upper nodes as parent nodes. For example, in the exemplary embodiment shown in FIG. 22, the IAB network 2200 may configure the IAB node 2240 to have one or more upper nodes 2220 and 2230 as parent nodes. Here, the first and second parent nodes 2220 and 2230 that are the parent nodes of the IAB node 2240 may be connected to the same IAB donor 2210. The IAB node 2240 may communicate with the first parent node 2220 through a first path 2225. The IAB node 2240 may communicate with the second parent node 2230 through a second path 2235.

In order for the IAB network 2200 to establish the plurality of links or communication paths 2225 and 2235 between the IAB node 2240 and the plurality of parent nodes 2220 and 2230, various schemes such as CA or DC may be used. Here, the applicable DC/CA type (e.g., intra-band DC/CA or inter-band DC/CA, DC/CA using contiguous resource allocation, or DC/CA using non-contiguous resource allocation, etc.) may vary according to the information that can be shared or exchanged between the plurality of parent nodes 2220 and 2230 and the protocol structure types thereof.

For example, if the parent nodes 2220 and 2230 do not share a MAC layer, it may not be possible to apply CA, or degradation of a throughput may occur when applying CA due to a delay caused by the MAC sharing. As another example, if the parent nodes 2220 and 2230 apply NR-DC in which the first path 2225 is configured to a MCG and the second path 2235 is configured to an SCG, a band combination for the NR-DC may be configured with two or more different bands. In this case, only the inter-band NR-DC can be supported, and a frequency axis distance between CCs for the first and second paths 2225 and 2235 is unnecessarily increased, and frequency axis resource consumption and power consumption are increased. On the other hand, even when the plurality of parent nodes 2220 and 2230 are operated based on the intra-band NR-DC, since different CCs within a single band are used, there may be the same disadvantage in that the frequency axis distance between the CCs increases unnecessarily, and frequency axis resource consumption and power consumption increase. On the other hand, when the plurality of parent nodes 2220 and 2230 are operated based on the intra-carrier NR-DC, the above-described disadvantages may not occur. In other words, when the plurality of parent nodes 2220 and 2230 are operated based on the intra-carrier NR-DC, there may be advantages in that the reliability and robustness of the IAB network are improved while the frequency efficiency of the IAB links is improved or maintained high.

First Exemplary Embodiment of Communication System

In a first exemplary embodiment of the communication system, configurations related to the intra-carrier DC operation method according to an implementation scheme of an IAB node are proposed.

In the communication system to which the IAB network is applied, when a plurality of parent nodes are operated based on the intra-carrier DC, there may be advantages in that the frequency efficiency of the IAB links is improved or maintained high, and the reliability and robustness of the IAB network are improved. However, depending on a structure of an RF chain applied to an IAB node, operations of the plurality of parent nodes based on the intra-carrier DC may cause additional complexity. For example, in the operations of the plurality of parent nodes based on the intra-carrier DC, additional complexity may occur in the network operations and the communication node implementations due to coordination for resource allocation between the parent nodes, or the like, and the complexity may vary depending on the structure of the RF chain applied to the IAB node.

In an exemplary embodiment of the communication system, when the IAB node is implemented to use different RF chains for different cell groups or different CCs, as in the communication node 2100 described with reference to FIG. 21, there may be no special restrictions on resource allocation for each cell group when operating the intra-carrier DC.

Meanwhile, in another exemplary embodiment of the communication system, when the IAB node is implemented to use the same RF chain for different cell groups or different CCs, such as the communication node 1900 described with reference to FIG. 19, there may be restrictions on resource allocation for each cell group when operating the intra-carrier DC. When the upper node (e.g., IAB-donor, IAB-CU, IAB-DU, parent node, etc.) of the IAB node wants to apply the intra-carrier DC to the IAB node, DC management techniques based on the capability report from the IAB node may be required.

Figure 23A:
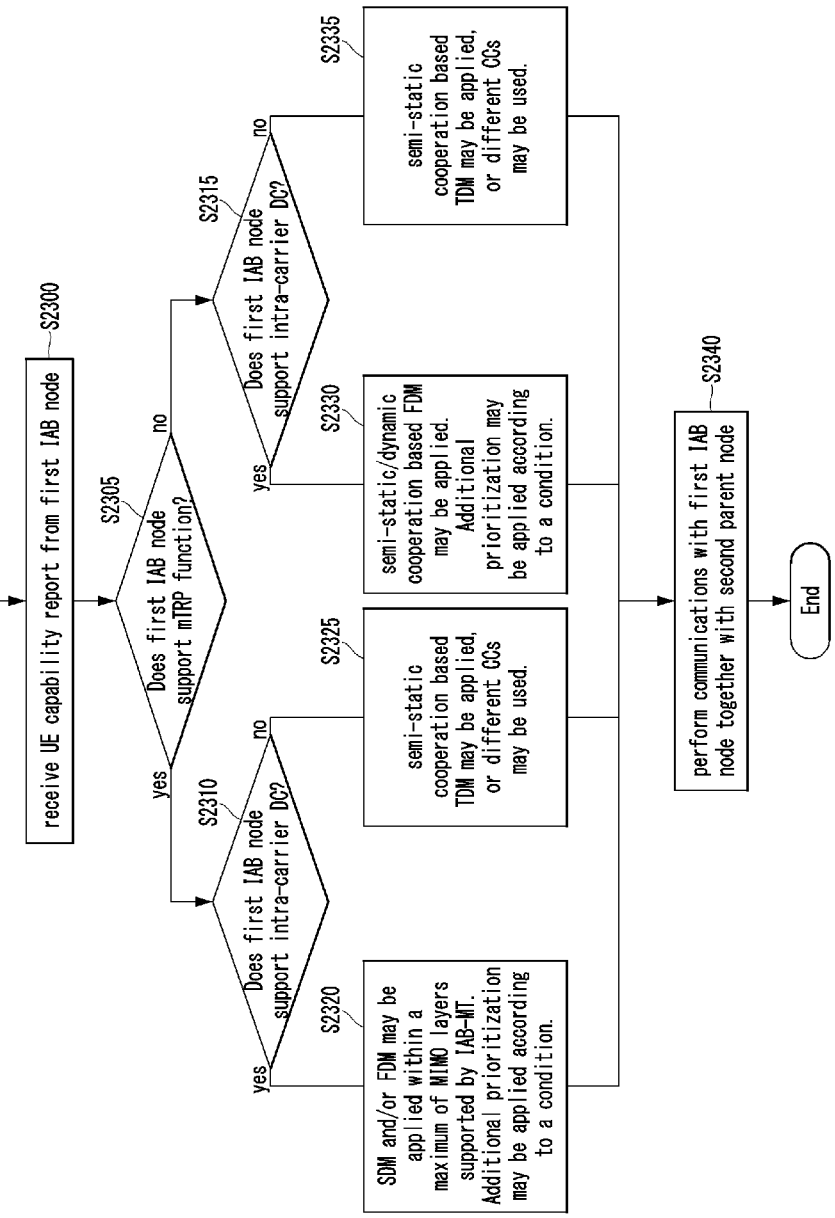

FIGS. 23A and 23B are flowcharts illustrating exemplary embodiments of an intra-carrier DC configuration method in a communication system.

Referring to FIGS. 23A and 23B, the communication system may be a communication system to which an IAB network is applied. For example, the communication system may be the same as or similar to the communication system 2200 described with reference to FIG. 22. The communication system may include one or more IAB nodes, and one or more upper nodes of the one or more IAB nodes. For example, the communication system may include a first IAB node, and a plurality of upper nodes of the first IAB node. However, this is only an example for convenience of description, and exemplary embodiments of the present disclosure are not limited thereto. FIG. 23A shows a first embodiment of an intra-carrier DC configuration method in the communication system including the first IAB node and a first parent node and a second parent node that are the upper nodes of the first IAB node.

Referring to FIG. 23A, the first parent node may receive a first capability report from the first IAB node (S2300). The first IAB node may perform a capability reporting procedure with the first parent node and the second parent node based on the capability reporting procedure identical or similar to the terminal capability reporting procedure described with reference to FIG. 16. The first IAB node, or a first IAB-MT constituting the first IAB node may transmit the first capability report to the first and second parent nodes.

The first capability report that the first parent node receives from the first IAB node may include information indicating whether the first IAB node supports multi-transmission and reception points (multi-TRPs), and/or information indicating whether to support the intra-carrier DC. In an exemplary embodiment of the communication system, the first capability report may include higher layer parameters multiDCI-MultiTRP-r16, singleDCI-SDM-scheme-r16, etc. indicating whether to support multiple Tx/Rx points. Alternatively, the first capability report may include at least one of other independent higher layer parameters indicating whether to support a PUSCH/PUCCH/PDCCH multi-TRP repeated transmission function.

The first parent node may identify whether the first IAB node supports the multi-TRP function based on the first capability report received in the step S2300 (S2305). Subsequently, the first parent node may identify whether the first IAB node supports the intra-carrier DC based on the first capability report received in the step S2300 (S2310, S2315). The first parent node may determine the type of DC to be applied to communications with the first IAB node based on the determination according to at least some of the steps S2305, S2310, and/or S2315. Here, if the first IAB node supports the multi-TRP function, it may be assumed that the first IAB node can receive different two spatial division multiplexed (SDMed) signals.

If the first IAB node does not support the multi-TRP function (S2305) and does not support the intra-carrier-DC (S2315), the first IAB node may not normally receive signals transmitted from different cell groups (or different parent nodes) through radio resources allocated in the SDM or FDM scheme within one carrier. That is, if the first IAB node does not support the multi-TRP function (S2305) and does not support the intra-carrier-DC (S2315), the first parent node may determine that application of the TDM based on semi-static coordination or the use of different CCs is necessary in order to configure a DC for the first IAB node together with the second parent node (S2335). Based on the determination result in the step S2335, the first parent node may configure a DC for the first IAB node together with the second parent node, and may perform communications with the first IAB node (S2340). Specifically, the first parent node may apply TDM to radio resources for the first IAB node based on the semi-static coordination with the second parent node, and may perform communications with the first IAB node through the TDMed radio resources. Alternatively, the first parent node may operate to communicate with the first IAB node using a CC different from that of the second parent node.

If the first IAB node does not support the multi-TRP function (S2305) and supports the intra-carrier-DC (S2315), the first IAB node may not normally receive signals transmitted from different cell groups (i.e., different parent nodes) through radio resources allocated in the SDM scheme within one carrier, and may normally receive signals transmitted through radio resources allocated in the FDM scheme. That is, if the first IAB node does not support the multi-TRP function (S2305) and supports the intra-carrier-DC (S2315), the first parent node may determine that application of the FDM based on semi-static coordination or dynamic coordination with the second parent node is possible in order to configure a DC for the first IAB node together with the second parent node (S2330). Based on the determination result in the step S2330, the first parent node may configure a DC for the first IAB node together with the second parent node, and perform communications with the first IAB node (S2340). Specifically, the first parent node may apply FDM to radio resources for the first IAB node based on semi-static coordination or dynamic coordination with the second parent node in consideration of a scheduling information sharing delay time between the parent nodes, and may perform communications with the first IAB node through the FDMed radio resources.

Here, a radio resource for communications with the first parent node and a radio resource for communications with the second parent node, which are configured or indicated to the first IAB node (or the first IAB-MT constituting the first IAB node), may overlap at least partially. For example, one of the first parent node and the second parent node may correspond to the MCG and the other may correspond to the SCG, and there may be a case in which a portion of the radio resource for communications with the first parent node and a portion of the radio resource for communications with the second parent node are SDMed. In this case, the first IAB node may perform communications by selecting a preferential resource according to a predetermined dropping rule from among the overlapping radio resources. Here, the 'dropping rule' may be referred to as 'prioritization'. Here, the technical features related to the dropping rule or prioritization for the resource selection will be described in more detail in a second exemplary embodiment of the communication system.

On the other hand, similarly to the case that the first IAB node does not support the multi-TRP function and does not support the intra-carrier DC, the first parent node may apply TDM to radio resources for the first IAB node based on the semi-static coordination with the second parent node, or may operate to perform communications with the first IAB node by using a CC different from that of the second parent node.

If the first IAB node supports the multi-TRP function (S2305) and does not support the intra-carrier-DC (S2310), the first IAB node may normally receive signals transmitted from different cell groups (i.e., different parent nodes) through radio resources allocated in the SDM or FDM scheme within one carrier. However, the first IAB node may not support the signaling structure for the intra-carrier DC. If the first IAB node does not support the multi-TRP function (S2305) and does not support the intra-carrier-DC (S2315), the first parent node may determine to apply TDM based on the semi-static coordination or dynamic coordination or determine to use different CCs in order to configure a DC for the first IAB node together with the second parent node (S2325). Based on the determination result in the step S2325, the first parent node may configure the DC for the first IAB node together with the second parent node, and perform communications with the first IAB node (S2340). Specifically, the first parent node may apply TDM to radio resources for the first IAB node based on semi-static coordination or dynamic coordination with the second parent node, and may perform communications with the first IAB node through the TDMed radio resources. Alternatively, the first parent node may operate to communicate with the first IAB node using a CC different from that of the second parent node.

If the first IAB node supports the multi-TRP function (S2305) and supports the intra-carrier-DC (S2310), the first IAB node may normally receive signals transmitted from different cell groups (i.e., different parent nodes) through radio resources allocated in the SDM or FDM scheme within one carrier. That is, if the first IAB node supports the multi-TRP function (S2305) and supports the intra-carrier-DC (S2310), the first parent node may determine that the semi-coordination or dynamic coordination with the second parent node is unnecessary in order to configure a DC for the first IAB node together with the second parent node (S2320). Based on the determination result in the step S2320, the first parent node may configure the DC for the first IAB node together with the second parent node, and perform communications with the first IAB node (S2340). Specifically, since the first IAB node supports the signaling structure for the intra-carrier DC, the first and second parent nodes (e.g., corresponding to the MCG and the SCG) may freely perform resource allocation for the first IAB node without applying the dropping rule or prioritization when a 'predetermine condition' is satisfied. Here, the 'predetermined condition' may mean that, for example, the first IAB node, the first parent node, and/or the second parent node are indicated to perform the intra-carrier DC through a separate higher layer parameter. Alternatively, the 'predetermined condition' may mean that the first IAB node, the first parent node, and/or the second parent node are indicated to perform the intra-carrier DC by SDM and/or FDM through a separate higher layer parameter. Here, if the 'predetermined condition' is not satisfied, the first IAB node may perform communications by selecting a preferential resource according to the predetermined dropping rule among the overlapping radio resources. Here, the 'dropping rule' may be referred to as 'prioritization'. Here, the technical features related to the dropping rule or prioritization for resource selection will be described in more detail in the second exemplary embodiment of the communication system.

In the first embodiment of an intra-carrier DC configuration method described with reference to FIG. 23A, the DC between the first IAB node and the first and second parent nodes may be configured based on information indicating whether to support the intra-carrier DC, and information indicating a capability of the first IAB node that is distinct from whether to support the intra-carrier DC. Referring to FIG. 23A, the first embodiment of an intra-carrier DC configuration method is described by taking an scheme utilizing information indicating whether to support multi-TRP function as the information indicating the capability of the first IAB node that is distinct from whether to support the intra-carrier DC, as an example. However, this is only an example for convenience of description, and exemplary embodiments of the present disclosure are not limited thereto. For example, in the step S2305, a parameter maxNumberMIMO-LayersPDSCH and a predefined reference value (i.e., 2 or 4) may be compared. If the parameter maxNumberMIMO-LayersPDSCH is equal to or larger than the predefined reference value, the first embodiment of an intra-carrier DC configuration method may be performed identically or similarly to the case of the IAB node supports the multi-TRP function in FIG. 23A. On the other hand, if the parameter maxNumberMIMO-LayersPDSCH is less than the predefined reference value, the first embodiment of an intra-carrier DC configuration method may be performed identically or similarly to the case of the IAB node does not support the multi-TRP function in FIG. 23A.

Meanwhile, in FIG. 23B shows a second embodiment of an intra-carrier DC configuration method in the communication system including the first IAB node and a first parent node and a second parent node that are the upper nodes of the first IAB node. In the second embodiment of an intra-carrier DC configuration method, the DC between the first IAB node and the first and second parent nodes may be configured based on information indicating whether to support the intra-carrier DC, and a parameter (or a subparameter) directly related to whether to support the intra-carrier DC. Here, while describing the second embodiment of an intra-carrier DC configuration method in the communication system referring to FIG. 23B, features overlapping with those described referring to FIG. 23A may be omitted.

Referring to FIG. 23B, the first parent node may receive a first capability report from the first IAB node (S2350). The first IAB node, or a first IAB-MT constituting the first IAB node may transmit the first capability report to the first and second parent nodes. The first capability report that the first parent node receives from the first IAB node may include information indicating whether to support the intra-carrier DC. The first capability report that the first parent node receives from the first IAB node may include the at least one parameter (or at least one subparameter) regarding whether to support the intra-carrier DC. For example, the first capability report may further include information indicating whether to support SDM, and/or information indicating whether to support FDM.

The first parent node may identify whether the first IAB node supports the intra-carrier DC based on the first capability report received in the step S2350 (S2360). If it is identified that the first IAB node supports the intra-carrier DC in the step S2360, the first parent node may identify whether the first IAB node supports the SDM and/or whether the first IAB node supports the FDM based on the first capability report received in the step S2350 (S2365). Here, if the first IAB node supports the intra-carrier DC, it may be assumed that the first IAB node supports one of the SDM or the FDM, or the first IAB node supports both of the SDM and the FDM. Therefore, if it is identified that the first IAB node supports the intra-carrier DC in the step S2360, the first parent node may identify whether the first IAB node supports both of the SDM and the FDM, or the first IAB node supports one multiplexing scheme among the SDM and the FDM. The first parent node may determine the type of DC to be applied to communications with the first IAB node based on the determination according to at least some of the steps S2360, and/or S2365.

If the first IAB node does not support the intra-carrier-DC (S2360), the first parent node may determine that application of the TDM based on semi-static coordination or the use of different CCs is necessary in order to configure a DC for the first IAB node together with the second parent node (S2380). Based on the determination result in the step S2380, the first parent node may configure a DC for the first IAB node together with the second parent node, and may perform communications with the first IAB node (S2390).

If the first IAB node supports the intra-carrier-DC (S2360) and supports only one multiplexing scheme among the SDM and the FDM (S2365), the first parent node may determine that application of the multiplexing scheme among the SDM and the FDM which is identified to be supported by the first IAB node based on semi-static coordination or dynamic coordination with the second parent node is possible in order to configure a DC for the first IAB node together with the second parent node (S2375). Based on the determination result in the step S2375, the first parent node may configure a DC for the first IAB node together with the second parent node, and perform communications with the first IAB node (S2390).

Here, a radio resource for communications with the first parent node and a radio resource for communications with the second parent node, which are configured or indicated to the first IAB node (or the first IAB-MT constituting the first IAB node), may overlap at least partially. In this case, the first IAB node may perform communications by selecting a preferential resource according to a predetermined dropping rule from among the overlapping radio resources. Here, the 'dropping rule' may be referred to as 'prioritization'. Here, the technical features related to the dropping rule or prioritization for the resource selection will be described in more detail in a second exemplary embodiment of the communication system.

If the first IAB node supports the intra-carrier-DC (S2360) and supports both of the SDM and the FDM (S2365), the first parent node may determine that the semi-coordination or dynamic coordination with the second parent node is unnecessary in order to configure a DC for the first IAB node together with the second parent node (S2370). Based on the determination result in the step S2320, the first parent node may configure the DC for the first IAB node together with the second parent node, and perform communications with the first IAB node (S2340). Specifically, since the first IAB node supports the signaling structure for the intra-carrier DC, the first and second parent nodes (e.g., corresponding to the MCG and the SCG) may freely perform resource allocation for the first IAB node without applying the dropping rule or prioritization when a 'predetermine condition' is satisfied. Here, the 'predetermined condition' may mean that, for example, the first IAB node, the first parent node, and/or the second parent node are indicated to perform the intra-carrier DC through a separate higher layer parameter. Alternatively, the 'predetermined condition' may mean that the first IAB node, the first parent node, and/or the second parent node are indicated to perform the intra-carrier DC by SDM and/or FDM through a separate higher layer parameter. Here, if the 'predetermined condition' is not satisfied, the first IAB node may perform communications by selecting a preferential resource according to the predetermined dropping rule among the overlapping radio resources. Here, the 'dropping rule' may be referred to as 'prioritization'. Here, the technical features related to the dropping rule or prioritization for resource selection will be described in more detail in the second exemplary embodiment of the communication system.

Second Exemplary Embodiment of Communication System

In the second exemplary embodiment of the communication system, when resources for the respective cell groups collide in the intra-carrier-DC, configurations related to the 'dropping rule' for selecting resources in which transmission and reception are actually performed from among the collided resources are suggested. Here, the 'dropping rule' may be referred to as 'prioritization'.

As described with reference to FIG. 23A or 23B, with respect to the IAB node (or IAB-MT) supporting the intra-carrier DC, each of different cell groups (or different parent nodes) such as the MCG and the SCG may allocate different resources within one carrier, and a collision may occur between the allocated resources. Among such the conflicting resources, a criterion for selecting a resource for actual reception or transmission may be required. In order for the IAB node or the IAB-MT constituting the IAB node to select a resource for actual reception and transmission from among the conflicting resources, at least one of the following methods may be required.

Priority determination method when the MCG resource and the SCG resource are FDMed (hereinafter referred to as 'priority determination method for FDM')

Priority determination method when the MCG resource and the SCG resource are SDMed (hereinafter referred to as 'priority determination method for SDM')

Method for determining a reference cell (or reference TX, reference RX, etc.) when determining priorities (hereinafter referred to as 'reference cell determination method')

The priority determination method for FDM and/or the priority determination method for SDM, according to the second exemplary embodiment of the communication system, may be summarized, for example, as shown in Table 26.

TABLE 26

| No. | Ref. cell | other cell | UE behavior | Description |
|---|---|---|---|---|
| 1 | Semi SFI D | Semi SFI U | Allowed to drop U for inter-band. Error case in intra-band. | Dropping U on other cell Error case in intra-band |
| 2 | Semi SFI D | RRC U | Allowed to drop U. | Dropping on other cell |
| 3 | Semi SFI D | Dynamic U | Allowed to drop D for inter-band. Error case in intra-band. | Overriding semi SFI D to F on reference cell for the UE |
| 4 | Semi SFI U | Semi SFI D | Allowed to drop D for inter-band. Error case in intra-band. | Dropping D on other cell Error case in intra-band |
| 5 | Semi SFI U | RRC D | Allowed to drop D. | Dropping on other cell |
| 6 | Semi SFI U | Dynamic D | Error. | Error |
| 7 | RRC D | RRC U | Allowed to drop U. | Dropping on other cell |
| 8 | RRC U | RRC D | Allowed to drop D. | Dropping on other cell |
| 9 | Dynamic D | Dynamic U | Error. | Error |
| 10 | Dynamic U | Dynamic D | Error. | Error |
| 11 | RRC U | Semi SFI D | Allowed to drop D. | Dropping on other cell |
| 13 | RRC D | Semi SFI U | Allowed to drop U. | Dropping on other cell |
| 15 | RRC U | Dynamic D | Error. | Error |
| 16 | RRC D | Dynamic U | Allowed to drop D for inter-band Error case in intra-band. | Dropping RRC D on reference cell |
| 17 | RRC/semi SFI/dynamic D | RRC/semi SFI/dynamic D | Allowed to drop one of D for inter-carrier | Dropping on other cell |
| 18 | RRC/semi SFI/dynamic U | RRC/semi SFI/dynamic U | Allowed to drop one of U for inter-carrier | Dropping on other cell |

In the exemplary embodiment shown in Table 26, a 'reference cell' (Ref cell) may mean a cell serving as a reference (or having a high priority) when selecting priorities. Meanwhile, 'other cell' may mean a cell that is not a criterion (or a low priority) when selecting priorities.

In the exemplary embodiment shown in Table 26, the first row to the sixteenth row show rules for selecting a transmission/reception direction when a transmission direction designated in the reference cell is D (or U) and a transmission direction designated in the other cell is U (or D) at a certain point in time. The first row to the sixteenth row in Table 26 may be considered to be the same as or similar to the exemplary embodiment shown in Table 25.

The first row to the sixteenth row in Table 26, for example, may be the same as or similar to a selection scheme of a terminal operating in the half-duplex CA scheme when a transmission direction collision occurs for different cells. In general, such the direction collision between D/Us or the direction collision between U/Ds may be seen as not occurring within one carrier. However, when the intra-carrier DC is applied and resources included in one carrier are jointly used by the MCG and the SCG, such the direction collision may occur even within one carrier. In this case, the IAB node or the IAB-MT constituting the IAB node may select one resource (i.e., resource of the reference cell) from among the conflicting resources with reference to one of the first row to the sixteenth row in Table 26. In this case, at least one of the first row to the sixteenth row in Table 26 may be used for prioritization when using FDM in the intra-carrier DC. In this case, the reference resource or the reference cell may be configured based on the following methods.

In the exemplary embodiment shown in Table 26, the seventeenth row to the eighteenth row show a criterion or a rule for selecting a resource for transmission and reception when directions of both the reference cell and the other cell are all D or all U at a certain point in time. For example, For example, the terminal operating in the half-duplex CA scheme may perform transmission/reception operations indicated for each cell as it is, without treating a situation of the seventeenth row to the eighteenth row in Table 26 as a collision situation. Meanwhile, in the case of intra-carrier DC, a case may occur in which radio resources (MCG and SCG resources) allocated by a plurality of cell groups partially overlap within the same carrier. Here, if the IAB node or the IAB-MT constituting the IAB node does not support SDM, it may be impossible to perform transmission/reception indicated for overlapping resources as it is. In this case, the IAB node (or IAB-MT) may determine which resources to perform transmission and reception with reference to one of the seventeenth row and the eighteenth row of Table 26. Meanwhile, for the IAB node (or IAB-MT) supporting SDM during the intra-carrier DC operation, application of the seventeenth row and the eighteenth row of Table 26 may be omitted. In other words, the IAB node (or IAB-MT) supporting SDM during the intra-carrier DC operation may perform all of the indicated transmission/reception operations regardless of whether the MCG resources and the SCG resources overlap.

In the seventeenth row or the eighteenth row of Table 26, detailed types such as D or U (i.e., RRC/semi-SFI/dynamic D or RRC/semi-SFI/dynamic U) are not separately expressed, but this is only an example for convenience of description, and exemplary embodiments of the present disclosure are not limited thereto. For example, in an exemplary embodiment of the communication system, the selection schemes indicated in the seventeenth row or the eighteenth row of Table 26 may be configured to applied separately for each detailed type D or U, similarly to the first to sixteenth rows of Table 26.

Meanwhile, when determining a priority between DC resources within the carrier, a reference cell may be selected according to the following schemes. In the case of intra-carrier DC, a plurality of cell groups (e.g., MCG, SCG, etc.) may share the same frequency resources (or frequency band). In other words, in the case of intra-carrier DC, a plurality of cell groups may share a CC physically located in the same location position or may share a cell having the same cell ID. Accordingly, a method of selecting a reference cell based on the cell ID may not be easy to apply to the intra-carrier DC. In an exemplary embodiment of the communication system, when some of the radio resources (time-frequency resources) allocated by the MCG and the radio resources allocated by the SCG overlap, the priority may be determined by using one or a combination of the following schemes.

Scheme 1: When the physical cell IDs (PCIs) of the cell in which the MCG resource is configured and the cell in which the SCG resource is configured are the same, a resource having the lowest (or, higher) cell group index indicated by a predetermined higher layer parameter (e.g., CellGroupID) may be assumed as the resource of the reference cell. This is for reducing system complexity by unifying IAB-MT operations in a direction that decision of the MCG.

Scheme 2: Among the overlapping MCG and SCG resources, a resource of a channel or signal started earlier (e.g., from an earlier symbol) may be assumed as the resource of the reference cell. This is for reduction implementation and operation complexity by promising that the IAB-MT maintains the operation it started first.

Scheme 3: Among the overlapping MCG and SCG resources, a resource for a channel or signal started later (e.g., from a later symbol) may be assumed as the resource of the reference cell. This is for preferentially reflecting the latest decision of the upper node.

Scheme 4: Among the overlapping resources of MCG and SCG, resources of a channel or signal started at a lower (or higher) position may be assumed as the resources of the reference cell.

In actual implementation of the IAB node, the above-described exemplary embodiments are not necessarily mutually exclusive, and a combination of various exemplary embodiments may be considered. For example, the communication nodes constituting the IAB network may be implemented to operate by simultaneously applying the intra-carrier DC scheme determination method according to the first exemplary embodiment and the priority determination method when a collision occurs between resources for cell groups according to the second exemplary embodiment. The communication nodes constituting the IAB network may be implemented to support one or more of the functions described with reference to FIGS. 13 to 23B. The communication node constituting the IAB network may report information related to which function it is implemented to support or which function is not supported to the base station or upper node. The base station or the upper node may indicate information on which operation the communication node constituting the IAB network will perform based on the reported information through L1 signaling, higher layer signaling, or the like.

Figure 24:
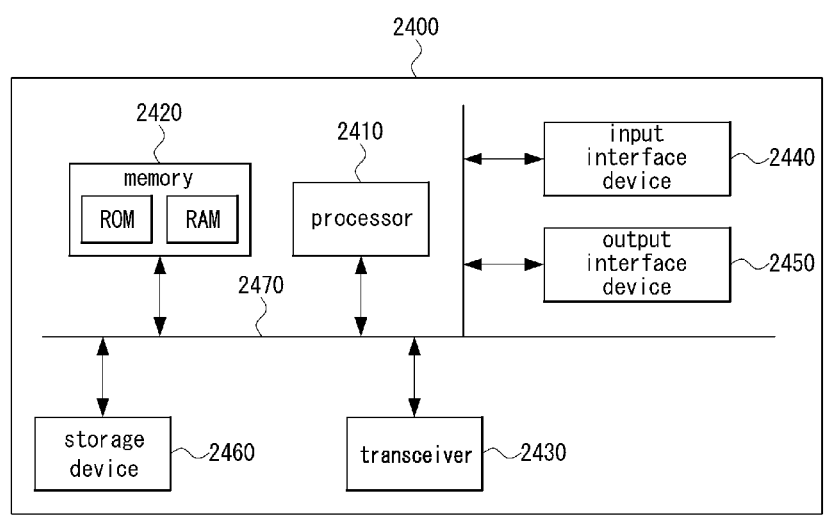
FIG. 24 is a block diagram illustrating an exemplary embodiment of a communication node constituting a communication system.

FIG. 24 is a block diagram illustrating an exemplary embodiment of a communication node constituting a communication system.

Referring to FIG. 24, a communication node 2400 may comprise at least one processor 2410, a memory 2420, and a transceiver 2430 connected to the network for performing communications. Also, the communication node 2400 may further comprise an input interface device 2440, an output interface device 2450, a storage device 2460, and the like. The respective components included in the communication node 2400 may communicate with each other as connected through a bus 2470.

However, each component included in the communication node 2400 may be connected to the processor 2410 via an individual interface or a separate bus, rather than the common bus 2470. For example, the processor 2410 may be connected to at least one of the memory 2420, the transceiver 2430, the input interface device 2440, the output interface device 2450, and the storage device 2460 via a dedicated interface.

The processor 2410 may execute a program stored in at least one of the memory 2420 and the storage device 2460. The processor 2410 may refer to a central processing unit (CPU), a graphics processing unit (GPU), or a dedicated processor on which methods in accordance with embodiments of the present disclosure are performed. Each of the memory 2420 and the storage device 2460 may be constituted by at least one of a volatile storage medium and a non-volatile storage medium. For example, the memory 2420 may comprise at least one of read-only memory (ROM) and random access memory (RAM).

The communication node 2400 may correspond to any one of communication nodes constituting the exemplary embodiments of the communication system described with reference to FIGS. 1 to 23B. In an exemplary embodiment of the communication system, the communication node 2400 may correspond to an IAB node. Alternatively, on the other hand, in an exemplary embodiment of the communication system, the communication node 2400 may correspond to an IAB-DU or IAB-MT constituting the IAB node. In an exemplary embodiment of the communication system, the communication node 2400 may perform the same or similar operations to the operations of the IAB node described with reference to at least one of FIGS. 13 to 23B.

Meanwhile, the communication node 2400 may correspond to an upper node of the IAB node. The communication node 2400 may perform the same or similar operations as those of the upper node of the IAB node described with reference to at least one of FIGS. 13 to 23B. Alternatively, the communication node 2400 may correspond to a lower node of the IAB node. The communication node 2400 may perform the same or similar operations as those of the lower node of the IAB node described with reference to at least one of FIGS. 13 to 23B.

The processor 2410 of the communication node 2400 may perform operations for communications with an upper node or a lower node. The processor 2410 of the communication node 2400 may enable the communication node 2400 to perform communications with an upper node or a lower node based on the configurations described with reference to FIG. 23A or 23B.

According to an exemplary embodiment of the present disclosure, a DC between an IAB node constituting the IAB network and one or more upper nodes of the IAB node in the communication system can be efficiently configured. The IAB node may transmit, to upper nodes, a capability report including information indicating capability-related information, such as whether a multi-Tx/Rx point function is supported, whether or not to support intra-carrier DC. The upper nodes of the IAB node may identify the capability-related information of the IAB node based on the capability report transmitted from the IAB node. The upper nodes of the IAB node may configure a DC in a scheme most suitable for the IAB node, based on the identified capability-related information of the IAB node. Accordingly, the reliability, robustness, etc. of the IAB links constituting the IAB network can be improved.

However, the effects that can be achieved by the dual connectivity management method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A dual connectivity (DC) management method performed by a first communication node constituting an integrated access and backhaul (IAB) network in a communication system, the DC management method comprising:
   receiving, from a first IAB node that is a lower node of the first communication node, a first capability report including information of DC-related capability of the first IAB node;
   based on the first capability report, identifying whether the first IAB node supports a multi transmission and reception point (multi-TRP) function;
   based on the first capability report, identifying a maximum number of layers supported by the first IAB node;
   based on the first capability report, identifying whether the first IAB node supports an intra-carrier DC; and
   based on the identified whether the first IAB node supports the multi-TRP function, whether the first IAB node supports the intra-carrier DC, and the maximum number of layers supported by the first IAB node, configuring a DC for the first IAB node together with a second communication node that is an upper node of the first IAB node,
   wherein when the first IAB node supports the multi-TRP function and supports the intra-carrier DC, a DC in which radio resources are spatial division multiplexed (SDMed), or a DC in which the radio resources are FDMed is determined as applicable to the first IAB node according to the maximum number of layers supported by the first IAB node,
   wherein the configuring comprises:
   based on the identified whether the first IAB node supports the multi-TRP function and whether the first IAB node supports the intra-carrier DC, identifying one or more DC schemes applicable to the first IAB node; and
   configuring a DC according to the one of the one or more DC schemes identified as applicable to the first IAB node for the first IAB node, wherein in the identifying of the one or more DC schemes, when the first IAB node does not support the intra-carrier DC, a DC in which the first communication node and the second communication node use different component carriers (CCs) is determined as applicable to the first IAB node, wherein in the identifying of the one or more DC schemes, when the first IAB node does not support the multi-TRP function and supports the intra-carrier DC, a DC in which radio resources are frequency division multiplexed (FDMed) based on semi-static coordination or dynamic coordination with the second communication node, a DC in which the radio resources are TDMed based on semi-static coordination with the second communication node, or a DC in which the first communication node and the second communication node use different CCs is determined as applicable to the first IAB node, and wherein in the identifying of the one or more DC schemes, when the first IAB node supports the multi-TRP function and supports the intra-carrier DC, a DC in which the first communication node and the second communication node use different CCs is determined as applicable to the first IAB node.

2. A dual connectivity (DC) management method performed by a first communication node constituting an integrated access and backhaul (IAB) network in a communication system, the DC management method comprising:

transmitting, to a second communication node and a third communication node which are upper nodes of the first communication node, a first capability report including information on DC-related capability of the first communication node;

based on the information included in the first capability report, receiving, from the second and third communication nodes, information on a DC configured for the first communication node; and performing communication with the second and third communication nodes based on the configured DC, wherein the first capability report includes information indicating whether the first IAB node supports intra-carrier DC, wherein when the first communication node does not support the intra-carrier DC, a DC in which radio resources are time division multiplexed (TDMed) based on semi-static coordination with the third communication node is determined to be applicable as the configured DC, and wherein the performing of communication with the second and third communication nodes comprises:

when a collision occurs at least partially between a resource of the second communication node and a resource of the third communication node, selecting a resource to be used for signal transmission/reception from the resource in which the collision occurs; and performing communication with the second communication node or the third communication node through the selected resource, wherein the selecting comprises:

when a physical cell identifier (PCI) of a cell in which the resource of the second communication node is configured is identical to a PCI of a cell in which the resource of the third communication node is configured, comparing the resource of the second communication node with the resource of the third communication node based on cell group indexes corresponding to the respective resources; and selecting one of the resource of the second communication node and the resource of the third communication node based on a result of the comparison based on the cell group indexes.

3. The DC management method according to claim 2, wherein when the first communication node does not support the intra-carrier DC, a DC in which the second communication node and the third communication node use different component carriers (CCs) is determined to be applicable as the configured DC.

4. The DC management method according to claim 2, wherein the first capability report further includes information indicating whether the first IAB node supports multi transmission and reception point (multi-TRP) function, and when the first communication node does not support the multi-TRP function and supports the intra-carrier DC, the configured DC corresponds to one of a DC in which radio resources are frequency division multiplexed (FDMed) based on semi-static coordination or dynamic coordination with the third communication node, a DC in which the radio resources are TDMed based on semi-static coordination with the third communication node, or a DC in which the second communication node and the third communication node use different CCs.

5. The DC management method according to claim 2, wherein the first capability report further includes information indicating whether the first IAB node supports multi-TRP function, and when the first communication node supports the multi-TRP function and supports the intra-carrier DC, the configured DC corresponds to one of a DC in which radio resources are spatial division multiplexed (SDMed), a DC in which the radio resources are FDMed, a DC in which the radio resources are TDMed, or a DC in which the second communication node and the third communication node use different CCs.

6. The DC management method according to claim 2, wherein the first capability report further includes information indicating whether the first IAB node supports SDM and information indicating whether the first IAB node supports FDM, and when the first communication node supports the intra-carrier DC and supports one of the SDM or the FDM, the configured DC corresponds to one of a DC in which radio resources are multiplexed by a multiplexing scheme, among the SDM and the FDM, which is supported by the first IAB node, based on semi-static coordination or dynamic coordination with the third communication node, a DC in which the radio resources are TDMed based on semi-static coordination with the third communication node, or a DC in which the second communication node and the third communication node use different CCs.

7. The DC management method according to claim 2, wherein the first capability report further includes information indicating whether the first IAB node supports SDM and information indicating whether the first IAB node supports FDM, and when the first communication node supports the intra-carrier DC and supports both of the SDM and the FDM, the configured DC corresponds to one of a DC in which radio resources are SDMed, a DC in which the radio resources are FDMed, a DC in which the radio resources are TDMed, or a DC in which the second communication node and the third communication node use different CCs.

8. The DC management method according to claim 2, wherein the selecting comprises:

comparing the resource of the second communication node with the resource of the third communication node based on timings at which signals corresponding to the resources respectively start in a time domain; and selecting one of the resource of the second communication node and the resource of the third communication node based on a result of the comparison based on the timings.

9. The DC management method according to claim 2, wherein the selecting comprises:

comparing the resource of the second communication node with the resource of the third communication node based on positions at which signals corresponding to the resources respectively start in a frequency domain; and selecting one of the resource of the second communication node and the resource of the third communication node based on a result of the comparison based on the positions.

10. A first communication node constituting an integrated access and backhaul (IAB) network in a communication system, the first communication node comprising:

a processor;

a memory electronically communicating with the processor; and instructions stored in the memory, wherein when executed by the processor, the instructions cause the first communication node to:

transmit, to a second communication node and a third communication node which are upper nodes of the first communication node, a first capability report including information on DC-related capability of the first communication node;

based on the information included in the first capability report, receive, from the second and third communication nodes, information on a DC configured for the first communication node; and perform communication with the second and third communication nodes based on the configured DC, wherein the first capability report includes at least one of information indicating whether the first IAB node supports multi transmission and reception point (multi-TRP) function and information indicating whether the first IAB node supports intra-carrier DC, wherein when the first communication node does not support the intra-carrier DC, a DC in which radio resources are time division multiplexed (TDMed) based on semi-static coordination with the third communication node is determined to be applicable as the configured DC, and wherein in the performing of communication with the second and third communication nodes, the instructions further cause the first communication node to:

when a collision occurs at least partially between a resource of the second communication node and a resource of the third communication node, select a resource to be used for signal transmission/reception from the resource in which the collision occurs; and perform communication with the second communication node or the third communication node through the selected resource, wherein in the selecting, the instructions further cause the first communication node to:

when a physical cell identifier (PCI) of a cell in which the resource of the second communication node is configured is identical to a PCI of a cell in which the resource of the third communication node is configured, compare the resource of the second communication node with the resource of the third communication node based on cell group indexes corresponding to the respective resources; and select one of the resource of the second communication node and the resource of the third communication node based on a result of the comparison based on the cell group indexes.

11. The first communication node according to claim 10, wherein when the first communication node does not support the intra-carrier DC, a DC in which the second communication node and the third communication node use different component carriers (CCs) is determined to be applicable as the configured DC.

12. The first communication node according to claim 10, wherein when the first communication node does not support the multi-TRP function and supports the intra-carrier DC, the configured DC corresponds to one of a DC in which radio resources are frequency division multiplexed (FDMed) based on semi-static coordination or dynamic coordination with the third communication node, a DC in which the radio resources are TDMed based on semi-static coordination with the third communication node, or a DC in which the second communication node and the third communication node use different CCs.

13. The first communication node according to claim 10, wherein when the first communication node supports the multi-TRP function and supports the intra-carrier DC, the configured DC corresponds to one of a DC in which radio resources are spatial division multiplexed (SDMed), a DC in which the radio resources are FDMed, a DC in which the radio resources are TDMed, or a DC in which the second communication node and the third communication node use different CCs.

* * * * *